United States Patent [19]
Ito et al.

[11] Patent Number: 5,840,234
[45] Date of Patent: Nov. 24, 1998

[54] HIGH-DENSITY POLYETHYLENE PLEXIFILAMENTARY FIBER NONWOVEN FABRIC COMPOSED OF FIBER THEREOF, AND MANUFACTURING METHODS THEREOF

[75] Inventors: Kohzoh Ito; Ikuo Ueno; Yoshiaki Nakayama; Katsuzi Hikasa, all of Moriyama, Japan

[73] Assignee: Asahi Kasei Kogyo Kabushiki Kaisha, Osaka, Japan

[21] Appl. No.: 614,067

[22] Filed: Mar. 12, 1996

Related U.S. Application Data

[62] Division of Ser. No. 233,947, Apr. 28, 1994, which is a division of Ser. No. 968,463, Oct. 29, 1992, abandoned, which is a continuation of Ser. No. 814,046, Dec. 26, 1991, abandoned, which is a continuation of Ser. No. 211,234, filed as PCT/JP87/00765, Oct. 13, 1987, abandoned.

[30] Foreign Application Priority Data

| Oct. 13, 1986 | [JP] | Japan | 61-241450 |
| Apr. 20, 1987 | [JP] | Japan | 62-95231 |
| Jul. 9, 1987 | [JP] | Japan | 62-169682 |
| Jul. 11, 1987 | [JP] | Japan | 62-172073 |
| Jul. 13, 1987 | [JP] | Japan | 62-172960 |
| Jul. 22, 1987 | [JP] | Japan | 62-181189 |
| Aug. 27, 1987 | [JP] | Japan | 62-211422 |

[51] Int. Cl.$^6$ .................................................. D01F 6/00
[52] U.S. Cl. .................. 264/205; 425/382.3; 425/404
[58] Field of Search ............................ 425/382.3, 404; 264/205

[56] References Cited

U.S. PATENT DOCUMENTS

| 3,081,519 | 3/1963 | Blades et al. . |
| 3,169,899 | 2/1965 | Steuber . |
| 3,227,664 | 1/1966 | Blades et al. . |
| 3,227,784 | 1/1966 | Blades et al. . |
| 3,242,035 | 3/1966 | White . |
| 3,478,141 | 11/1969 | Dempsey et al. . |
| 3,497,918 | 3/1970 | Pollock, Jr. et al. . |
| 3,695,025 | 10/1972 | Gibbon . |
| 3,860,369 | 1/1975 | Brethauer et al. . |
| 3,900,631 | 8/1975 | Woodell . |
| 3,987,139 | 10/1976 | Kozlowski et al. . |
| 4,089,816 | 5/1978 | Sano et al. . |
| 4,148,595 | 4/1979 | Bednarz . |
| 4,554,207 | 11/1985 | Lee . |
| 4,737,394 | 4/1988 | Zafiroqlu . |

FOREIGN PATENT DOCUMENTS

964023  3/1975  Canada .

*Primary Examiner*—James J. Bell
*Attorney, Agent, or Firm*—Finnegan, Henderson, Farabow, Garrett & Dunner, L.L.P.

[57] ABSTRACT

A three-dimensional plexifilamentary fiber (26) of a high-density polyethylene group obtained by supplying a polymer to a dissolving area in a state such that the polymer is melted by a heated screw extruder (compressing zone 13, metering zone 14 to 16), supplying a solvent ($CCl_3F$) into the melted polymer (feed opening 18), mixing and dissolving the polymer and the solvent to make a polymer solution, and extruding the polymer solution from a nozzle (24 in FIG. 24) arranged in the dissolving area into a low pressure area. A nonwoven fabric is obtained through a process in which the fiber (26) is spread by striking the fiber against a skirt portion (33) having a fiber swinging face (34) and a cushioning face (35), and this nonwoven fabric has an excellent strength, covering property, and whiteness.

6 Claims, 14 Drawing Sheets

HIGH-DENSITY POLYETHYLENE PLEXIFILAMENTARY FIBER NONWOVEN FABRIC COMPOSED OF FIBER THEREOF, AND MANUFACTURING METHODS THEREOF

DESCRIPTION

This is a division of application Ser. No. 08/233,947 filed Apr. 28, 1994, pending, which is a division of application Ser. No. 07/968,463, filed Oct. 29, 1992, now abandoned, which is a continuation of application Ser. No. 07/814,046, filed Dec. 26, 1991, now abandoned, which is a continuation of application Ser. No. 07/211,234, filed as PCT/JP87/00765, Oct. 13, 1987, now abandoned.

TECHNICAL FIELD

The present invention relates to a novel three-dimensional plexifilamentary fiber capable of being using for various purposes as a special material, a nonwoven fabric composed of the three-dimensional plexifilamentary fiber and manufacturing methods thereof. In particularly, the present invention relates to a novel three-dimensional plexifilamentary fiber made of a high-density polyethylene, having a highly fibrillated three-dimensional network shape, having an extremely high strength and extremely high thermal mechanical properties, and suitable for manufacturing a nonwoven fabric having a heat-bonding property; a nonwoven fabric composed of the above novel three-dimensional plexifilamentary fiber, and having an excellent untransparency, an excellent covering property and a high strength; a high strength nonwoven fabric having nonwelded portions; a nonwoven fabric having an excellent uniformity; and novel method for manufacturing the above nonwoven fabric having an excellent uniformity.

Since the present application includes various related inventions, the inventions are divided by applying the marks A, B - - - I described as follows thereto, for convenience of the explanation and an easy understanding, and those marks are applied at the top portion of the corresponding descriptions in the following text, respectively.

A A novel three-dimensional plexifilamentary fiber.

B A novel three-dimensional plexifilamentary fiber manufactured by using a method for sealing by a melted polymer in a solvency area.

C A novel three-dimensional plexifilamentary fiber manufactured by using a method for activating by a high pressure difference.

D A novel manufacturing method of the three-dimensional plexifilamentary fiber, for sealing the melt polymer in the dissolving area.

E A novel manufacturing method of the three-dimensional plexifilamentary fiber, for activating the high pressure difference.

F A novel high strength nonwoven fabric composed of the three-dimensional plexifilamentary fibers.

G A novel high strength nonwoven fabric having non-welded portions and composed of the three-dimensional plexifilamentary fibers.

H A novel uniform nonwoven fabric composed of the three-dimensional plexifilamentary fibers I A novel method of manufacturing the uniform nonwoven fabric.

PRIOR ART

A A flash spinning technique in which a polymer and a solvent are extruded under a condition of a high temperature and a high pressure through a nozzle to a condition of a low temperature and a low pressure, and the solution is flashed to make a fiber, is known as a technique for obtaining a three-dimensional plexifilamentary fiber. For example, disclosed in U.S. Pat. No. 3,081,519 is a fiber constituted with fibrils arranged in a three-dimensional network state by being drawn in an axial direction of the fiber, excluding substantially free ends thereof, and having a thickness of less than $4\mu$.

Since this plexifilamentary fiber has a specific network construction and fine fibrils, this plexifilamentary fiber features a high whiteness caused by an irregular reflection of light and a high covering power, and can be used for various applications. This plexifilamentary fiber is used for a nonwoven sheet, as a specially important application thereof.

Although various polymers can be used for a polymer from which the plexifilamentary fiber can be manufactured, a polyolefin, in particularly, a high-density polyethylene, is under serious research, because the above fiber is suitable for flash spinning.

Prior arts relating to the plexifilamentary fiber and the manufacturing method thereof will be explained hereafter.

B & D A principle of flash spinning is that a network construction fiber is caused by change of a construction of a uniform solution while the uniform solution is transferred from a under a high temperature and a high pressure condition to a low pressure region, as well as flash phenomenon of a solvent and solidification of a polymer. Therefore, the fiber must be spun from the uniform solution comprising the polymer and the solvent, to manufacture the plexifilamentary fiber continuously in a stable state.

Therefore, solvents capable of dissolving the polymer in the state under the high temperature and the high pressure and having flashability and a relatively lower boiling point are selected as the solvent used in this spinning method. But, those solvents can not dissolve the polymer under a normal temperature and a normal pressure, and can only start to dissolve the polymer under a high temperature and high pressure.

As shown in U.S. Pat. No. 3,169,899, a method for spinning a fiber after heating, pressurizing and dissolving the polymer in a pressure vessel with a stirring device is known as one of the processes for manufacturing a flash spinning fiber, i.e., a batch-wise method. Further, various spinning processes for continuously obtaining the fiber are disclosed in U.S. Pat. No. 3,227,794. Namely, described in the above U.S. Patent are, a method in which a predetermined quantity of a melted polymer and a solvent are supplied to a screwmixer, are dissolved in a solvency vessel with a stirring device and are then spinned, a method in which a polymer powder and a solvent are made to a slurry state, are introduced to a solvency vessel with a baffle to be dissolved and are spun, and a method in which the slurry is dissolved by a slurry pump and is spun, or the like, and conventionally known three-dimensional fibers are manufactured by one of the above methods.

C & E A known manufacturing method and a plexifilamentary fiber manufactured by the above manufacturing method, when the above explained method is viewed from a different standpoint, will be explained hereafter. A technique of spinning a fiber after a polymer solution is changed from a single-liquid-phase region to a two-liquid-phase region was disclosed in U.S. Pat. No. 3,227,794 column 23, lines 43 to 49 as an important technique of the flash spinning method. Namely, this method is a flash spinning method comprising the following steps:

① A uniform solution of the polymer and the solvent is prepared,

② The polymer solution is changed from a single-liquid-phase region to a two-liquid-phase region by a pressure drop caused by transferring the polymer solution through a pressure let-down orifice to a pressure let-down chamber, ③ The polymer solution is spun from a spinning nozzle and the polymer is hardened.

Various shapes and constructions of a spinneret assembly constituted with the pressure let-down orifice, the pressure let-down chamber, and spinning nozzle, and used as a spinning device for implementing the above method, have been proposed.

In the above flash spinning method, much researches are made into especially a polyolefin.hydrocarbon halide group. For example, the methods as disclosed in U.S. Pat. No. 3,227,794 or the like. Further these prior arts disclose that a border line between the single-liquid-phase and the two-liquid-phase has a correlation with a temperature and a pressure in the polymer.solvent group; that the polymer.solvent group is soluble under a low temperature and soluble under a high pressure; that the polymer.solvent group can be changed from the single-liquid-phase to the two-liquid-phase by a pressure drop caused by the pressure let-down orifice; and that it is necessary to spin the polymer.solvent group in the two-liquid-phase state, or the like.

As described hereinbefore, the conventional known plexifilamentary fiber is a fiber obtained by spinning the polymer solution after the polymer solution is changed to the two-liquid-phase region.

Prior-arts relating to the nonwoven fabric composed of the three-dimensional plexifilamentary fiber will be explained hereinafter.

F A nonwoven fabric manufactured by using a three-dimensional plexifilamentary fiber formed by a network construction of fibrils and disclosed in U.S. Pat. No. 3,081,519 is known.

Namely, a nonwoven sheet manufactured by making staple fibers of the above plexifilamentary fiber into a sheet is disclosed in Japanese Examined Patent Publication (Kokoku) No. 36-16460, or a nonwoven sheet manufactured by making melted filaments into a sheet is disclosed in U.S. Pat. No. 3,169,899. Particularly, a method of obtaining a nonwoven sheet (hereinafter, a sheet-like material in which fibers are overlapped before receiving a heat-bonding process is referred as a "nonwoven web") by applying the latter flush spinning filaments with an obstacle plate or the like to spread he plexifilamentary fibers and overlapping the spreaded plexifilamentary fibers, is a preferable method. Namely a flashing force of the solvent is utilized in the flash spinning, and it is known that a spinning speed in the flash spinning is usually 4,900 m/min or more and a speed of from 9,000 m/min to 13,500 m/min can be realized. Therefore this method is extremely useful for obtaining the nonwoven sheet with a good productivity.

The nonwoven web in which the continuous spinned plexifilamentary fibers are spread and arranged in random directions is heat-bonded to maintain the required shape as a nonwoven fabric (hereinafter, a material to which the nonwoven web is applied with the bonding process is referred as a "nonwoven fabric"), appearance of a strength of the nonwoven fabric, and the achievement of the other objects. A heat-bonding process is performed by a bonding using a calender roll and an emboss roll, or a joining using a feltcalender or the like. Thus, a nonwoven fabric having a paper-like surface, i.e., a flat surface, or having an emboss pattern is obtained, and can be used for various applications by using an transparency, a covering power or a whiteness caused by composing some of the plexifilamentary fiber of fine fibrils, a smoothness of the surface, a resistance to fluffing, a softness or a mechanical strength over a predetermined level. Note, it is known that the bonding process can be performed by an adhesive.

G Nonwoven fabrics having various shapes are known as the nonwoven fabric of the plexifilamentary fiber. Namely, a cloth-like nonwoven fabric to which a softening process is applied, a nonwoven fabric, a surface of which is slightly bonded with the heat, a nonwoven web in which heat-bonding is not applied, or the like, are known. The above nonwoven fabric can be used in various applications by using a high covering force, a whiteness and a strength.

Although various polymers can be used for a polymer from which the nonwoven fabric of the plexifilamentary fibers can be manufactured, a polyolefin, in particularly, a high-density polyethylene, is the subject of serious research, because the high-density polyethylene is suitable for the nonwoven fabric composed of the flash spinning fiber.

H & I An apparatus for manufacturing a nonwoven sheet by striking a flux of plexifilamentary fibers extruded from a spinning nozzle against a tub or a biassing device to make spread and spread plexifilamentary fibers, and by overlapping the spread and spread plexifilamentary fibers on a moving collecting surface, is known as an apparatus for manufacturing plexifilamentary fibers, as disclosed in U.S. Pat. No. 3,169,899.

A rotational obstacle plate comprising a disk, a cylinder arranged on a center of the disk, and a multi-leaf-like skirt spread from a side face of the cylinder in an inclined state to an upper face of the disk is known as an apparatus for spreading, opening and dispersing the plexifilamentary fiber, as disclosed in U.S. Pat. No. 3,497,918.

Further, a technique for applying an electric charge to the three-dimensional plexifilamentary fiber by a corona discharge before overlapping the fiber on a collecting surface, to increase a uniformity of a unit weight of the nonwoven web, is disclosed in Japanese Examined Patent Publication (Kokoku) No. 44-21817. Further a method for controlling a passage along which the spread plexifilamentary fiber advances to the collecting face is disclosed in U.S. Pat. No. 3,593,074 and U.S. Pat. No. 3,851,023.

The known plexifilamentary fiber, the known method of manufacturing the plexifilamentary fiber, the known nonwoven fabric composed of the plexifilamentary fibers, and the known method of manufacturing the nonwoven fabric described hereinbefore have various problems or disadvantages. These problems will be explained hereinafter.

A Even if a suitable material, i.e., a high-density polyethylene is used, it is apparent that the quality of a known three-dimensional plexifilamentary fibers left in an extruded state does not reach satisfactory level. Namely, the facts that a fiber manufactured by the flash spinning method has, in the extruded state, a molecular orientation and some level of physical property, but that a heat drawing must be applied to the fiber, and a technique of applying the heat drawing, are disclosed in U.S. Pat. No. 3,081,519.

However, since the spinning speed in the flash spinning is extremely high, as described hereinbefore, and a gap between the spinning speed and a drawing speed is too large, the heat drawing process has various problems in industrial operation and is not useful. Particularly, it is practically impossible to perform the heat drawing of the three-dimensional plexifilamentary fiber in a method for making the flash spinning fiber into a sheet. Namely, an operation applying a difference between the spinning speed and the drawing speed cannot be added to a process. If a heat drawing operation can be used, a mechanical strength of the fiber is increased, but the whiteness and the covering factor, which are features of the three-dimensional plexifilamentary fiber, are reduced and transparency appears. Further, there are several other problems, such that it is impossible to spread the plexifilamentary fibers, an obtained web is not an uniform web, and a shrinkage at heat-bonding is likely to occur, or the like.

Therefore, when manufacturing a nonwoven web composed of the three-dimensional fiber, a fiber in the extruded state is used as disclosed in U.S. Pat. No. 3,169,899. Namely, a simple process wherein the flash spinning fiber is spread by an obstacle or the like to form a sheet-like state and the obtained sheet is heat bonded is used. However it is apparent that the physical properties thereof depend essentially on the properties of the fiber constituting the nonwoven fabric, and whatever concepts are applied to a method for making a sheet by spreading the fiber or a method for heat-bonding the sheet, the physical properties of the obtained nonwoven fabric depend on the mechanical properties, thermal properties, optical properties or the like of the fibers. Namely, the mechanical properties of the heat-bonding nonwoven fabric depend on the mechanical properties and thermal properties of the fibers constituting the nonwoven fabric, and the optical properties depend on the optical properties and thermal properties thereof, so that a nonwoven fabric having excellent properties cannot be obtained.

Various known methods are used for heat-bonding a sheet obtained from a process wherein flash spinning is applied. When using a high-density polyethylene, the heat-bonding is performed by a temperature near to a crystal melting point of the polymer, to obtain a strength sufficient for a nonwoven fabric, to maintain a shape of the nonwoven fabric, and to prevent fluffing on a surface of the nonwoven fabric. Therefore, for the heat-bonding nonwoven fabric, the factors that the heat-bonding property between fibers is strong, that it is hard that the fiber shrinks when the heat-bonding treatment is applied, that the mechanical strength of the fiber is high at a high temperature near to the heat-bonding temperature, or the like are required as properties of the fiber.

In view of the above-mentioned, a known three-dimensional fiber in an extruded state and having satisfactory qualities is not known. Namely, those fibers have problems including the facts that the mechanical properties of the fiber are inferior, the thermal mechanical properties of the fiber are inferior, retrogradation of the fiber is large at a temperature near to the bonding temperature, the mechanical strength, e.g., tensile strength, tear strength or the like in when heat-bonding the nonwoven fabric is poor, a whiteness and a covering factor of the nonwoven fabric are inferior, and the nonwoven fabric is remarkable irregular. Therefore, application of the nonwoven fabric is practically limited.

Therefore, an object of the present inventions is to provide a three-dimensional plexifilamentary fiber having high mechanical properties in the extruded state and excellent properties at a temperature near to the heat-bonding temperature and capable of use as a material of a heat-bonding nonwoven fabric.

B & D When continuously manufacturing a plexifilamentary fiber by manufacturing a uniform solution of a polymer by the known manufacturing technique described hereinbefore, and flash spinning the uniform solution, the following problems rise.

When using the known technique, it takes a long time to dissolve a polymer in a solvent. This is because a strong shear force necessary to dissolve the polymer is not applied in a stirring device such as an autoclave, and it is necessary to increase the dissolving time by merely increasing a retention time in the stirring device, so that a uniform solution of the polymer can be obtained. Therefore, it is obvious to use a vessel having a big capacity, and the retention time is increased necessarily. Further, since the vessel has a big capacity, it is extremely difficult to make the pressure in the vessel exceed 200 mg/cm$^2$.G.

When dissolving the swollen polymer in a laminar flow mixing method, by a pipe, a shear force necessary to dissolve the polymer is applied by only a difference in the flow rates, and an extremely long pipe line becomes necessary, which causes an increase of the retention time. When a turbulent flow mixing method is applied, since a solution of the polymer has a high viscosity of about 30 centipoise to 100 centipoise, an extremely high flow rate is necessary, so that a giant pump, which is not practical must be used.

In any case, a solvent used in the flush spinning operation cannot dissolve the polymer under a normal temperature and a normal pressure, and the solvent should be a liquid capable of dissolving the polymer when the solvent comes under a high temperature and a high pressure. A high temperature and the high pressure are indispensable factors in the flash spinning operation, and therefore, the retention time is necessarily increased in the conventional technique, and conversely, it is limited to a solvent under a high pressure.

When the polymer is retained for a long time in a circumference under a high temperature, this causes retrogradation of the polymer, and it is impossible to obtain a good plexifilamentary fiber in a stable state. When a molecular weight of the polymer reaches too high a value, the above difficulty increases, and when the molecular weight of the polymer exceeds a certain molecular weight, the polymer is not substantially dissolved. When manufacturing a plexifilamentary fiber by using the flush spinning operation, the use of a polymer having a high molecular weight becomes necessary, in view of the strength, toughness and various resistance properties of the obtained product. Further, since the polymer is spun in a state of a solution in the flash spinning operation, it is possible to use a polymer having a high molecular weight which cannot be spun in a conventional melt spinning method. Note, the utility of the flash spinning fully appears when a polymer having a high molecular weight, and to which melt spinning is difficult to apply, is used.

However, the difficulty of dissolving the polymer becomes larger when increasing the molecular weight of the polymer in the conventional known technique, and a situation wherein it is impossible to continuously and stably obtain a plexifilamentary fiber having desirable properties obtained by utilizing the flash spinning, occurs.

It appears that the cause of the above situation is in an affinity between the polymer and the solvent. Namely, flash spinning is a technique using a change of a construction of the solution, a flashing power, and a solidification of the polymer occurring because a pressure of an uniform solution under a high temperature and a high pressure is reduced by a pressure let-down orifice and is extruded from a spinning nozzle, as disclosed in U.S. Pat. No. 3,227,794. Therefore the affinity between the polymer and the solvent is extremely important. From the above, a solvent capable of being used in the flash spinning process is selected from solvents which do not dissolve the polymer under a normal temperature and a normal pressure, but can form a uniform solution with the polymer under a high temperature and a high pressure. Therefore, the polymer.solvent group used in the flash spinning is a group capable of dissolving each other only under a high temperature and a high pressure, and it is apparent that the solvency decreases when the polymerization degree becomes large.

A spinning condition must become optimum and a uniform solution of the polymer and the solvent supplied continuously to obtain a plexifilamentary fiber having desirable properties and shape. Especially, when a polymer having a high molecular weight is used, a technique different from a conventional technique is needed.

Another big problem in the conventional technique is a stirring shaft in a mixing.solution vessel. Namely, in a conventional technique, either a method for obtaining a uniform polymer solution by using a stirring vessel driven by an outer driving source, or a method for obtaining the uniform polymer solution by using a very long pipe line for a long time, can be used. In the latter case, since the mixing is not controlled, a substantially uniform solution of a polymer having a high molecular weight which is practically valuable is not obtained.

Therefore, although the former method, i.e., the method using the stirring shaft, is practical, since this method includes a sliding portion in an apparatus thereof, it is impossible to raise a pressure over a certain constant pressure, and problems arise such that it is necessary to arrange an expensive sealing mechanism for a special sliding portion, or the like.

To form a solution under a high temperature and a high pressure as well as a condition effectively creating an affinity between the polymer and the solvent in the polymer.solvent group for the flash spinning, the higher in the pressure, the greater the dissolving speed at the same temperature, and a uniform polymer solution can be smoothly obtained.

This applies also to the molecular weight of the polymer, and when the molecular weight of the polymer becomes to high, it is necessary to apply a high pressure to dissolve same. However, it is impossible to obtain a high pressure capable of dissolving a polymer having a high molecular weight, due to a problem of the sealing mechanism in the sliding portion, so that the spinning of the polymer having a high molecular weight is practically difficult.

A spinning method which is suitable for a high pressure process is strongly desired, from the viewpoint of a prevention of retrogradation of the polymer and the use of a polymer having a high molecular weight.

C & E U.S. Pat. No. 3,227,794 discloses, in column 23, from lines 43 to 49, an important technique in the flash spinning method, in which technique a polymer is spun after a polymer solution is changed from a single-liquid-phase region to a two-liquid-phase region, and a pressure utilizable in a pressure let-down chamber depends on a temperature of a spinning dope and has an upper limit. Namely, the flash spinning must be performed in a lower pressure region from a phase separating line, and consequently, there is a problem that utilization of a flash power of a solvent is limited.

This will be explained with reference to FIG. 1. FIG. 1 is an example illustrating a state of phases of a high-density polyethylene and a trichlorofluoromethane. The line EF is the phase separating line, i.e., a phase equilibrium line, and an upper portion from this line is a single-liquid-phase and a lower portion from this line is a two-liquid-phase. The point whereat the solution is changed from the single-liquid-phase region to the two-liquid-phase region in the conventional technique corresponds to the point whereat the solution changes from a condition at point C to a condition at point D in FIG. 1. Namely there is a limit to a pressure in a pressure let-down chamber in a state before the solution is extruded.

In the flash spinning, a high speed spinning is obtained by flashing the solvent, and therefore a withdrawing tension or drawing tension is not necessary, and a fiber forming and a drawing and orientation of the fiber is performed only by the energy of the solution; different from a conventional melting spinning or a conventional dry spinning.

Especially, the drawing and orientation of the fiber is obtained by a flashing power of the solution, and the higher the temperature and pressure, the higher the flashing power, and the obtained fiber has excellent qualities. Therefore, the conditions of the pressure let-down chamber in a state before the fiber forming are extremely important when trying to obtain a fiber having a high orientation and a high strength.

The pressure in the pressure let-down chamber has an upper limit corresponding to each temperature, as disclosed in the above known technique. Therefore, an attempt to raise a temperature of the solution has been made, but this raising of the temperature caused a thermal cracking of the polymer.solvent group. This thermal cracking was caused by an interaction between the polymer and the solvent, and a halide ion was liberated in the solvent, deterioration caused by drawing out the hydrogen appeared in the polymer, and the thermal cracking was accelerated when both materials were present. The higher the temperature, the more intense the thermal cracking. When a thermal stabilizer is used in accordance with a temperature used, a residence time for dissolving, and a spinning, or the like, some effect can be obtained, but it is impossible to completely prevent the thermal cracking by the above-mentioned method. Therefore, for example, when polyethylene and trichlorofluoromethane (hereinafter, referred as "fron-11") are used, it is difficult to spin them at a temperature of more than 190° C.

Thus, the practice of the flashing force has been limited in the conventional technique, and especially, a further improvement is required from the viewpoint of a strength of the plexifilamentary fiber.

Accordingly, an object of the present invention is to provide a high-density polyethylene plexifilamentary fiber having a higher strength obtained by further utilizing the solvent flashing power caused by activating the solution, drawing and orientating in the flash spinning method using a high-density polyethylene, and a fron-11, which are useful to industry, and a novel method capable of manufacturing the above plexifilamentary fiber.

F A nonwoven fabric using a fiber manufactured by the flash spinning and having a three-dimensional network construction has been variously applied by using a feature of a specific fiber construction thereof. As disclosed in the above-mentioned U.S. Pat. No. 3,169,899, a fiber left in an extruded state is used for the nonwoven fabric. Namely, a simple process in which the flash spun fiber is spread by an obstacle or the like to make a sheet, and the sheet is then heat-bonded, is adopted.

A paper-like nonwoven fabric including in some degree both an nontransparency, a covering power and a mechanical strength belonging to the three-dimensional plexifilamentary fiber is disclosed in U.S. Pat. No. 3,532,589. Namely, this nonwoven fabric has a nonwoven fabric construction in which each layer arranged in the direction of thickness of a sheet has a specific surface area of between 0.5 $m^2$/g and 5.0 $m^2$/g and the specific surface area in an inner layer is higher than that of the other layers by at least 0.3 $m^2$/g.

However, it became apparent during research by the inventors of the present application that, even if the nonwoven fabric has the above-mentioned construction, the qualities thereof are not satisfactory. Further even if conventional known constructions are applied to the nonwoven fabric, a nonwoven fabric satisfying both the mechanical properties and covering power cannot be obtained. Namely, the non transparency, the covering power, a tensile strength and a tear strength, which are physical properties expected of a three-dimensional plexifilamentary fiber nonwoven fabric, are extremely inferior.

When heat-bonding is applied to a nonwoven sheet, a relationship between a tensile strength and a tear strength of the obtained nonwoven fabric is substantially anticorrelational. Therefore, there a problem arises in that, when one of the above two strength requirements is satisfied, another is sacrificed. Generally a fiber sheet to which bonding is not applied has a high tear strength, but the tensile strength is weak, and a surface of the sheet is completely free of fluffs. Although it is possible to raise the tensile strength and prevent the fluff on the surface by applying the heat-bonding, the tear strength becomes too low. This tendency is enhanced by making the degree of the heat-bonding stronger.

A nonwoven fabric composed of a plexifilamentary fiber has many applications using a specific high covering power of the fiber, per se, and a nontransparency is one of the important features of the fiber. When the degree of heat-bonding is enhanced to obtain a strong tensile strength, the non transparency becomes inferior. If a too strong heat-bonding is applied, the nonwoven fabric becomes a film-like sheet having a high transparency.

Therefore a plexifilamentary fiber nonwoven fabric having a desirable relationship between the tensile strength and the tear strength and an excellent nontransparency is now required, in particularly, a nonwoven fabric having a tensile strength and tear strength of a high value in a unit weight of 60 $g/m^2$ or less and having an excellent nontransparency and covering power is required.

An object of the present invention is to provide the nonwoven fabric described hereinbefore.

G Various heat-bonding processes are applied to a nonwoven sheet of a three-dimensional plexifilamentary fiber to provide shape retention, an effective strength, a fixing of surface fluff, or the like. Usually, such a sheet is constructed of a plurality of layers made by spreading and overlapping the three-dimensional plexifilamentary fibers, and therefore, it is possible to provide different bonding state between the fibers in each layer, in a cross sectional direction of the sheet.

A nonwoven fabric having at least one layer having a degree of bonding which is loose in the plurality of layers constituting the nonwoven fabric is included as one of the nonwoven fabrics in accordance with the object of the present invention. Namely, a nonwoven fabric having a plexifilamentary fiber which is partially nonwelded and is in an independent state at a surface layer of the nonwoven, or an inside layer obtained when the nonwoven fabric is separated into individual layers, are included in the nonwoven fabric of the present invention. Therefore, this kind of the nonwoven fabric is a nonwoven fabric having an excellent bulkiness, softness and covering power, and a high tear strength.

For example, a nonwoven fabric, Tyvek®, type 14, supplied from E. I. Du Pont Co., made by applying a partial heat-bonding to a sheet of a high-density polyethylene three-dimensional plexifilamentary fiber is known as the above type of nonwoven fabric. This nonwoven fabric is comprised of surface layers to which a relatively strong heat-bonding is applied and inner layers to which a relatively loose heat-bonding is applied, and an embossed pattern is produced thereon by press-welding the nonwoven fabric. When the nonwoven fabric is separated into individual layers, it is possible to pull out an independent and continuous plexifilamentary fiber having a length of 20 mm or more from the inner layer to which the relatively loose heat-bonding was applied.

However, there are several problems relating to quality in this conventional known nonwoven fabric. Namely, this nonwoven fabric do not have a satisfactory nontransparency, covering power, tensile strength, and tear strength, which are the most essential features of a three-dimensional plexifilamentary fiber nonwoven fabric.

H & I It is impossible to obtain a nonwoven fabric having a satisfiable uniformity, even if a known technique of a method of manufacturing a nonwoven fabric composed of a plexifilamentary fiber is used.

This nonwoven fabric has a highly irregular fiber width of an spread three-dimensional plexifilamentary fiber constituting the nonwoven fabric, and includes many fluxes collected therein and having an extremely high fiber density. Accordingly, this nonwoven fabric has an non-uniform appearance of a mixture of portions having a large fiber density and portions having a small fiber density, and have a very irregular unit weight.

This nonwoven fabric cannot be used for applications requiring a uniformity of the nonwoven fabric such as a filter or sanitary goods, and in particular, since a portion having a small fiber density is provided with pinholes in the nonwoven fabric having a unit weight of 40 $g/m^2$ or less, it is impossible to use this nonwoven fabric in a field requiring a sealing property for a liquid, bacteria or the like.

Further, the application of this nonwoven fabric is extremely limited due to the non-uniform appearance and irregularity of the unit weight of the nonwoven fabric.

Therefore, although an improvement of the uniformity of the nonwoven sheet composed of the flash spun three-dimensional plexifilamentary fibers is required, there are no nonwoven fabrics satisfying the above requirement, or a method for attaining such a nonwoven fabric.

An object of the present invention is to provide a flash spun nonwoven fabric having a uniformly spread fiber and capable of use for applications such as a filter, sanitary goods or the like, and a manufacturing method thereof.

DISCLOSURE OF THE INVENTION

An object of the present invention is to provide a novel and useful three-dimensional plexifilamentary fiber of a high-density polyethylene group, various novel nonwoven fabrics composed of the above fiber, and a method for manufacturing the fiber and nonwoven fabrics. In particular, the present invention aims to provide the following:

First, a fiber (A) formed in a three-dimensional network shape and having extremely high thermal mechanical properties and extremely high strengths.

Second, a fiber (B) manufactured by a manufacturing method using a screw type extruder and sealing an entrance of a dissolving area of a polymer with a melted polymer in a flash spinning method.

Third, a fiber (C) manufactured by a manufacturing method of activating a polymer solution by creating a big difference in the pressure in the flash spinning method.

Four, a manufacturing method (D) for manufacturing the above fiber (A), using the screw type extruder and sealing the entrance of the dissolving area of the polymer with the melted polymer in the flash spinning method.

Five, a manufacturing method (E) for manufacturing the above fiber (A), activating the polymer solution by creating a big difference in the pressure in the flash spinning method.

Six, a nonwoven fabric (F) made of the above fiber (A) and having a high specific surface area in an inside layer and high mechanical properties.

Seven, a nonwoven fabric (G) made of the above fiber (A), capable of allowing a pull out of an independent and continuous fiber, and having an excellent covering factor and strength.

Eight, a nonwoven fabric (H) composed of the above fiber (A) and having an excellent uniformity of a unit weight and appearance.

Nine, a manufacturing method (I) for manufacturing the above nonwoven fabric (H) having the excellent uniformity by a dispersing device having a special construction, and under a special dispersing condition.

The first object of the present invention is attained by a fibrillated three-dimensional plexifilamentary fiber of a high-density polyethylene group characterized in that said fiber has a long period scattering strength ratio.

The second object of the present invention is attained by a fibrillated three-dimensional plexifilamentary fiber of a high-density polyethylene group obtained by a method of manufacturing the plexifilamentary fiber in accordance with a flash spinning method including the steps of continuously supplying a polymer melted by a heated screw extruder to a dissolving area of a polymer in the extruder, adding a solvent to the melted polymer in a state such that an entrance of the dissolving area is sealed by the continuously supplied melted polymer, mixing and dissolving the polymer and the solvent under a high pressure to make a polymer solution, and continuously extruding the polymer solution from a nozzle arranged on the dissolving area to a low pressure region.

The third object of the present invention is attained by a fibrillated three-dimensional plexifilamentary fiber of a high-density polyethylene group obtained by a method of manufacturing the plexifilamentary fiber in accordance with a flash spinning method; wherein a high pressure uniform solution composed of a polymer of a high-density polyethylene group and a trichlorofluoromethane is extruded through a spinning apparatus comprising of a pressure let-down orifice, a pressure let-down chamber and a spinning nozzle into a low pressure region, and a large pressure difference is created between an upstream portion and an downstream portion of the pressure let-down orifice, to activate a liquid.

The fourth object of the present invention is attained by a method of continuously manufacturing a three dimensional plexifilamentary fiber of a high-density polyethylene group in accordance with the flash spinning method, characterized in that the manufacturing method comprises continuously supplying a polymer melted by a heated screw extruder to a dissolving area of the polymer in the extruder, adding a solvent to the melted polymer in a state such that an entrance of the dissolving area is sealed by the continuously supplied melted polymer, mixing and dissolving the polymer and the solvent under a high pressure to make a polymer solution, and continuously extruding the polymer solution from a nozzle arranged on the dissolving area to a low pressure region.

The fifth object of the present invention is attained by a method of manufacturing a three-dimensional fiber of a high-density polyethylene group wherein a high pressure uniform solution composed of a polymer of a high density polyethylene group and trichlorofluoromethane is extruded through a spinning apparatus comprised of a pressure let-down orifice, a pressure let-down chamber and a spinning nozzle into a low pressure region, and a large pressure difference is created between an upstream portion and a downstream portion of the pressure let-down orifice, to activate a liquid.

The sixth object of the present invention is attained by a nonwoven fabric having a high tensile strength and a high tear strength and comprising surface layers formed by overlapping in random directions a fibrillated continuous three-dimensional plexifilamentary fiber of a high-density polyethylene group, which are firmly heat-bonded to each other, and inner layer(s) formed in the same manner as that of the surface layers, heat-bonded by a weaker bonding force than that for the surface layers, and associated with the surface layers, and wherein a specific surface area of the inner layer is more than 5 $m^2/g$.

The seventh object of the present invention is attained by a nonwoven fabric composed of a three-dimensional plexifilamentary fiber wherein the nonwoven fabric is formed by overlapping, in random directions, fibrillated three-dimensional plexifilamentary fibers of a high-density polyethylene group and includes layers comprising independent plexifilamentary fibers which are partially nonwelded, the independent plexifilamentary fibers having a long period scattering strength ratio of 40 or less.

The eighth object of the present invention is attained by a uniform nonwoven fabric made by overlapping spread three-dimensional plexifilamentary fibers of a high-density polyethylene group in random direction, wherein a flux portion existing in the continuous plexifilamentary fiber constituting the nonwoven fabric is a flux portion having a density of 40 denier per a width of 1 mm or less, or when the flux portion has the density of 40 denier per a width of 1 mm or more, a width of the flux portion is 5 mm or less and a length of the flux portion is 30 mm or less.

The ninth object of the present invention is attained by a method of manufacturing a uniform nonwoven fabric of plexifilamentary fibers, which uses a diffusing and swinging rotational dispersion plate comprised of a rotatable disk, a cylindrical portion extending from a center of the disk in a perpendicular direction and having a cylinder outer surface, a diameter of which is smaller than that of the disk, and a skirt portion arranged in an inclined state in a space between one surface of the disk and the cylindrical outer surface of the cylindrical portion, the skirt portion being comprised of a plurality of a swinging face for swinging an unspread three-dimensional plexifilamentary fiber flown in a direction substantially parallel to an axis of the cylindrical portion and a cushioning face arranged alternately with the swinging face and capable of cushioning a sudden change of the direction of the three-dimensional plexifilamentary fiber swung by the swinging face, characterized in that an inclined angle a between a center of the swinging face of the skirt portion and an upper surface of the disk is substantially the same as an inclined angle β between a center of the cushioning face and the upper surface of the disk, and the cushioning face has a fan-like shape, a width of a portion near to the disk of which is wider than a width of a portion near to the cylindrical portion.

BRIEF DESCRIPTION OF THE DRAWINGS

FIG. 14 is a detailed view of a shape of the rotational dispersion plate illustrated in FIG. 13, wherein

FIG. 19 is a microscopic view illustrating a cross section of a nonwoven fabric, wherein FIG. 19(b) shows the cross section of a comparative example of the known nonwoven fabric; and, FIG. 20 is a photograph illustrating a surface of a nonwoven fabric wherein

BEST MODE FOR CARRYING OUT THE INVENTION

The present invention will be described in detail hereinafter in connection with the accompanying drawings, which are used for explaining a plexifilamentary fiber in accordance with the present invention, a nonwoven fabric made of the above plexifilamentary fiber, and a method of manufacturing the above nonwoven fabric, to enhance the understanding of the present invention.

As described hereinbefore, a fiber in accordance with the present invention is a fiber formed from a polymer of a high-density polyethylene group, and is comprised of a number of fine fibrils and is a continuous three-dimensional plexifilamentary fiber having substantially no free ends.

As is well known, this kind of three-dimensional plexifilamentary fiber can be obtained by using a flash spinning process. But, the three-dimensional plexifilamentary fiber in accordance with the present invention is a novel fiber which is completely different from a conventional known fiber in a fine structure of the fiber and a fine thickness of a fibril. Therefore the three-dimensional fiber in accordance with the present invention has excellent mechanical strength properties and stability under a high temperature, and is especially suitable for the manufacture of a heat-bonded nonwoven fabric.

A feature of the fiber in accordance with the present invention is the fine structure of the fiber, i.e., a long period construction in an axial direction of the fiber. This can be clearly seen from a measurement of a X-ray small angle scattering pattern.

Figure 2:
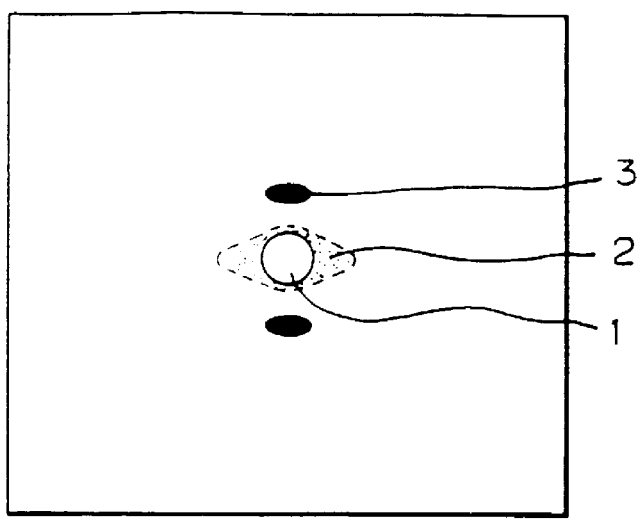
FIG. 2 is a view of an X-ray small angle scattering pattern of a plexifilamentary fiber in accordance with the present invention.

FIG. 2 is schematic illustration of a small angle scattering photo of the fiber in accordance with the present invention.

FIG. 2 shows a scattering pattern 2 showing the existence of a fibril and void on an equator near to a direct beam 1 and a meridian reflection pattern 3 on a meridian line. Generally a ring-like reflection, a meridian reflection, a tilted two-point reflection, a tilted four-point reflection or the like, are known as a pattern of a low-angle scattering of X-rays in a long period of a high polymer substance, and it is understood that a construction in a long period of a fiber in accordance with the present invention is similar to that of a drawn fiber obtained through a conventional spinning and drawing.

An analysis of a scattering peaks in a direction of a meridian measured by a position sensible type proportional counter (PSPC) shows that a plexifilamentary fiber in accordance with the present invention has a long period of between 150 Å and 200 Å, and an unexpected feature wherein the scattering strength shown by the long period of the plexifilamentary fiber in accordance with the present invention is not large, is found. Namely, in view of the meaning of the scattering strength in the long period, a small value of the scattering strength means that a construction in the long period is not uniform or clear, and that the above construction does not have preferable mechanical properties and thermal properties for a fine construction of the fiber. However, a three-dimensional plexifilamentary fiber in accordance with the present invention has an unexpectedly relatively small scattering strength, and thus the plexifilamentary fiber in accordance with the present invention provides a novel construction of the fiber. Accordingly, the plexifilamentary fiber in accordance with the present invention has an excellent quality at a high temperature near to a melting point due to the above novel construction, and becomes a three-dimensional plexifilamentary fiber available for a thermal bonding nonwoven fabric.

A long period and a long period scattering strength ratio are determined to find a feature of the plexifilamentary fiber. The long period and the long period scattering strength ratio will be explained hereinafter.

Figure 3:
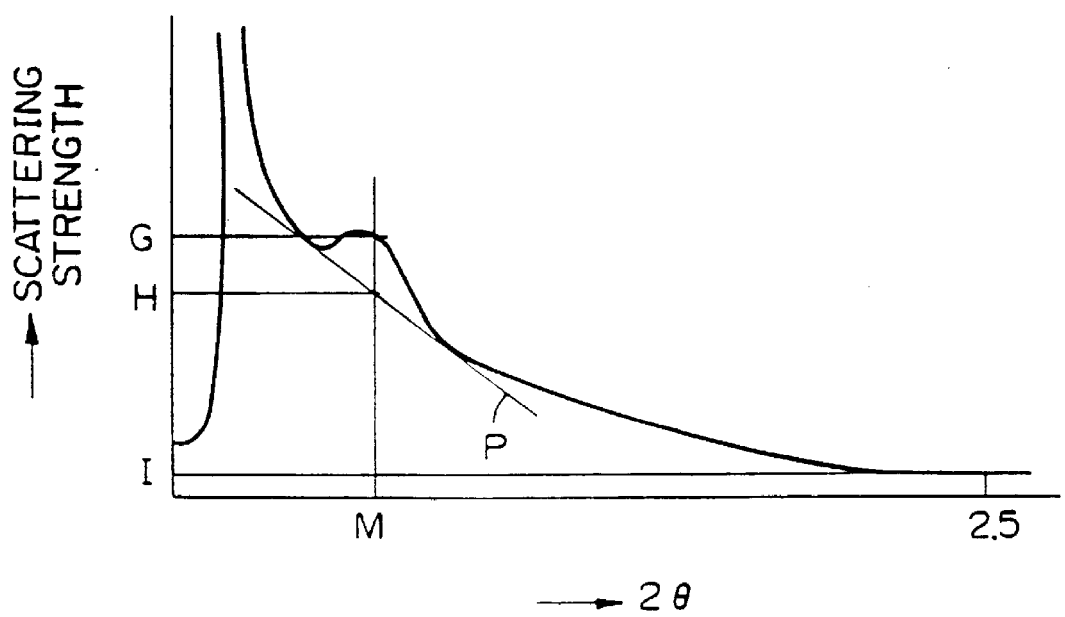
FIG. 3 is a view of a method for obtaining a long period scattering strength ratio in PSPC of the X-ray small angle scattering.

FIG. 3 shows a graph of an actual value of a scattering strength in a direction of a meridian measured by PSPC against a long period scattering angle (2θ). A value of a maximum scattering strength in a peak point or a shoulder point of a scattering strength curve is defined as M on the long period scattering angle (2θ). A line P in FIG. 3 is a common tangent on crooks of both side of the peak point or the shoulder point of the scattering strength curve. The value of the actual scattering strength corresponding to the angle M is defined as G, the value of the scattering strength on line P corresponding to the angle M is defined as H, and an actual scattering strength corresponding to the angle of 2.5° is defined as I, indicating a blank value. A scattering strength ratio R is calculated by the following equation.

$$R = ^{G-H}/I$$

A long period L can be obtained by combining the following equations.

$$2\theta = M$$

$$L = \frac{\lambda}{2\sin\theta} \quad \text{(Bragg's equation)}$$

The value of the long period of the three-dimensional plexifilamentary fiber in accordance with the present invention is between 150 Å and 200 Å, and the value of the long period scattering strength ratio is 40 or less.

The low-angle scattering of X-ray described hereinbefore is measured by the following device and method. An X-ray diffraction device, RU-200-PL supplied from Rigaku Denki Co., is used and the X-ray is a Cu-Kα having a wave length of 1.54 Å, and a first slit of 0.5 mmφ and a second slit of 0.3 mmφ are used as pinhole slits. A measurement is performed at an electrical voltage of 45 KV, an electrical current of 140 mA and a time of radiation of 2×10³ sec. A sample to be measured is prepared by aligning a plurality of the network fibers such that a width in a portion to be radiated of the sample is about 2.5 mm. The thermal properties of the fiber can be obtained by various measuring methods, and those measurements of the thermal physical properties are performed when the fibers do not have a twist, assuming that the fibers are used to make a nonwoven fabric.

The plexifilamentary fiber in accordance with the present invention has a feature that the thermal mechanical property at a temperature near to a thermal bonding temperature is excellent and an elongation under a heat is small. Namely, when a measurement of the elongation of the fiber under heating is performed by using a YM-3000 Thermal Machine Tester supplied from Shinku Rikosha Co., at a raising speed of a temperature of 2° C./min and a constant load (g) corresponding to a value of 10% of a denier of the fiber tested, the elongation at 130° C. of the fiber in accordance with the present invention is preferably 3% or less, more preferably 2% or less.

Further, a thermal property and a dynamic property can be obtained by a measurement using a vibron.

Namely, the plexifilamentary fiber in accordance with the present invention has a high dynamic elastic modulus at a high temperature; for example, a temperature when the dynamic elastic modulus becomes $10^{10}$ dyne/cm² is preferably 115° C. or more. The stability of a crystal at a high temperature can be evaluated by a starting temperature of a crystal dispersion in tanδ. The fiber in accordance with the present invention preferably has a starting temperature of the crystal dispersion of 123° C. or more, more preferably 125° C., and thus the stability of the crystal at a temperature near to a bonding temperature is excellent. The above measurement is performed by using a dynamic viscoelastic measuring device, and in the present invention, RHEOVIBRON DDV-II-EA supplied from Toyo Baldwin Co., Ltd. is used under a frequency of 110 HZ and a raising speed of a temperature of 1° C./min.

As described hereinbefore, the thermal stability and the thermal mechanical properties at a high temperature are excellent, and those features are obtained by a fine structure of the fiber in accordance with the present invention.

Further, the fiber in accordance with the present invention is a highly orientated fiber, and this is clarified by measuring an orientation angle of a crystal by X-ray diffraction. Namely, the orientation angle of the X-ray of the fiber in accordance with the present invention is preferably 30° or less, more preferably 20° or less.

It is known that an orientation of a crystal portion and an amorphous portion of a high polymer can be measured by an infrared absorption dichroism, which is evaluated as a dichroic orientation coefficient $F_D$.[20] The dichronic orientation coefficient of the fiber in accordance with the present invention at 2017 cm$^{-1}$, which is a parallel dichroism of a polyethylene, is preferably 0.3 or more. In the present invention, the above value is measured by JIR-100 FTIR Device supplied from Nihon Denshi Co., and a method using KRS-5 as ATR crystal.

Further, a birefringence of a fiber measured by a micro wave can be used to show a degree of orientation of a molecular. The birefringence of the plexifilamentary fiber in accordance with the present invention measured at 4 GHz by a MOA-2001A micro wave molecular orientation tester supplied from Kanzaki Seishi Co., is preferably 0.13 or more.

As described hereinbefore, the three-dimensional plexifilamentary fiber in accordance with the present invention is a highly orientated fiber having an extremely excellent quality.

The three-dimensional plexifilamentary fiber in accordance with the present invention has an extremely excellent mechanical strength. The three-dimensional fiber is divided in a network state, and when a tensile strength and elongation of the fiber are as desired, a slipping out phenomenon occurs between fiber elements to cause a large variance of the value obtained. Therefore, in the present invention the measurement of the tensile strength is performed after applying a twist of 4 turn per/cm to the fiber. The fiber in accordance with the present invention has an initial modulus of between 15 g/d and 50 g/d, preferably between 20 g/d and 50 g/d, and a breaking strength of 4 g/d or more, preferably 7 g/d or more, under the condition described hereinbefore.

The fiber having a high strength shown in the present invention was not known as a three-dimensional plexifilamentary fiber left in an extruded state.

With regard to a fibrillated state, preferably the three-dimensional plexifilamentary fiber in accordance with the present invention is constituted with extremely fine fibrils, and a specific surface area of the three-dimensional plexifilamentary fiber is 30 m²/g or more.

It is known to use the specific surface area as a measure expressing a fineness of the fibril constituting the three-dimensional plexifilamentary fiber as disclosed in U.S. Pat. No. 3,169,899. The three-dimensional plexifilamentary fiber is clearly constituted with finer fibrils, compared with a known fiber. The specific surface area of the plexifilamentary fiber in accordance with the present invention is preferably 30 m²/g or more, more preferably 35 m²/g or more, and it is possible to obtain a plexifilamentary fiber having the specific surface area of 100 m²/g or more.

Since the plexifilamentary fiber in accordance with the present invention is constituted with finer fibrils, a whiteness, a covering power and an absorptivity of the plexifilamentary fiber are excellent compared with a conventional known fiber. When a nonwoven fabric is manufactured with those fibers, the fiber can be easily spread to make an uniform sheet, and then it is possible to apply several excellent features, such as a large surface area, a good heat-bonding property, a high whiteness, a high nontransparency, an excellent absorptivity, and excellent filtering characteristics, to the nonwoven fabric.

The specific surface area can be obtained by a nitrogen adsorption method, and the specific surface area is measured by using a Sorptomatic 1800 supplied from CARLO ERBA Co.

A porosimeter for measuring a porous distribution by a method of pressing a mercury into a fiber, may be used as a measurement of the fineness of a fibril, and in this case the quantity of the mercury pressed into the fiber in accordance with the present invention is high compared with the conventional known fiber, and it is apparent that the fiber in accordance with the present invention is constituted with fine fibrils.

Although the three-dimensional plexifilamentary fiber is constituted with the extremely fine fibrils, the fiber has a special fiber construction in a long period. The fiber has an excellent quality at a high temperature near to a melting point, and has a useful quality in which a mechanical strength thereof is higher than that of the conventional fiber. Generally in the fiber, when a specific surface area of the fiber is increased, a degree of irregularity in shape of a cross section of the fiber is increased, and a mechanical strength of the fiber is lowered. However, an increase of the specific surface area and an increase of the mechanical strength in the three-dimensional fiber in accordance with the present invention are compatible, and this can not be concerned from an ordinary concept.

The fiber in accordance with the present invention is a three-dimensional plexifilamentary fiber and can be obtained by a spinning method known as a flash spinning. A preferable example for obtaining the three-dimensional plexifilamentary fiber in accordance with the present invention will be explained hereafter.

The three-dimensional fiber in accordance with the present invention can be obtained by flash spinning using a polymer and a solvent. However a flash spinning method used to obtain the fiber in accordance with the present invention is completely different from a conventional known method.

A technique whereby a polymer solution is extruded from a spinning nozzle after the polymer is changed from a single-liquid-phase to a two-liquid-phase, by reducing a pressure of the polymer solution in a pressure let-down orifice, is disclosed in U.S. Pat. No. 3,227,794 as an important technique in flash spinning for obtaining a conventional known three-dimensional plexifilamentary fiber.

The inventors of the present invention noted that a factor determining a construction of a fiber manufactured by flash spinning depends on a phase separation construction of the polymer and the solvent, and arrived at a concept of a novel three-dimensional plexifilamentary fiber in accordance with the present invention by finding a new flash spinning mechanism. In this novel flash spinning technique, a polymer solution is extruded from a spinning nozzle after making an activated construction different from a phase separation construction manufactured by a conventional known change from a single-liquid-phase to a two-liquid-phase by instantaneously activating a uniform solution of the polymer to form a fiber construction based on the above activated construction. The term "Activation" herein means to increase a pressure loss, namely, to increase the pressure difference between an upstream portion and a downstream portion of the pressure let-down orifice, when a polymer liquid passes through a pressure let-down orifice, and the activation is performed by applying the pressure difference of at least 80 kg/cm², preferably 120 kg/cm² or more. This activation is caused by a large swing phenomenon of a density or a concentration, and a construction in which a phase of the solution is separated to an extremely fine state is temporarily applied. Then the three-dimensional plexifilamentary fiber in accordance with the present invention is obtained by extruding the polymer solution in the above state by a spinning nozzle. Namely, the solvent released from the above finely activated construction to a low pressure and a low temperature area is suddenly vaporized, and a flash power which expands applies an orientation on a polymer, which starts to coagulate, and thus a three-dimensional plexifilamentary fiber oriented highly is formed.

This activation is simultaneous, and even if spinning is performed from single-liquid-phase region in a phase diagram measured by a static equilibrium state, a preferable three-dimensional plexifilamentary fiber can be obtained. Therefore, the fiber obtained from the above activated construction is a high strength three-dimensional fiber constituted from extremely fine fibrils and having a specific surface area of 30 m²/g or more and a special long period construction as described hereinbefore.

It is clear that the activation of the solution composed of the above polymer and a solvent operates effectively for a polymer having a large polymerization degree and a narrow range of a molecular weight distribution, by increasing the pressure difference, as shown by research of the inventors.

A fiber in accordance with the present invention is composed of a high-density polyethylene. The high-density polyethylene mainly used is not especially limited and a high-density polyethylene having a density of 0.94 or more can be used. Further, a polymer composed of a polyethylene unit of 100%, as well as a copolymer polymerized in a random state or a block state with another monomer, except a polyethylene, within 10 mol % may be used. Of course, an additive can be optionally included in the polymer, and a heat stabilizer, an ultraviolet stabilizer, a lubricant, a pigment or the like may be included, in a quantity not affecting the present invention, in the polymer. Further, it is possible to use a blend of the above high-density polyethylene and another polymer, and this blended polymer can be used according to demand. In particular, since the three-dimensional network polymer in accordance with the present invention has a high strength due to a special construction thereof, it is possible to blend the high-density polyethylene with another polymer which cannot be used practically because of a deterioration of the strength, by blending it with the high-density polyethylene. A low-density polyethylene, an ethylene-vinyl acetate copolymer, an ionomer, a polypropylene, a polystyrene, a polymethyl-methacrylate or the like can be used as a polymer blended with the high-density polyethylene.

As described hereinbefore, the fiber in accordance with the present invention is based on a novel fiber forming mechanism, and preferably a polymerization degree of the high-density polyethylene constituting the plexifilamentary fiber in accordance with the present invention is high. Preferably, a melt index i.e., MI, of a spun fiber is 1 or less, preferably 0.5 or less. A measurement of MI is performed under the condition E of ASTM D-1238-57T. Further, a distribution of a molecular weight of the polymer constituting a fiber must be narrow. Namely, even if a polymer having the same value of MI is used, when the distribution of the molecular weight is wide, a fiber having an inferior quality may be obtained. The distribution of the molecular weight of the fiber in accordance with the present invention expressed by Mw/Mn is 15 or less, preferably 10 or less. Of course, the MI of a raw polymer used for manufacturing the fiber in accordance with the present invention is the same as or less than that of the fiber in accordance with the present invention.

A dissolving process to obtain the fiber in accordance with the present invention is not especially limited and a conventional known dissolving process can be used. However, preferably a method in which a polymer is melted and supplied by a screw extruder, and is then mixed and dissolved with a solvent in a mixing tube, is used. Since the fiber in accordance with the present invention is made of a high-density polyethylene having a high molecular weight and a narrow distribution of the molecular weight, it is preferably to dissolve and spin the row polymer in a short time, to prevent a change of property of the polymer. Further, dissolving under a high pressure is suitable due to the dissolving speed and the spinning mechanism in accordance with the present invention.

A solvent used to obtain the fiber in accordance with the present invention is not especially limited to a solvent capable of being used for flash spinning, and a conventional known solvent may be used. A fron-11, a methyl chloride, a hydrocarbon halide such as a trichlorotrifluoroethane or the like, a hydrocarbon such as a cyclohexane or a mixed liquid thereof, are preferably used as the solvent.

A spinneret assembly to obtain the fiber in accordance with the present invention is not limited to one having the above spinning mechanism. Namely, one having a conventional known shape may be optionally used as a pressure let-down orifice, a pressure let-down chamber, a nozzle or the like.

Next, a method for manufacturing a three-dimensional plexifilamentary fiber in accordance with the present invention will be described.

First, a manufacturing method using a dissolving type melted polymer sealing method belonging to the above classification D is explained.

The manufacturing method belonging to the classification D is characterized in that the method is comprised of continuously supplying a polymer melted by a heated screw extruder to a dissolving area of the polymer in the extruder, adding a solvent to the melted polymer in a state that an entrance of the dissolving area is sealed by the continuously supplied melted polymer, mixing and dissolving the polymer and the solvent under a high pressure to make a polymer solution, and continuously extruding the polymer solution from a nozzle arranged on the dissolving area, to a low pressure area.

Preferably, the above method is a method of continuously manufacturing the plexifilamentary fiber in which the mixing and the dissolving between the polymer and the solvent performed in the polymer dissolving area are performed at least by using a mechanical mixing area arranged on a screw of the extruder.

More preferably, the above method is a method of continuously manufacturing the plexifilamentary fiber in which the mixing and the dissolving between the polymer and the solvent is performed by a multistage process in the polymer dissolving area.

Preferably, the above method is a method of continuously manufacturing the plexifilamentary fiber in which an adding of the solvent, and the mixing and the dissolving between the polymer and the solvent is preformed by a multistage process in the polymer dissolving area.

Preferably, the above method is a method of continuously manufacturing the plexifilamentary fiber in which a content of the polymer is sequentially lowered by mixing and dissolving a polymer and a solvent in the polymer dissolving area each time that the solvent is added, when the adding of the solvent and the mixing and the dissolving between the polymer and the solvent is performed by the multistage process.

More preferably, the above method is a method of continuously manufacturing the plexifilamentary fiber in which at least a first stage in the multistage in which an addition, mixing and dissolving of the solvent into the polymer in the polymer dissolving area are performed, is performed in a mechanical mixing area arranged on a screw of the extruder against the polymer continuously melted and supplied in the screw extruder, when a polymer melted by a screw extruder is continuously supplied, the polymer dissolving area is sealed by the supplied melted polymer and the polymer and the solvent are mixed and dissolved under a pressure.

Further, more preferably, the above method is a method of continuously manufacturing the plexifilamentary fiber in which the addition, mixing and dissolving of the solvent performed in stages after a second stage are performed by a static mixing element, when at least a first stage in the multistage in which at least a first stage in the multistage in which the addition, the mixing and the dissolving of the solvent into the polymer in the polymer dissolving area are performed, is performed in a mechanical mixing area arranged on a screw of the extruder against the polymer continuously melted and supplied in the screw extruder.

A most important feature of the present invention is that a uniform polymer solution having a high temperature and a high pressure can be easily and stably obtained by using a screw extruder. As a result of this feature, leakage of the solution under a high pressure is stopped and it is possible to make the pressure of the solution to a high pressure. If a polymer can be melted and supplied by a screw extruder, even if that polymer has a high molecular weight, the polymer can be easily dissolved.

Further, the polymer and the solvent can be speedily mixed and dissolved under a high pressure and a forced stirring by a big shearing force by using a mechanical mixing area arranged on the extruder. Therefore, the dissolution of the polymer is performed in a short time and a remarkably increased prevention of a retrogradation of the polymer is obtained.

Accordingly, in accordance with the present invention, a polymer having a high molecular weight, in particular an easily retrogradable polymer having a high molecular weight, can be used in a flash spinning by using the method having the above-mentioned constitution.

The technical terms used in the explanation of the manufacturing method in accordance with the present invention will be briefly explained.

The term "polymer dissolving area" means an area wherein the polymer is in a melted state and include the state in which a solvent is not included to a state wherein a predetermined solvent is included. Further, the polymer and the solvent are in a mixed state, including a state wherein the polymer and the solvent mutually dissolve to a state wherein the dissolution of the polymer and the solvent is completed in this area.

The term "seal" means a state wherein a gap is filled with the melted polymer, all of the solvent is not included, and further, the solvent cannot fully enter the gap.

The term "Mixing.Dissolving" means that the polymer and the solvent are mixed and dissolved with each other.

The term "Mechanical Mixing" means a mixing applied by an element forcibly stirring the liquid and driven by an outside driving source.

A high-density polyethylene can be used as a polymer, and a screw extruder used in a manufacture of a fiber, a film or various extrusion molding goods can be used as a continuous supply means in the manufacturing method in accordance with the present invention.

Namely, the screw extruder is comprised of a driving motor, a reduction gear, a polymer supply hopper, and a barrel for heating and melting the polymer. This barrel can be heated by arranging a heater on the barrel. A screw is arranged in the barrel and is connected through a thrust bearing and a reduction gear.

This screw can be divided into three main areas, i.e., a feeding zone, a compressing zone, and a metering zone. The polymer preheated and sent to an exit, is melted under a compressed state in the compression area, and sent to the metering zone. The extruder used in the present invention is provided in the metering zone with a solvent bung hole, and a check valve is arranged on the solvent bung hole. The polymer is connected through the check valve to a high pressure measuring pump for supplying a solvent. The solvent is pressed into the metering zone filled with the melted polymer sent from the feeding zone of the screw, and the polymer and the solvent are mixed and dissolved by the screw in the metering zone. A depth of a groove of the screw is suitably in a position corresponding to the solvent bung hole and slightly deeper than that of grooves of the screw before and behind the position corresponding to the solvent bung hole, to make addition of the solvent easy. A pressure inside the barrel is low compared with a pressure of a portion corresponding to the feeding zone of the screw, in the above constitution, and thus a back flow of the solvent to the feeding zone and spouting of the solvent can be prevented. It is possible to freely change a pressure in the mixing and dissolving portion by changing a dimension of the nozzle at the exit side of the extruder. Therefore, it is possible to obtain a suitable pressure for each type or molecular weight of the polymer. Further it is possible to freely change a retention time of the polymer in this portion by controlling a length of the screw. Namely, it is possible to freely determine a pressure, temperature, and shearing force in a mixing, and the retention time, to make a condition in the mixing and a dissolving area an optimum condition for a polymer and solvent group to be used, and as a result, it is possible to easily and stably obtain a uniform polymer solution.

The polymer and the solvent in the flash spinning can be first dissolved under a high pressure. Therefore, a high pressure vessel is required for preparing the polymer solution. In particular, a high pressure vessel capable of withstanding a temperature of up to 350° C. is required. Further, a high pressure vessel with a stirring device is required.

In this case, a difficult problem arises regarding a sealing of a shaft of a movable shaft. When a polymer having a high molecular weight, e.g., a high-density polyethylene having a melt index (MI) of 4 or less which corresponds to an weight-average molecular weight of $10 \times 10^4$ or more, is used in the flash spinning, a high pressure must be used. If the high pressure is not applied, the molecular weight to be used is limited, and even if a polymer having a relatively low molecular weight is used, the dissolving requires a long time and a retrogradation of the polymer occurs.

The present inventors have developed a technique for shielding by a liquid, i.e., a melted polymer, and the above-problem is solved by this technique. More concretely, spouting of a solvent gas is prevented by filling the polymer into a space between the barrel and the screw in the extruder. An important feature in this case is that the polymer flows toward a top portion of the screw under the condition in which the space is filled with the melted polymer, and therefore a pressure gradient is obtained.

This situation will be described hereafter in detail.

As described in "Engineering Principles of Plasticating Extruder" by Zeher Tadmor and Im Rich Klein of the U.S.A., from page 79 to page 107 and from page 359 to page 400, published by the Van Narstrand Reinhold Company, a maximum pressure is obtained because of an operational condition in the extruder. More concretely, when the screw is divided into a feeding zone, a compressing zone, and a metering zone, the maximum pressure appears upstream and downstream of a starting point of the metering zone, wherein the polymer is already melted. The pressure falls gradually after reaching maximum pressure portion. In particular, when a depth of a groove in the metering zone of the screw is made deeper than a minimum depth of a groove in the compressing zone at which the compression is completed, the pressure falls in almost all cases, and in this case, the maximum pressure appears near to a point where the compression is completed. The sealing of the solvent is performed by using the above pressure.

Therefore it is necessary to adjust a dimension of a shape of the screw to be used. Namely, a length of the feeding zone is made longer, and since a bore of the screw coincides with a pitch of a thread of the screw in almost all cases, preferable examples of a dimension of the screw will be explained hereafter. A length of the feeding zone of the screw is seven pitches or more, preferably nine pitches or more.

Further, a compression ratio of the screw is important for pressure forming, and it is preferable that a compression ratio of 3.0 or more for a pellet type polymer and a compression ratio of 4.0 or more for a powder type polymer, are used. A length of the compressing zone can be five pitches, preferably 7 pitches or more. With regard to a finishing point of the compressing zone, the mixing zone may be arranged near to the starting point of the metering zone. Preferably this mixing zone is short and provides a high shearing force.

Since a feed opening of the solvent is arranged on the metering zone, it preferably has a long length of seven pitches or more, preferably eight pitches or more, and preferably the feed opening of the solvent is arranged on a third or fourth pitch remote from a start point of the metering zone. Of course, a length between the start point and the position where the feed opening is arranged may be a longer length than the above length. Further the bore of the screw in a position where the feed opening of the solvent is arranged is made small, to make supply of the solvent easy. Namely, preferably the depth of the groove is deep. Preferably, the length of this portion is at least two pitches when the bore of the screw is increased or decreased.

The depth of the groove in the metering zone of the screw, it is preferably between 1 mm and 3 mm for an extruder bore of 35 mmφ, between 2 mm and 4 mm for a bore of 65 mmφ, between 2.5 mm and 4.5 mm for a bore of 90 mmφ, between 3 mm and 5 mm for a bore of 120 mmφ, and between 3 mm and 6 mm for a bore of 150 mmφ.

As a gap appears between an outer diameter of the screw and a diameter of the barrel of the extruder, usually a value between 0.1 and 0.8 is adapted, and preferably a small bore is adapted to ensure a narrow gap.

After determining the dimension of the screw as described hereinbefore, an operation condition is determined by a temperature, a rotational speed of the screw, and an extruding quantity. Namely, after an extruding operation starts, at a predetermined temperature, a required rotational speed of the screw and an extruding quality at which the solvent does not overflow a hopper of the solvent, are obtained by trial and error.

For example, when a temperature between 200° C. and 280° C. is used as the extruding temperature for the polyethylene, preferably a pressure at the maximum pressure point inside the extruder is at least 100 kg/cm$^2$·G. Although the extruder may be driven under a condition of 100 kg/cm$^2$·G or less, in this case, the pressure will vary due to variations of the extruded quantity, and spouting of the solvent may occur.

Since the manufacturing method is intended to obtain a plexifilamentary fiber from flash spinning, a material extruded from the extruder is supplied to one of the three following processes:

(1) The material is supplied directly to a spinning apparatus.
(2) The material is supplied to a next mixing device, and then is supplied to the spinning apparatus.
(3) The material is supplied to the next mixing device with a different fresh solvent, and then is supplied to the spinning apparatus.

Although process (1) increases the hold up volume of the mixing zone in the extruder in accordance with the present invention, due to the retention time required for the mixing operation, this is the most simple process, and thus is most preferable.

In the present invention, a solution having a high temperature and a high pressure of a polymer and a solvent is flash extruded and the plexifilamentary fiber obtained. In this flash extruding method, the conventional known technique can be used, and the flash extruding using a spinning assembly constituted with a pressure let-down orifice, a pressure let-down chamber, and a spinning nozzle is preferable. Note, the shape and construction of this apparatus can be freely selected.

The polymer and solvent system used in the present invention is not dissolved under a normal temperature and a normal pressure, but is first dissolved under a high temperature and a high pressure. Therefore, this system belongs to the type of system in which the polymer and solvent are difficult to dissolve, and even if a high temperature and high pressure condition is used, the system does not easily dissolve. Accordingly, preferably a screw of the extruder is provided with a mechanical mixing area. Namely a dissolving surface area is enlarged by enlarging a contact are a between the polymer and the solvent, and thus the polymer and the solvent are speedily dissolved. One method for attaining this provides a special mechanical mixing zone on the same shaft as that of the extruder. The term "special" means a structure aiming at an improvement of a mixing and a stirring effect which is different from that caused by a thread construction of a feeding zone, a compressing zone and a metering zone of a screw of the extruder. For example, a "Dulmage" structure corresponds to the above construction.

In the present invention, the extruder has one drive system, and a screw of the extruder has a melting and feeding zone, a special mechanical zone for mixing the polymer and the solvent, and a solvent pouring zone having a bung in a barrel in a middle portion thereof. This extruder can be formed by connecting a structure having a mixing function or by connecting a barrel having a special mechanical mixing zone with a solvent feed opening to a top end of a screw having a feeding zone, a compressing zone and a metering zone and capable of using for a conventional melt moulding. Further, a mechanism specifically designed for the present invention can be used.

In this preferable embodiment, a melted polymer is supplied by a rotation of the extruder screw, and the melted polymer and a solvent successively supplied by another fixed delivery pump or the like are mechanically mixed by the special structure. This extruder and the structure have the same drive system, and a construction of a sliding portion thereof may be the same as that of the conventional extruder, since the solvent having a low viscosity does not arrive at the sliding portion, since it is obstructed by the melted polymer.

Many structures having a mixing function and capable of mixing the melted polymer and the solvent are known and any of such structures can be used for the present invention. Namely, a dulmage structure, a multi-thread structure, a dam-intercept structure, a multi-row pin structure or the like, or a combination thereof, can be used. Further a dam-intercepter, grooves, or pins can be provided on the barrel and a combination thereof and the above structure may be used. Further, a mechanism having a needler effect due to the polygonal shape of a rotational member and the barrel, can be used. The above means is selected on the basis of the type and melting viscosity of the polymer used, the type of solvent, and the mixing ratio or the like.

Even if a polymer having a high molecular weight is used, it is possible to dissolve the polymer in a short time and without retrogradation into the solvent and a higher quality plexifilamentary fiber can be continuously and stably obtained in the above preferable embodiment.

Methods by which the polymer and the solvent are mixed in multistages, and in which the solvent is added in multistages, and the polymer and the solvent are mixed in multistages, are preferable. But a method in which a part of the solvent is added to an area for mechanically mixing with the solvent and arranged on the screw, and the polymer and the solvent is mixed and dissolved as a first stage, and then a static mixing element is used as a mixing and dissolving means behind the second stage, and the polymer and the solvent are mixed and dissolved by sequentially adding the remaining solvent at each static mixing element is most referable.

A polymer and a solvent necessary to obtain a solution having a predetermined concentration are combined by mixing and dissolving in the above conventional known technique. But the mixing and the dis-dissolving, particularly the dissolving in this method, take a long time, and the polymer solution is not particularly uniform.

Accordingly, the present inventors found that the polymer and the solvent system used in a flash spinning provides the highest concentration of the polymer, dissolvability, and further, is easily dissolved when the pressure becomes too high. As result, the inventors found a further preferable dissolving method using the extruder in accordance with the present invention.

A case wherein a high-density polyethylene and a fron-11, i.e., trichlorofluoromethane system, is used will be explained as an example hereinafter.

Figure 4:
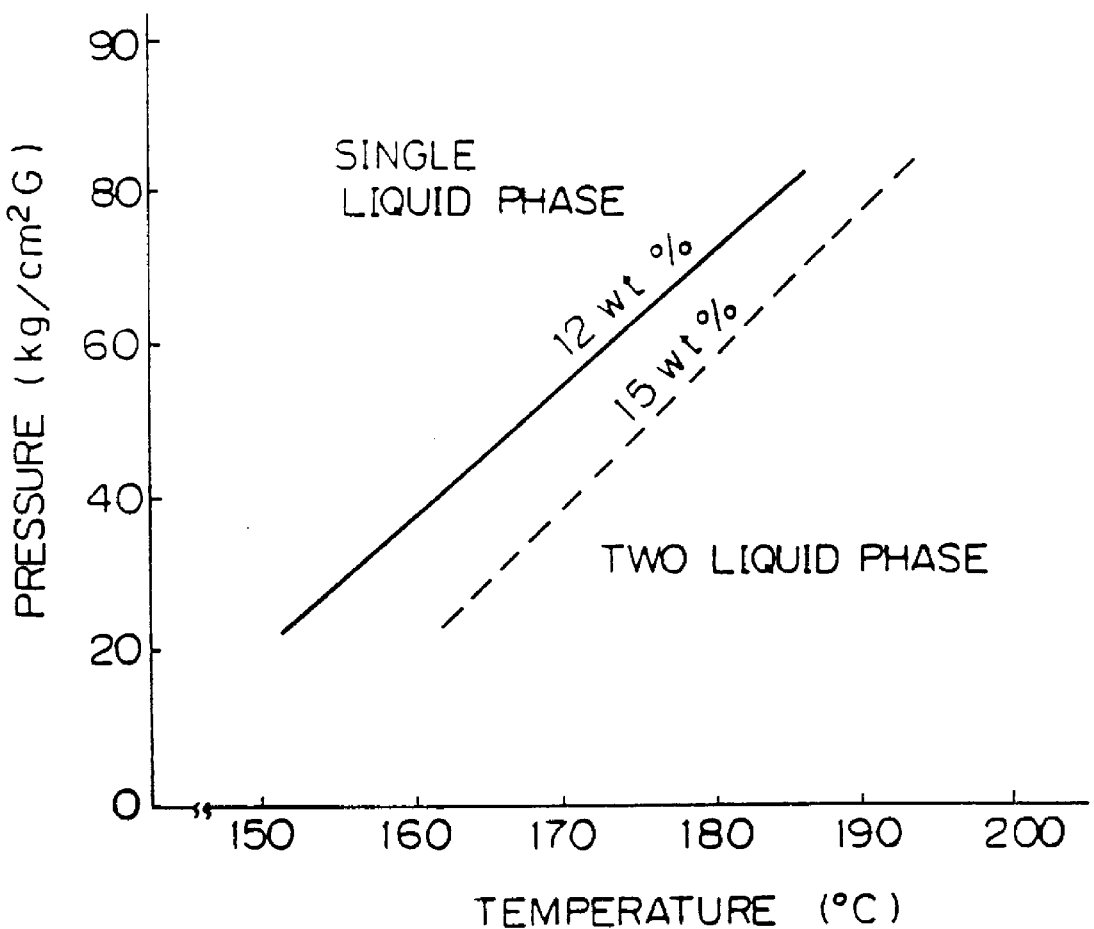
FIG. 4 is a phase diagram of a polymer solution comprising a type B-161 high-density polyethylene supplied from ASAHI Kasei Kabushikigaisha, and having a Melt Index of 1.2 and a weight-average molecular weight of about $14 \times 10^4$, and a trichlorofluoromethane.

As shown in a phase diagram of FIG. 4, a polymer having a concentration of 15 wt % can be more easily dissolved than a polymer having a concentration of 12 wt %, and when the concentration of the polymer increases, the polymer is more easily dissolved. This phase diagram shows that this polymer solution has the LCST type phase diagram stated in the high polymer solution theory, and this coincides with a result obtained by research of the present inventors. (Refer to "High Polymer Solution", volume 11, High Polymer Experiment, edited by Japanese High Polymer Society and published by Kyoritsu Shutsupan Co.)

Therefore, when the polymer is sequentially added to the melted polymer in the multistage and the concentration of the polymer is decreased by dissolving the polymer in the multistage, the effect in the present invention is increased.

The solvent is added to the polymer by using a pump or the like in the multistage, but preferably is applied by mixing the polymer and the solvent each time the solvent is added. Any technique can be used for the mixing operation, and a mechanical stirrer using a stirring wing or a mixing screw or a mixer using a static mixing element can be adopted. Further, it is possible to obtain an optimum process by combining the above methods.

The addition of the solvent in the multistage stated in the present invention means that the addition is divided into two or more stages, i.e., a first stage where the polymer and the solvent are first joined, and successive stages. The number of stage can be more than two, and this number is not limited.

The means for adding the solvent at a stage after the second stage is not especially limited, but preferably a static mixing element is used. Namely, the static mixing element is preferred as a device having a sufficient mixing ability and no sliding portion. The type of static mixing element is not especially limited, and a conventional known type or an improved type thereof may be used. These include a static mixer supplied from Kenix Co., a sulzer mixer supplied from Sulzer Co., a Hi-mixer supplied from Toray Co., or the like.

Since the polymer is previously mixed with a part of the solvent at an initial stage of the mixing, so that the viscosity of a polymer becomes small and the affinity with the solvent to be further added becomes large in the method in accordance with the present invention, pressure loss in the static mixing element is small and an uniform polymer solution can be easily obtained. Therefore the shape and number of steps of the static mixing element can be freely selected.

An optional solvent according to a polymer used can be adopted in the method in accordance with the present invention. Namely a known combination of the polymer and the solvent capable of obtaining a plexifilamentary fiber by using a flash spinning can be used, and a hydrogen chloride halide such as a methyl chloride, a trichlorofluoromethane, a trichlorotrifluoroethane or the like can be used as the solvent. Further a mixture of the above solvents may be used.

An object of the present invention is to obtain the plexifilamentary fiber by using the flash spinning, and a weight ratio of the polymer and the solvent in the present invention can be freely selected within the scope of the present invention. From this viewpoint, a concentration of the polymer in a spinning solution to obtain the plexifilamentary fiber is preferably between 5 wt % and 20 wt %. Therefore, a quantity of the solvent necessary to form the concentration of polymer in a final spinning solution is divided and added to a continuously supplied polymer in the method in which the polymer of the present invention is added in multistages. A quantity of the solvent of between 1% and 99% for the total quantity of the solvent may be added at each stage. Between 1% and 90% of the solvent may be added to the solution at the first stage but more preferably between 5% and 80% of the solvent is added. The remaining solvent is added at the following stages and is optionally divided and added to the polymer solution. The solvent dividing method may be freely selected.

The above-mentioned condition regarding a flash spinning of the high-density polyethylene and fron-11 will be explained in detail hereinafter.

A molecular weight expressed by a melt index (M.I.) of a polymer used is 10 (corresponding to a weight-average molecular weight of about $7\times10^4$) or less, preferably 1 (corresponding to a weight-average molecular weight of about $15\times10^4$) or less, and more preferably 0.8 (corresponding to a weight-average molecular weight of about $16\times10^4$). It is possible to use a polymer having a melt index of 0.05 (corresponding to a weight-average molecular weight of about $40\times10^4$).

The polymer having a melt index of between 1.0 and 0.1 is preferred, but most preferably the melt index is between 0.8 and 3.0.

The polymer is melted at a temperature of 200° C. to 300° C. in an extruder. The heat temperature of the extruder must be high, so that the melt index can be low. A uniform pitch structure in which a thread pitch of the screw coincides with a diameter of the screw, and which is conventionally used, is preferred, but when a polymer having a high molecular weight, i.e., a low M.I. value, is used the length of a feeding zone of the screw must be long. A screw mixing zone applying a special shearing operation to the polymer and completing fusion of the polymer may be arranged between an end of a compressing zone and a beginning of a metering zone, to obtain an easy and rapid fusion.

When the fusion of the polymer is completely finished, the polymer enters a polymer dissolving area, which contains a feed opening for the solvent. The pouring pressure of the solvent is determined according to a pressure in the dissolving area. The pressure in the polymer dissolving area is important for forming an uniform polymer solution, and therefore, is determined according to a molecular weight of the polymer used. Namely, a pressure corresponding to the molecular weight of the polymer in the polymer dissolving area is determined, and a solvent pouring pressure corresponding to the pressure in the polymer dissolving area is determined. Therefore, a pump capable of supplying a constant volume of the polymer regardless of the pressure by raising a maximum pressure resistance to a high value, e.g., about 500 kg/cm$^2$·G, may be used.

For example, a plunger pump may be used.

Further, the solvent to be poured may or may not be heated, but preferably is slightly heated so that the mixing and dissolving are stably performed. For example, a temperature to be applied depends on the type of the solvent, i.e., when fron-11 is used, a temperature of between 50° C. and 200° C. can be used.

A check valve preventing a back flow of the polymer may be arranged at the solvent feed opening. This check valve can have a conventional structure, but preferably a check valve which can be easily cleaned when the valve is choked with the polymer is used. Further, the valve may be heated.

The pressure in the dissolving area is a pressure at a place completely filled with the melted polymer; namely, a pressure in an area from slightly in front of the solvent feed opening, by a distance corresponding to two or three pitches of a thread of the screw, to an orifice of the pressure let-down chamber.

When the polymer is a high-density polyethylene, the pressure is as follows. Namely the pressure capable of sufficiently mixing and dissolving the polymer and solvent is between 150 kg/cm$^2$·G and 350 kg/cm$^2$·G for a polymer having a melt index (MI) of 5.0, between 160 kg/cm$^2$·G and 360 kg/cm$^2$·G for a polymer having an MI of 1.2, between 170 kg/cm$^2$·G and 400 kg/cm$^2$·G for a polymer having an MI of 0.8, between 200 kg/cm$^2$·G and 450 kg/cm$^2$·G for a polymer having an MI of 0.3, and between 250 kg/cm$^2$·G and 500 kg/cm$^2$·G for a polymer having an MI between 0.3 kg/cm$^2$·G and 0.30 kg/cm$^2$·G.

Generally, when the molecular weight of the polymer including a high-density polyethylene becomes high, it is necessary to raise the pressure in the polymer dissolving area. Therefore the pressure resistance of each apparatus such as a screw extruder, a special mechanical mixing zone, a static mixing zone or the like must be sufficiently high. Preferably, the pressure resistance is between 200 kg/cm$^2$·G and 750 kg/cm$^2$·G.

Therefore, it is necessary to carefully design a seal for each flange and each terminal detecting a pressure, a temperature or the like. A metal hollow O-ring is preferably used as the seal for the flange, and a metal contact type is preferable as the seal for the detecting terminal.

The sealing in an axial direction of the screw is effected by a liquid seal using the melted polymer. Therefore, a pressure at a position in front of a solvent feeding zone by a length corresponding at least one pitch of the thread of the screw must be set at a higher pressure than a pressure in the solvent feeding zone. To attain this, a volume of a space in the solvent feeding zone may be made larger than a volume of a space in a hopper side portion of the extruder. Namely, a depth of a groove may be made deeper. The pressure at a position immediately before the solvent feed opening is made higher than the pressure in the polymer dissolving area by the above constitution, and the solvent is completely sealed off by this pressure gradient, and thus a solvent flow toward a hopper or a blow out to outside are prevented. It is preferable to arrange a gear pump in any portion of the polymer dissolving area as a preferable means for always maintaining the pressure in this portion at a maximum value. Most preferably, the gear pump is arranged behind a special mechanical mixing zone. The liquid sealing of the melted polymer is made more complete by the above constitution.

The polymer and the solvent are joined in the solvent feeding zone and then sequentially flowed into the special mechanical mixing zone. This zone may be mounted on the same shaft as the screw shaft, as thus a rotational speed of the special mechanical mixing zone and a rotational speed of the screw are the same. Note, in almost all cases, this mechanical mixing zone has no pumping ability, but only a mixing and stirring function.

In this case, the pumping ability is performed by the screw extruder and the pump for the solvent. The pumping function in the screw extruder is derived from the metering zone of the screw. Therefore it is necessary to make the length of the metering zone longer as the pressure in the solvent dissolving area becomes higher.

A temperature in the mechanical mixing zone may be determined as lower than that in the screw extruder. In particularly, since the polymer and the solution system to be flash spun is an LCST type solution described in the high polymer solution theory mentioned hereinbefore, and dissolves under a low temperature and high pressure, it is not necessary to raise the temperature in this portion higher than the required level. Further a suitable temperature should be determined, to prevent retrogradation of the polymer. When using a high-density polyethylene, the temperature in this portion is between 170° C. and 220° C., preferably between 180° C. and 200° C.

A length and a shape of the special mechanical mixing zone are freely determined, but preferably the length of this zone is made longer in view of the mixing ability. A dulmage type, a needler type or barrer type may be used as the special mechanical mixing zone, but if such a type is adopted and the length thereof is elongated, there is a tendency that the load will become to heavy and the mechanical heat generation too high. A part of the special mechanical mixing zone may be a combination pin type structure, to prevent the heat generation.

Generally, when the exhaust quantity become large and the molecular weight of the polymer is also large, preferably the length of this zone is made longer.

Further, when the solvent is added in a multistage, the solvent is added in this special mechanical mixing zone at a first stage. In this case, it is necessary to consider the distribution of the quantity of solvent to be added.

Generally, when a molecular weight of the polymer is large, it is preferable to increase the quantity of the solvent to be added at the first stage. If much interference may occur, the addition of a uniform distribution type solvent may be used.

The quantity of the solvent to be added may be between 10% and 70% of the total quantity of the solvent to be added, when a high-density polyethylene and fron-11 system is used.

A gear pump may be provided behind the special mechanical mixing zone. With regard to the type of gear pump, one conventionally used in an extrusion molding may be used. But special consideration must be applied to the sealing of a shaft in the gear pump. A viscosity of a mixed polymer solution in this zone is between 300 centipoise and 500 centipoise, and this viscosity is higher than that of a general solution. Therefore, a conventional gland seal can be used, but preferably a slight leak of the solution is allowed as a preferable sealing method, because the polymer is separated from the leaked solution and is filled in a gap around the shaft, and this polymer operates as both a seal and a lubricant.

Further, since it becomes possible to further raise the pressure behind the gear pump, the degree of dis-dissolving can be freely controlled. In particular, the pressure in the special mechanical mixing zone can be freely controlled by changing a rotational speed of the gear pump. Therefore, a dissolving of the polymer under a high pressure can be attained by raising the pressure in this portion, to accelerate the dissolving. Since the determination of the pressure is changed according to the type or quantity of the polymer and type or quantity of the solvent, an optimum value of the pressure may be determined by a method of trial and error.

The polymer and the solvent sequentially enter a static mixing zone, which is a second stage. Preferably, the solvent feed opening is located before the static mixing zone, but this solvent feed opening can be omitted.

With regard to a structure of the solvent feed opening, it is important to design the feed opening such that the mixed polymer solution supplied from the first stage and a newly added solvent are uniformly distributed over all sectional surfaces of a piping, since a static mixing causes a laminar flow of the mix when a ratio differential of the viscosities of the liquids mixed therein is remarkably high and the solvent is concentrately added, the mixing becomes imperfect and result in an undesirable product, i.e., insufficient dissolving. Therefore, the addition of the solvent must be performed such that the solvent is uniformly distributed on all cross sections.

For example, it is preferable to extrude the mixed polymer solution supplied from the first stage in a shape of, for example, a noodle, into the solvent or to arrange a number of solvent feed openings in the cross section of the piping.

It is necessary to arrange at least 40 steps of static mixing elements, therefore, even if a pressure loss per static mixing element is small, the total pressure loss becomes large. Therefore a mounting type in which each element is joined to one unit and all units are overlapped and mounted in an associated style on an exit side, must be avoided. If this is not done, a buckling of the solution flow may occur.

A temperature of a piping system including the static mixing elements may be lower than that in the former stage. Since the temperature of the polymer solution is determined in -his portion, this temperature may be made lower, when there is no chance of interference occurring. When a high-density polyethylene is used, this temperature is between 160° C. and 200° C., preferably between 170° C. and 180° C.

Further, a pressure of the polymer solution at a position where the polymer solution exits from a final position of the mixing zone must be considered. The pressure in this position has a direct influence on the pressure in a pressure let-down chamber and directly controls a spinning state.

If the pressure in the above position varies remarkably, the polymer is not completely dissolved in the solvent, and therefore, when variations of the pressure are large, it is necessary to increase the number of mixing steps of the polymer solution or the number of steps for adding the solvent.

Generally, the variation in the pressure at a position just behind the last mixing step or a position just before the pressure let-down chamber is preferably 5 $kg/cm^2 \cdot G$ or less, more preferably 3 $kg/cm^2 \cdot G$ or less.

A filter may be arranged just behind the last mixing step or the just before the pressure let-down chamber. Various type of the filter can be used, but preferably the filter surface area is large and the pressure loss is small.

Generally a face-filtering type such as a pleat type or disk type may be used.

In piping system including the mixing zone the retention time is kept as short as possible when a dead time occurs in the retention, a retrogradated polymer is generated, and the retrogradated substance blocks the holes of the orifice.

Further, it is necessary to ensure that a narrow gap is not formed between the flanges and detecting ends including the extruder system. If the polymer solution enters the above gaps, stress corrosion is generated and thus cracks are formed, and the polymer solution may leak from these cracks. A material having high anticorrosion property may be used to prevent this corrosion.

The polymer solution sequentially enters a flash spinning portion. This portion is comprised of a pressure let-down orifice, a pressure let-down chamber, and a spinning orifice. The shape and dimensions of this portion are the same as those in the corresponding portion used in a conventional known technique, but the dimension of the orifice is determined by consideration of the pressure in the polymer dissolving area and the pressure in the pressure let-down chamber.

The pressure and the temperature finally influence a spinning state and the physical properties of an obtained fiber. When a high-density polyethylene is used, the pressure and the temperature in this portion of the pressure let-down chamber and the flash spinning portion are between 40 $kg/cm^2 \cdot G$ and 150 $kg/cm^2 \cdot G$, and between 150° C. and 190° C. The optimum pressure and temperature values are changed according to the drive conditions, in particular, are influenced by the molecular weight of the polymer. Essentially, since a disadvantage of phase separation is generated, the condition of the pressure let-down chamber is determined by a consideration of the drive conditions and the state of the phase separation.

An embodiment of an apparatus implementing the manufacturing method of the plexifilamentary fiber in accordance with the present invention is shown in FIGS. 5 to 10.

Figure 5:
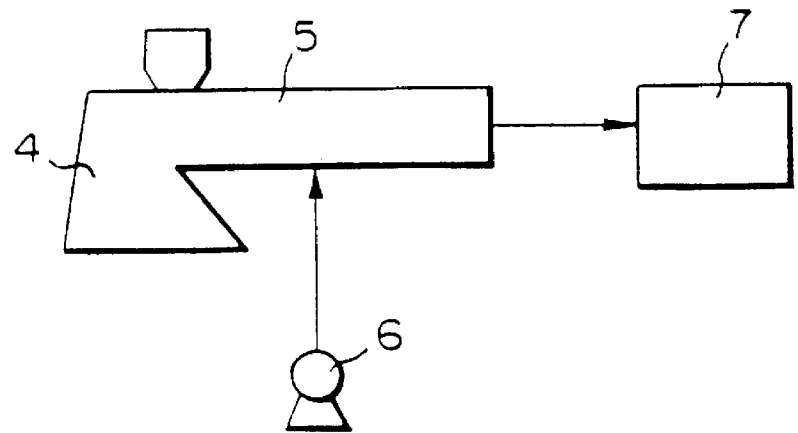
FIG. 5 is a schematic flow chart illustrating an embodiment of method of manufacturing a plexifilamentary fiber in accordance with the present invention.
Figure 6:
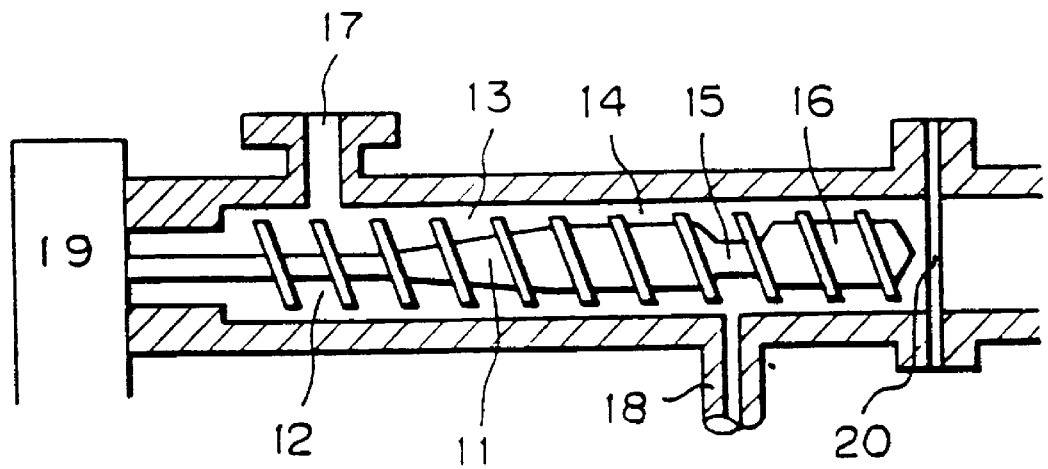
FIGS. 6 to 8 are schematic views of an example of an extruder, a screw and a special mixing structural element (Dulmage type or Pin type) used in the present invention, respectively.

FIG. 5 is a flow-chart of a typical process in accordance with the present invention, and FIG. 6 is an internal view of a screw extruder used in the above flow chart. Namely, an extruder 4, a barrel 5, a solvent pump 6 and a spinning device 7 are arranged in the manufacturing apparatus as shown in FIG. 5; a polymer melted in the extruder 4 is fed into a polymer dissolving area sealed with the melted polymer in the barrel 5; and a solvent is supplied from a solvent pump 6 through a check valve (not shown) into the polymer dissolving area. The solvent is mixed and dissolved by a screw rotated in the barrel 5, and becomes a uniform polymer solution, and this polymer solution is supplied to a spinning apparatus. This spinning apparatus is comprised of a pressure let-down orifice, a pressure let-down chamber, a spinning orifice, a heating device or the like, and the polymer solution is spun through the spinning orifice into a low pressure area to become a continuous plexifilamentary fiber.

The barrel 5 of the extruder includes a screw 11 therein as shown in FIG. 6, the screw 11 being comprised of a feeding zone 12, a compressing zone 13, and a metering zones 14, 15, and 16. The metering zones will be further described in detail. A metering zone 14 is filled with a melted polymer supplied from a compressing zone 13, and thus the solvent cannot flow into a hopper opening 17. Further, since a depth of a groove in a metering zone 15 is bigger than that of grooves in the metering zone 14 and a metering zone 16, a minimum zone of the pressure in the metering zone is formed in this part 15. Therefore, the solvent from a solvent feed opening 18 can be easily poured into the barrel of the extruder. The melted polymer from the metering zone 14 and the solvent from the solvent feed opening 18 are mixed and dissolved in the metering zone 16 by a rotating screw and become a polymer solution, and the polymer solution flows out from an exit opening 20. The metering zones 14, 15 and 16 are optionally optimized according to a flow quantity of the polymer and a flow quantity of the solvent.

Figure 7:
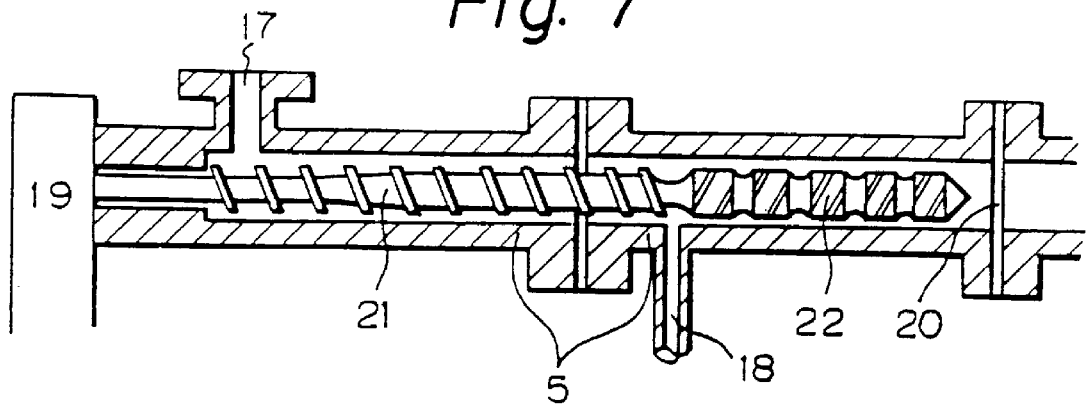
Figure 8:
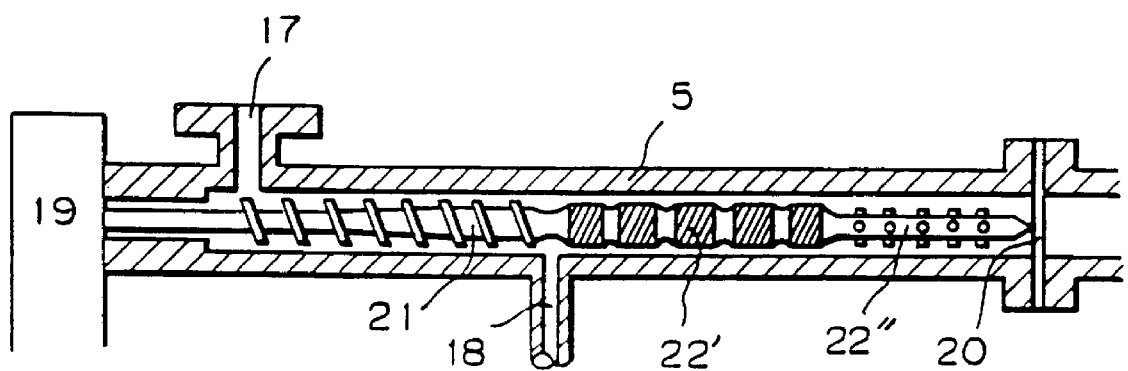

FIGS. 7 and 8 are other preferable embodiments of the extruder.

FIG. 7 shows a structure of an extruder used for implementing the present invention, which has a special mixing structure, i.e., a mixer, having an axis coaxial with that of a screw of the extruder. In this apparatus, a polymer is supplied from an introducing opening 17 of a hopper, is melted with a screw 21 rotated with a drive system 19 and is extruded to a forward side (a right side in the drawing). While a solvent is added from a solvent feed opening arranged on a barrel 5, both materials are mixed by a dulmage type mixing structure 22, and arrive at an exit opening 20.

FIG. 8 shows a structure having a dulmage type mixing structure 22' and 23' and a pin type structure which are different from the structure in FIG. 7.

In the present invention, the mixture flowing from the exit opening 20 is directly introduced into a spinning apparatus, or the solvent is further added and a mixing operation is applied and the mix is introduced into the spinning apparatus, to obtain a plexifilamentary fiber.

A diameter of the screw of the extruder is selected according to an output of the plexifilamentary fiber. A diameter of the structure having a coaxial axis the same as that of the screw may be or not be the same as the diameter of the screw. A length of the structure is determined according to a necessary mixing degree and a holdup volume, including a retention time, for each case.

Figure 9:
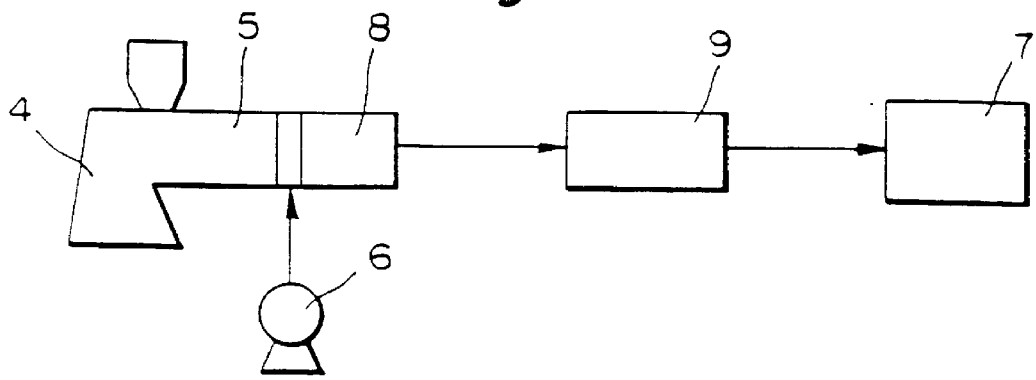
FIGS. 9 and 10 are schematic flow charts illustrating other embodiments of the methods of manufacturing the plexifilamentary fiber in accordance with the present invention.
Figure 10:
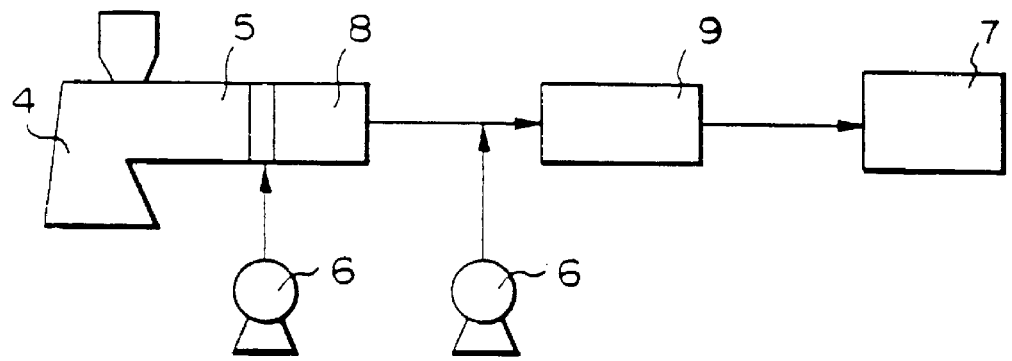

FIGS. 9 and 10 are a flow sheet showing further preferable embodiments (apparatus) in accordance with the present invention, wherein 4 is an extruder, 5 a barrel, 8 a special mixing zone arranged on the same axis at the extruder 4, 6 a solvent pump, 7 a spinning apparatus, and 9 a mixing zone comprising a static mixing element.

FIG. 9 shows an example of a multistage mixing. Namely, the polymer is mixed and dissolved in the special mixing zone 8 and is further mixed and dissolved in the static mixing zone 9.

FIG. 10 is a flow sheet of a process in which the solvent is added in a multistage and is mixed and dissolved at each multistage. Namely, the solvent is supplied from a first stage solvent pump 6 into a first stage mixing zone 8 and is mixed and dissolved, and the solvent is supplied from a second stage solvent pump 6 into a second mixing zone 9 and is mixed and dissolved, and thus a polymer solution having a predetermined polymer concentration is obtained.

As described hereinbefore, in the invention belonging to the classification D, since a seal of a stirring mechanism for dissolving the polymer can be performed, it is easy to produce a high pressure condition, and further, since the mixing effect is great, and a retrogradation of the polymer can be controlled because the polymer is dissolved by using the thermal dynamical properties of a solution, and thus the polymer can be dissolved in a short time, a polymer having a high molecular weight and a narrow distribution of the molecular weight can be dissolved into a uniform solution, and further, it is possible to greatly increase the flash power by spinning under a high pressure. Therefore, in accordance with the invention belonging to the classification D, a three-dimensional plexifilamentary fiber of a high-density polyethylene having a long period scattering strength of 40 or less can be manufactured, a three-dimensional plexifilamentary fiber having a long period of 150 Å or more and 200 Å or less can be obtained, and a three-dimensional plexifilamentary fiber having a specific surface area of 30 m$^2$/g or more can be manufactured. (Classification B). A method of manufacturing a three-dimensional plexifilamentary fiber using a high pressure difference activating method belonging to the classification E in the method of manufacturing the three-dimensional plexifilamentary fiber in accordance with the present invention will be described hereinafter. The manufacturing method belonging to the classification E in the present invention is used for manufacturing a three-dimensional plexifilamentary fiber of a high-density polyethylene, characterized in that a high pressure uniform solution composed of a polymer of a high-density polyethylene group and a fron-11 is extruded through a spinning apparatus comprised of a pressure let-down orifice, a pressure let-down chamber and a spinning nozzle into a low pressure, and a large difference of the pressure is generated between an upstream position and a downstream position of the pressure let-down orifice to activate a liquid.

The manufacturing method belonging to the classification E has a clear predominance in that it is possible to make the pressure in the pressure let-down chamber during spinning a higher pressure, since the method is different from a conventional known method in which a spinning operation is performed by determining a condition of the pressure let-down chamber such that the polymer solution belongs to a two-liquid-phase area and adopt a spinning operation spun from a single-liquid-phase area having a higher pressure.

Therefore, a bigger flash power compared with the conventional known technique and a fiber strongly drawn and orientated, and having a high strength can be obtained in accordance with the present invention. Further, since the pressure in the pressure let-down chamber can be raised, it is possible to spin a fiber under relatively low temperature at which the polymer and the solvent do not crack.

A liquid expressed in the present invention means a single-liquid-phase solution and a two-liquid-phase solution.

A high pressure difference in the present invention means a large difference of the pressure which cannot be performed in a conventional method, when, for example, an orifice is arranged on an entrance of a pressure let-down chamber and a difference of the pressure is generated by the pressure let-down chamber. For example, the high pressure difference means a large pressure difference of at least 80 kg/cm$^2$·G or more.

An activation means that, when a phase is separated from the single-liquid-phase to the two-liquid-phase, a thermodynamic swing is applied to liquid so that a phase separation can be easily generated. For example, a swing of a density or the like is generated. It is possible to determine the activated state by observing a transmission of a light in a pressure vessel with an optical window. Namely, when the high pressure difference is generated in a single-liquid-phase, a transmission light does not completely pass through the liquid, and then the liquid solution becomes transparent. This temporary swing denotes the activation of the liquid.

It has been impossible to estimate that a highly fibrillated three-dimensional plexifilamentary fiber having a high strength can be obtained by spinning from a single-liquid-phase area, which method was not considered practicable. This method can be first attained by applying the activation to the liquid in the present invention, and this activation is attained by applying the high pressure difference in the liquid.

This pressure difference must be elevated to a degree at which the activation is always obtained and is optionally selected according to a type, a concentration, or the like of a polymer used. For example, the pressure difference may be at least 80 kg/cm$^2$·G. In this method in accordance with the present invention, the liquid having a structural change caused by a sudden generation of a high pressure difference in the pressure let-down orifice is supplied into the pressure let-down chamber, and is extruded from the nozzle. This structural change is caused by a thermodynamic swing generated by the high pressure difference, this thermodynamic swing is generally expressed, for example, as a swing of the density.

The phase diagram showing a boundary condition between a single-liquid-phase and a two-liquid-phase in the polymer and the solvent in accordance with the present invention can be obtained by measuring a phase equilibrium line of the polymer solution, and this is obtained by observing an ordinary cloud point. Namely, a high temperature high pressure vessel with an optical window is used, and a change of a transparency to light between the single-liquid-phase and the two-liquid-phase is observed by a visible light or a laser light, and then the phase equilibrium is obtained by finding the boundary condition, i.e., cloud point.

Figure 1:
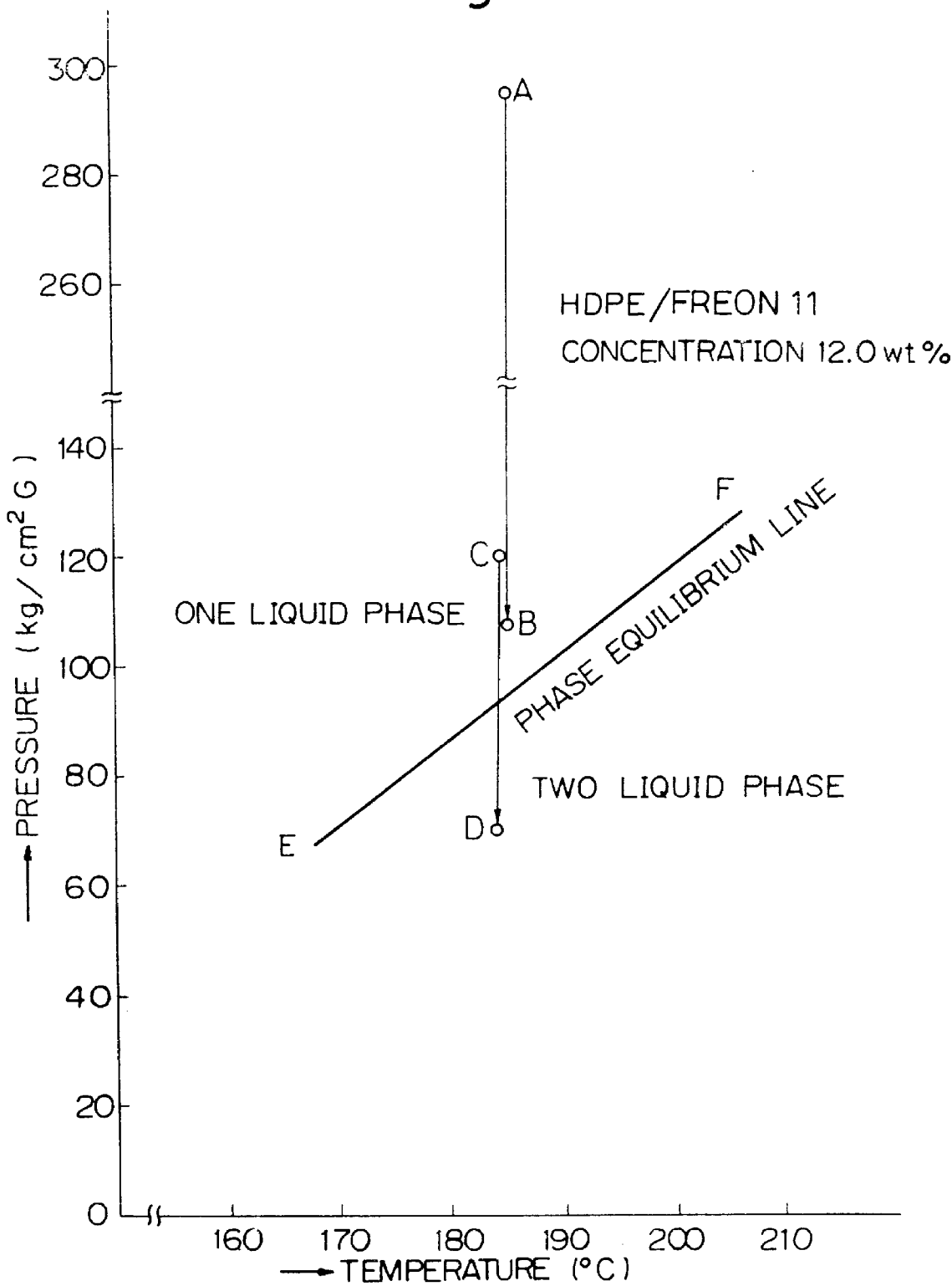
FIG. 1 is a graph showing a principle of the manufacture of a high quality three-dimensional plexifilamentary fiber of a high-density polyethylene in accordance with the present invention, and illustrating a relationship between pressure and temperature in a method in which a polymer solution is activated by a high pressure difference in accordance with the present invention and a fiber is spun, and a conventional spinning method.

Factors influencing the cloud point are the type of polymer, e.g., a molecular weight, distribution of the molecular weight or degree of branching, and the phase equilibrium is obtained by observing a generation of an equilibrated cloud point when using a solution of a type wherein a concentration of which is determined. Namely, the phase equilibrium is measured by either gradually changing the pressure while maintaining the temperature of the solution, gradually changing the temperature while maintaining a constant pressure, or simultaneously gradually changing the temperature and the pressure. A concrete method for activating the solution in accordance with the present invention uses a large change in the pressure, as shown from a point A is to a point B in FIG. 1. In this drawing, A is a pressure of the solution and B is a pressure in the pressure let-down chamber, and a plexifilamentary fiber obtained from this high pressure difference has an excellent fiber compared with a conventional fiber, as described hereinafter, in particular, when a spinning method is preferably to adopted belonging to the point B in the single-liquid-phase area, as shown in FIG. 1. In the manufacturing method, a concentration of the polymer in the polymer solution is between 4 wt % and 25 wt %, preferably between 5 wt % and 20 wt %.

An spinning method belonging to the classification E in accordance with the present invention will be explained hereinafter.

When the spinning method is performed by a batch system, an autoclave having a stirring device is generally used. The autoclave comprises a stirring device for mixing and stirring the polymer solution, a temperature sensing resistor for detecting a temperature in the autoclave, and a diaphragm type pressure gauge for detecting a pressure in the autoclave. In a general operation, a polymer is added into the autoclave, and a cover constituting a part of the autoclave is connected with a shell of the autoclave by clamp screws. Air in the autoclave is sucked out through a valve to cause a vacuum in the autoclave, and after all air is removed from the pressure let-down chamber, the solvent is poured into the pressure let-down chamber and the pressure let-down chamber is sealed.

The polymer can be dissolved into the solvent by heating the polymer and the solvent in the autoclave by a heater surrounding the autoclave, while stirring with the stirring device. Note it is important that, in a process in which a polymer is dissolved into the solvent, a temperature and a pressure capable of maintaining the solution in a transparent and uniform phase is selected in accordance with the combination used of the polymer and the solvent. This corresponds to making the condition in the autoclave the single-liquid-phase in the phase diagram. In the method belonging to the classification E in accordance with the present invention, a preferably temperature of the solution is a temperature higher than a temperature at which the polymer can be dissolved by the solvent, and capable of supplying a necessary quantity of an evaporation heat for evaporating all of the solvent in an flash extruding process performed adiabatically. When the extruding temperature is too high retrogradation of the polymer is remarkably enhanced by a radical caused by a heat retrogradation of the polymer and a heat decomposition of the solvent, a deterioration strength and a closing of the plexifilamentary fiber occur.

A pressure of the solution in the autoclave can be freely selected within a pressure having a value the same as that of a two-liquid-phase boundary pressure and maintaining a transparent uniform solution. The necessary pressure can be obtained by a mechanical pump, a pressuring by an inert gas or the like, but preferable a desirable pressure is obtained by using a heat expansion of the solution generated by completely filling the solution in the autoclave. The pressure of the solution is measured by a diaphragm type pressure gauge.

Next, when an exhaust value is spread, the polymer solution having a uniform phase passes through the pressure let-down orifice, the pressure let-down chamber and the spinning nozzle, and is exhausted to an atmosphere, so that the flash spinning is performed.

In a batch operation using the autoclave, preferably the pressure is maintained by using an inert gas such as a nitrogen gas or a liquid pressure within the autoclave while the polymer is exhausted and to maintain a constant rate of flow of the solution passing through the spinning nozzle, since when the polymer solution is extruded from the exhaust valve, a pressure drop occurs.

It is necessary to generate a pressure drop in the polymer solution when the polymer solution extruded from the exhaust valve is passed through the pressure let-down orifice and to provide a high pressure difference between the pressure measured by the diaphragm type pressure gauge in the pressure let-down chamber and the pressure of the solution to a value capable of activating the liquid in the present invention. For example, preferably the pressure difference is 80 kg/cm$^2$·G.

The temperature in the pressure let-down chamber is kept at the same temperature as that of the solution or at a slight lower temperature than that of the solution.

The solution extruded from the spinning nozzle is highly fibrillated by flashing the solvent and solidification of the polymer, and becomes a drawn and orientated plexifilamentary fiber having a high strength.

With regard to the pressure let-down orifice, the pressure let-down chamber and the spinning nozzle used in this method, it is possible to use those having any conventional known shape and structure, as long as it is capable of applying a pressure difference of the pressure let-down orifice sufficient to activate the liquid, which is the necessary condition in the present invention. Further, a diameter or a shape of the pressure let-down orifice and the spinning nozzle suitably corresponding to a viscosity, a flow rate and an extruding pressure of the solution, a spinning temperature or the like so that the polymer solution belong to the single-liquid-phase area in the phase diagram in the pressure let-down chamber is selected, can be used. A volume of the pressure let-down chamber is selected such that a processing time is a retention time at which the activating state of the liquid is maintained, and the volume of the pressure let-down chamber is usually between 0.5 cc and 10 cc. Note the present invention is not limited by those values.

The spinning method in accordance with the present invention can be performed by either a batch type or continuous type process. In particular, in the continuous type manufacturing method, an uniform solution under a high pressure can be easily prepared by adopting a method for sealing an entrance of the polymer dissolving area by the melted polymer in the screw extruder. Further, when at least a first stage of a multistage addition, mixing and dissolving of the solvent for the polymer in the polymer dissolving area is performed in a mechanical mixing area arranged on the screw of the extruder for a polymer continuously melted in the screw extruder and supplied from the screw extruder, and an addition of the solvent, mixing and a dissolving of a following second stage is performed by a static mixing element, a more uniform solution can be easily manufactured.

As described hereinbefore, since the manufacturing method belonging of the classification E causes a generation of a high pressure difference in the polymer solution, and thus a generation of an instantaneous thermodynamical swing so that the fiber is spun in an activated state occurs, the fiber is spun from a single-liquid-phase area, and a high pressure can be used without an upper limit, whereby a flash power is high and a highly fibrillated three-dimensional plexifilamentary fiber having a long period scattering strength ratio of 40 or less, a long period between 150 Å and 200 Å and a specific surface area of 30 $m^2/g$ or more (c), is obtained.

FIG. 4 shows a phase diagram of a high-density polyethylene and fron-11 measured under a concentration of the polymer of 12 wt % and 15 wt %, in this embodiment in accordance with the present invention.

The phase diagram is measured by using a device having a pair of optical windows arranged on a lower portion of a side portion in a body of an autoclave and an increasing and decreasing pressure mechanism connected to a bottom valve thereof, and by observing a cloud point through the optical window while keeping a solution having a predetermined composition at a constant temperature and changing a pressure of the liquid at a second of about 5 $kg/cm^2 \cdot G$ or less.

Next, a novel high strength nonwoven fabric (F) composed of the three-dimensional plexifilamentary fiber will be explained.

Namely, the nonwoven fabric belonging to the classification F is a three-dimensional plexifilamentary fiber nonwoven fabric having a high tensile strength and a high tear strength, characterized in that said nonwoven fabric has a paper-like shape and is comprised of surface layers formed by overlapping in random directions fibrillated continuous three-dimensional plexifilamentary fibers of a high-density polyethylene group heat-bonded firmly to each other, and inner layers formed in the same manner as that of the surface layers and heat-bonded by a weaker bonding-force than that of the surface layers and associated with the surface layers; a specific surface area of the inner layers being more than 5 $m^2/g$. Further preferably this nonwoven fabric satisfies the following equation.

$X \geq 0.4$ $-20X+28 \leq Y \leq 30$ wherein X is a tear strength measured by an Elemendorf method and expressed as $kg/50 \ g/m^2$, Y is a tensile strength expressed as $kg/3 \ cm \cdot 50 \ g/m^2$ and a value of each strength is expressed as a conversion value obtained by proportionary converting a value of the strength obtained as a value of the nonwoven fabric having a standard unit weight of 50 $g/m^2$.

The nonwoven fabric belonging to the classification F will be described in detail hereinafter. In this nonwoven fabric, the three-dimensional plexifilamentary fiber of the high-density polyethylene group are arranged in random directions and overlapped. Namely all fiber elements are arranged in all directions, such as obtaining a uniform state by spreading the three-dimensional fiber spun by the flash spinning, and the end of which fiber are not substantially overlapped in a nonwoven-like state.

The fiber in the surface layers are heat-bonded to maintain a shape of the paper-like nonwoven fabric or have a sufficient mechanical strength. The heat-bonding in the surface layer is strong, and even if the surface is strongly rubbed by a finger, fluffing does not occur. This firmly bonded surface may be formed on both surface or on either a front surface or a both surface.

A strength of the heat-bonding in a inner layer of this nonwoven fabric is different from that in the surface layer. Namely, the degree of heat-bonding in the inner layer is low compared with that of the surface layer, and therefore, the inner layer is a film-like fiber layer having a greater shape of the fiber than in the surface layer, and in this nonwoven fabric, a nonwoven fabric structure is formed by associating the surface layer and the inner layer. This cross sectional structure per se of the nonwoven fabric is known, as disclosed in U.S. Pat. No. 3,532,589 described hereinbefore.

But, the nonwoven fabric belonging to the classification F is characterized in that a specific surface area in each layer is higher than that of the conventional known paper-like three-dimensional plexifilamentary fiber non-woven fabric, and this nonwoven fabric has high mechanical properties not obtained in the prior art. A film-like fiber layer in the inner layer expressed in the present invention means a layer having a part which is in a film-like state and another part which is in a fiber-like state. In other words, a layer that has received a degree of heat-bonding such that, when preparing the inner layer separated forcibly from another layer, by gripping an end of a fiber bundle and separating the fiber bundle from the inner layer, it is possible to obtain an independent continuous body of the three-dimensional plexifilamentary fiber having a length of between ten and several ten cm, but it is impossible to obtain an independent continuous body having a length greater than the above length, and the latter continuous body is broken.

The nonwoven fabric belonging to the classification F is characterized in that a specific surface layer in the inner layer is more than 5 $m^2/g$. Namely the inner surface of this nonwoven fabric has a high specific surface area which could not be previously obtained, for a layer constituting the paper-like three dimensional plexifilamentary fiber nonwoven fabric, and thus this nonwoven fabric has an excellent nontransparency and covering force.

When the three-dimensional network fiber-like material has a large specific surface area; an irregular reflection occurs and the nontransparency, the covering force, and whiteness are increased.

The specific surface area of the inner layer can be obtained by separating mechanically the surface layer and the inner layer and cutting a film-like material or a fiber-like material connecting two layers, without applying a strong tearing force to make another layer, and measuring the specific surface area of the latter layer. The specific surface area in the present invention is measured on the basis of BET method of a nitrogen adsorption by using a Sorptomatic 1800 supplied by CARLO ERBA Co.

A specific surface area of the nonwoven fabric measured without separation of the inner layer and the surface layer is 5 $m^2/g$ or more.

Although this nonwoven fabric has the high specific surface area as described hereinafter, it has a high mechanical strength hitherto unknown.

When the specific surface area is high in the three-dimensional plexifilamentary fiber, bonding between the fibers is not sufficient and it is impossible to obtain strong mechanical strength, but a surprising effect, by which both a high specific surface area and a high mechanical strength can be attained, is obtained in the present invention. Namely, a nonwoven fabric having a good relationship between a tensile strength and a tear strength, representing the mechanical strength of the nonwoven fabric can be obtained by the present invention.

This nonwoven fabric has the following relationship between the tensile strength (kg/3 cm·width/50 g/m$^2$) and a Elemendorf tear strength (kg/50 g/m$^2$).

$X \geq 0.4$ $-20X+28 \leq Y \leq 30$.

In the above equation, each value of the strength of the nonwoven fabric is a value obtained as a conversion value proportionally converted to a value of the nonwoven fabric having a standard unitweight, wherein 50 g/m$^2$ is used as the standard unit weight. The unit weight of the nonwoven fabric belonging to the classification F is between 15 g/m$^2$ and 200 g/m$^2$, preferably between 200 g/m$^2$ and 120 g/m$^2$, but since the middle unit weight of this nonwoven fabric is 50 g/m$^2$, the strength for each nonwoven fabric is expressed as the conversion value converted to that of the nonwoven fabric having a standard unit weight of 50 g/m$^2$.

Figure 12:
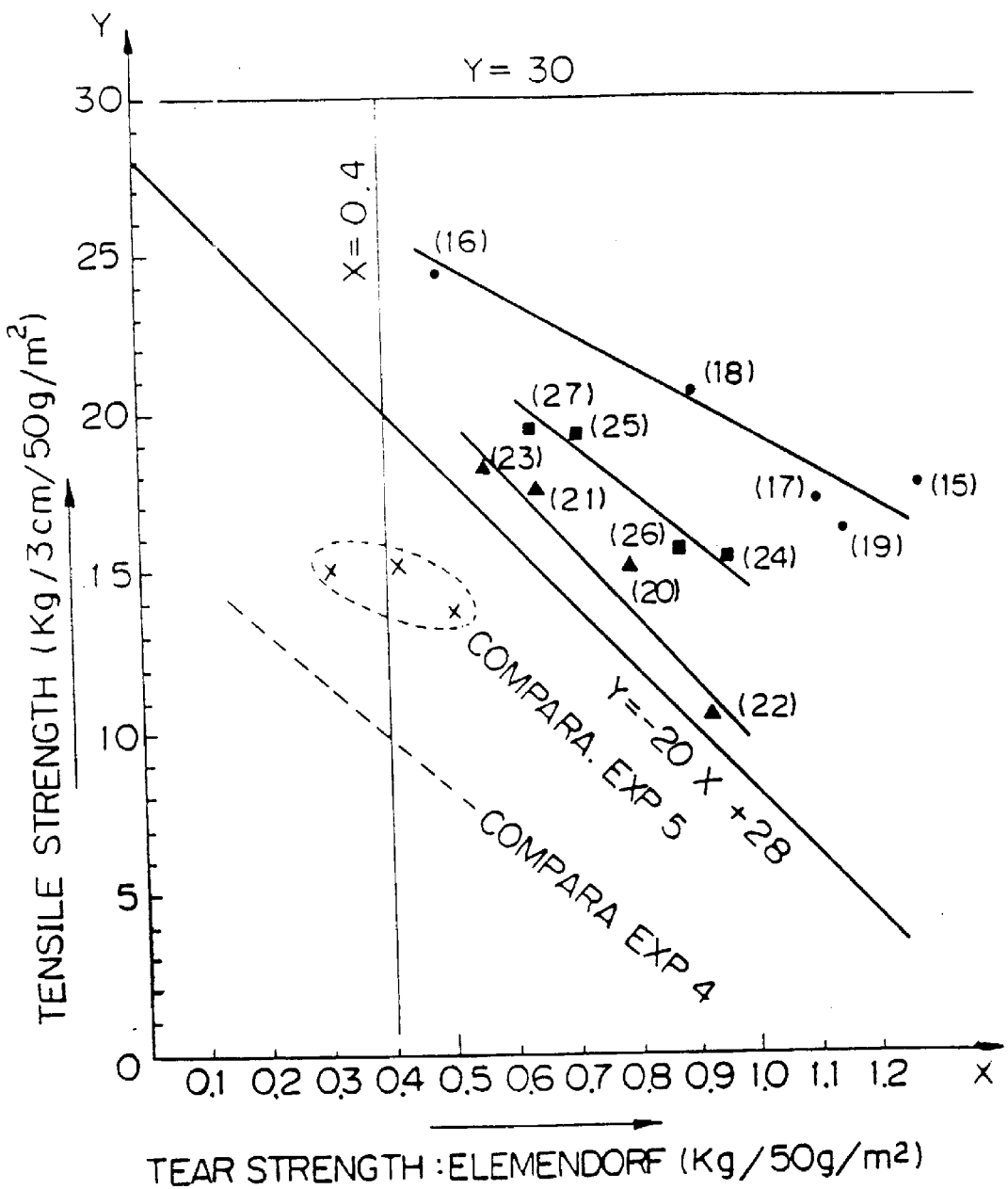
FIG. 12 is a view of a relationship between a tensile strength and a tear strength of a nonwoven fabric in accordance with the present invention.

FIG. 12 shows the relationship between the tensile strength and the tear-strength.

An area of the strength of the nonwoven fabric belonging to the classification F is an area enclosed with an ordinate line having a value of X of 0.4, an abscissa line having a value of Y of 30, a line expressed the equation Y=−20X+28, and an ordinate line of X of 0 as shown in FIG. 12.

Points with numerals shown in the above area in FIG. 12 correspond to each value of the embodiments described hereinafter and match the numerals used for the nonwoven fabric manufactured with the same fiber. A dotted line described in an outer area of the area in accordance with the present invention corresponds to a data using fiber in an comparative example.

Since a nonwoven fabric usually has a directional property, when the mechanical properties thereof are measured, the measurement is applied for a longitudinal direction and a transverse direction, and if necessary, for an inclined direction. Since in the nonwoven fabric belonging to the classification F, each fiber element is arranged in a substantially uniform state in all directions of the nonwoven fabric, it is possible to adopt a mean value of a value in the longitudinal direction and a value in the transverse direction as a value of the corresponding nonwoven fabric. A ratio of a physical property in the longitudinal direction against a physical property in the transverse direction is between 1.3/1 and 1/1.3 in the nonwoven fabric belonging to the classification F.

Further the directional property of the fiber in the nonwoven fabric can be easily obtained by a transparency rate of a microwave polarization. It is possible to confirm the uniformity in the direction of the nonwoven fabric belonging to the classification F by using the above-method. The directional property obtained by the microwave and the mechanical strength, in particular the tensile strength, are substantially the same.

The directional property based on the microwave in the nonwoven fabric may be measured by using, for example, an MOA-2001A Microwave Molecular Orientation Tester supplied by Kanzaki Seishi Co.

In the present invention, the tensile strength of the nonwoven fabric is measured on the basis of JIS-L-1068, the obtained value is proportionally convert to a value corresponding the nonwoven fabric having a standard unit weight of 50 g/m$^2$, and this converted value is expressed as Y (kg/3 cm width/50 g/cm). The Elemendorf tear strength of the nonwoven fabric is measured on the basis of JIS-L-1085, and the obtained value is proportionally converted to a value corresponding to the nonwoven fabric having a standard unit weight of 50 g/m$^2$ and this converted value is expressed as X (kg/50 g/m$^2$).

Various known methods are adopted as a method of heat-bonding a flash spinning fiber sheet. In a nonwoven fabric of high-density polyethylene, the fiber sheet is heat-bonded at a temperature near to the crystal melting point to provide a sufficient strength to the nonwoven fabric, a sharp retention and prevention of fluffs on the surface. Therefore, when obtaining the heat-bonded nonwoven fabric, the heat-bonding property between the fibers must be strong, little shrinkage of the nonwoven fabric must occur during a heat-bonding operation, and a mechanical strength of the fiber at a high temperature near to the bonding temperature must be high. The three-dimensional plexifilamentary fiber in accordance with the present invention can be used as a fiber satisfying the above requirements.

The nonwoven fabric belonging to the classification F can be obtained by using a plexifilamentary fiber composed of extra-fine fibrils and having a special structure for a long period and an excellent feature in the high temperature and heat-bonding of the above fibers, and this nonwoven fabric is characterized by a high mechanical strength.

Various fabrics, such as disclosed in U.S. Pat. No. 3,169,899 and Japanese Examined Patent Publication (Kokoku) No. 43-21112 described hereinbefore are available one of which is now marketed under the name Tyvek®, by Dupont Co., but a nonwoven fabric having a good mechanical property like as the nonwoven fabric in accordance with the present invention is not known.

The nonwoven fabric belonging to the classification F in the present invention is characterized by an excellent non-transparency. Namely, even if the conventional known heat-bonding method is used, light is likely to be irregularly reflected due to a big specific surface area of the plexifilamentary fiber per se of the present invention, so that non-transparency is provide for the nonwoven fabric. Further, since the mechanical strength is high and a quality under a high temperature is good, the fiber is not damaged by a heat-bonding, and even if the bonding level is not high, it is possible to manufacture a nonwoven fabric having a sufficient mechanical property and excellent nontransparency.

The nontransparency of the nonwoven fabric is very important for a covering material such as a wrapping material, a tabular sealing material, apparel or the like, and a method for manufacturing using an He-Ne laser transparent light measurement is recommended as a method coinciding to a result obtained by observation by the human eye. This measurement is performed by irradiating a laser light having an output of 5 mW and a beam diameter of 2.5 mm$\phi$ on the nonwoven fabric in a dark room, measuring a light quantity passing through the nonwoven fabric by a laser power meter, obtaining several values by continuously sliding the irradiated position, and calculating a mean value of the above values.

A value of the transparent light quantity varies according to the value of a unit weight of the nonwoven fabric, when the unit weight become too large, the light quantity is decreased. In the nonwoven fabric in accordance with the present invention, when a nonwoven fabric having a unit weight of 25 g/m$^2$ is used, the light quantity is 25 $\mu$W or less, at 40 g/m$^2$ the light quantity is 20 $\mu$W or less, at 50 g/m$^2$ the light quantity is 18 $\mu$W or less, and at 60 g/m$^2$ the light quantity is 16 μW or less, and even if a nonwoven fabric having a relatively low unit weight is used, a good covering force hitherto unknown is obtained. Further, the preferable light quantity for the nonwoven fabric having a unit weight of 25 g/m² is 22 μW or less, the preferable light quantity for 40 g/m² is 16 μW or less, the preferable light quantity for 50 g/m² is 14 μW or less, and the preferable light quantity for 60 g/m² is 12 μW or less.

Further it is possible to obtain other useful physical properties in the nonwoven fabric belonging to the classification F while keeping the above described excellent mechanical property and nontransparency.

For example, the latter physical properties can be changed by the type of bonding method used. Namely, several conventional heat-bonding processes can be applied for manufacturing the nonwoven fabric in accordance with the present invention, and a heat-bonding method capable of increasing a bonding area is usually adopted to obtain a nonwoven fabric having a high mechanical strength. A method for using a flat roll or an embossing roll having shallow embosses of 1000 points per cm² or more, a roll pressing method or a roll calender method using a sand blast roll or a felt calender method, can be adopted as the heat-bonding method.

The bonded surface of the nonwoven fabric belonging to the classification F manufactured by the above method has a smooth appearance.

This nonwoven fabric has a water resistance of between 1000 mmH₂O and 5000 mmH₂O and a gas permeability in Gurley Hill of between 1 sec/50 ml and 10⁴ sec/50 ml as the above additional properties.

Measurement of the water resistance is based on JIS L-1092, and measurement of the Gurley Hill gas permeability is performed by using a B type Gurley Denso meter.

The nonwoven fabric belonging to the classification F in accordance with the present invention is manufactured by spreading a three-dimensional plexifilamentary fiber left in a flash spun state, arranging same in random directions to obtain fiber elements, and overlapping same to make a non-bonded sheet, and heat-bonding the above non-bonded sheet. A conventional optional process can be selected as a process for obtaining the above non-bonded sheet.

A dissolving process for obtaining a fiber constituting a nonwoven fabric in accordance with the present invention is not especially limited, and a conventional known dissolving process can be used. This fiber is composed of a high-density polyethylene having a narrow molecular weight distribution, and it is necessary to prevent a change of properties of a polymer by dissolving a polymer material in a short time in a solvent and spinning, and it is necessary to carry out the dissolving under a high pressure, due to a spinning mechanism. A spinneret assembly used to obtain the above fiber is not limited, and another appropriate spinning mechanism can be used. Namely a pressure let-down orifice, for activating a uniform solution, a pressure let-down chamber, a nozzle or the like used can be one having a conventionally known shape.

Further a conventional known method or apparatus can be used as the method or apparatus for spreading the three-dimensional plexifilamentary fiber and making a non-bonded nonwoven sheet. The above apparatus is essentially comprised of an impinging device for spreading the spun plexifilamentary fiber, a device for determining a running direction of the fiber spread by impingement against the impinging device, a device for applying an electric charge to the spread fiber, and a device for receiving and overlapping the fibers. Namely, with regard to the above technique, several known methods including techniques disclosed in U.S. Pat. 3,169,899 and Japanese Examined Patent Publication (Kokoku) No. 44-21817, and improved methods thereof, can be used without limitation.

Next, a high tenacity nonwoven fabric (G) composed of the three-dimensional plexifilamentary fiber and having unmelted portions will be explained hereinafter.

The nonwoven fabric belonging to the classification G is a nonwoven fabric wherein a fibrillated three-dimensional plexifilamentary fiber of a high-density polyethylene group is arranged in random directions and overlapped in a layer state, and a layer composed of independent partially non-melted plexifilamentary fibers is included in the nonwoven fabric, characterized in that the above independent fiber has a long period scattering strength ratio of 40 or less.

Namely, the nonwoven fabric belonging to the classification G is composed of a continuous three-dimensional plexifilamentary fiber of the high-density polyethylene, and those fibers are arranged at random and overlapped. Namely, a flash spun three dimensional plexifilamentary fiber having substantially no ends is spread, and arranged so that each fiber element becomes substantially uniform in all directions, the continuous fibers are overlapped to make a layer, and a nonwoven-like shape is formed.

This nonwoven fabric includes a layer in which fibers are partially unmelted or at least a part having a loose bonding is provided in a many fiber layers constituting this nonwoven fabric. Namely, the above loose fiber layer is arranged on a surface of the nonwoven fabric or to an inside portion, and the independent plexifilamentary fiber can be picked up from the above loose fiber layer. The independent plexifilamentary fiber expressed herein is, for example, a plexifilamentary fiber capable of being continuously drawn out in a separated state from another fiber like material by gripping a flux of a fiber-like material made on an end of a layer when separating two layers and carefully drawing same. Therefore, the fibers in this layer are not firmly bonded in a film-like state, i.e., the fibers are not completely bonded or are loosely bonded. Therefore, this nonwoven fabric is different from a nonwoven fabric belonging to the classification F, and the plexifilamentary fibers constituting the nonwoven fabric has a degree of freedom of fiber movement in the nonwoven fabric, which imparts flexibility to this nonwoven fabric.

This independent plexifilamentary fiber maintains the shape of the fiber and is a continuous fiber having a length of 20 mm or more, and it is possible to use this fiber for a measurement of a low-angle scattering of X-rays after aligning a plurality of the fibers, and a fine structure of the plexifilamentary fiber constituting the nonwoven fabric in accordance with the present invention appears in this measurement. Namely, this nonwoven fabric is characterized in that a long period scattering strength ratio by the low-angle scattering of X-rays is 40 or less. This shows that a feature of the plexifilamentary fiber used for manufacturing this nonwoven fabric appears identically in the nonwoven fabric, and that even if fibers in the remaining portion are treated so that the fibers are firmly bonded, the long period scattering strength ratio is not substantially changed, compared with a just spun fiber.

A long period of an independent plexifilamentary fiber in the nonwoven fabric after receiving a heat-bonding treatment tends to increase, the long period is preferably 150 Å or more.

The nonwoven fabric belonging to the classification G is composed of extremely fine fibrils similar to the nonwoven fabric belonging to the classification F, and is a nonwoven fabric composed of a plexifilamentary fiber having a special structure in the long period and excellent qualities under a high temperature, and manufactured by mainly using a heat-bonding process, and this nonwoven fabric has an excellent in a mechanical strength, quality at a high temperature near to a melting point, and nontransparency.

The nonwoven fabric belonging to the classification G in accordance with the present invention includes a layer from which an independent plexifilamentary fiber can be picked up, and another layer which may be a layer having the same structure or may be a firmly bonded layer such as a film.

Any conventional known method for heat-bonding a sheet, e.g., pressing or calendering between rolls, partial heat-bonding by an emboss roll, bonding by a felt calender, bonding in an oven or by a forcible thermal air current or the like can be used. A manufacturing method such as a simultaneous treatment for both faces, a treatment for one side, a treatment for another face after treating one face or the like may be adopted. Further, this nonwoven fabric may be applied with a rubbing treatment or the like after the heat-bonding treatment to make the nonwoven fabric soft by separating a part between the fiber layers.

This nonwoven fabric may be a nonwoven fabric having a wholly non-bonded or can be pushed and hardened by a pressure. Further, this nonwoven fabric may be a nonwoven fabric interlaced with fibers by using a needle punching process or a water punching process, and further, a nonwoven fabric combining the above process with the heat-bonding process.

Next, a nonwoven fabric (H) composed of a three-dimensional fiber and having an excellent uniformity will be explained.

The nonwoven fabric belonging to the classification H is a uniform nonwoven fabric formed by overlapping an spread high-density polyethylene group three-dimensional plexifilamentary fiber in random directions, characterized in that a flux portion existing in the continuous plexifilamentary fiber constituting the nonwoven fabric has a density of 40 denier per width of 1 mm or less, or when the flux portion has a density of 40 denier per width of 1 mm or more, a width of the flux portion is 5 mm or less, and a length of the flux portion is 30 mm or less. The inventors of the present invention found that, when an spread three-dimensional plexifilamentary fiber constituting the nonwoven fabric has not a specific poorly spread portion, this nonwoven fabric becomes a uniform nonwoven fabric in an appearance and in a distribution of unit weight, and thus obtained the nonwoven fabric belonging to the classification H in accordance with the present invention after much research.

This special poorly spread portion is formed because a three-dimensional fiber spread after flash spinning is collected as a flux portion having a fiber density of 40 d per width of 1 mm, a width of 5 mm or more and a length of 30 mm or more during a sheet making process. This flux portion is formed by collecting all fibrils in the three-dimensional plexifilamentary fiber or formed by collecting a part of the fibrils in the three-dimensional plexifilamentary fiber. The fiber density is obtained by picking up a continuous fiber having a length of 2 cm or more by a quantity corresponding to a total length of 100 cm, measuring a width of the spread fiber portion every at 2 cm, and dividing a fineness by the obtained width of the spread fiber portion.

Preferably, the nonwoven fabric composed of spread three-dimensional plexifilamentary fiber having the special poorly spread portion has a degree of variability of unit weight ($R/\overline{X}$) in a width direction of the sheet of 0.3 or less, as a measure expressing a macro-uniformity of the nonwoven fabric, and a degree of variability of a laser spot light transmitting light volume of 0.5% or less, as a measure expressing a micro-uniformity of the nonwoven fabric. It is possible to provide an extremely uniform nonwoven fabric by satisfying the above condition. The degree of variability of the unit weight ($R/\overline{X}$) and the degree of variability of the transmitting light volume are defined as follows.

Degree of variability of unit weight=$R/\overline{X}$ wherein $x_1$: weight of test piece having a width of 1 cm and length of 5 cm, $$\overline{X} = \sum_{i=1}^{n} x_i/n \quad (n = \text{a number of 30 or more test pieces})$$

$$R = x_{max} - x_{min}$$

Degree variability of transmitting light volume = $\gamma/\overline{y} \times \sqrt{\text{unit weight}/50}$ wherein $y_i$: Transmitting light volume of a laser spot light having a diameter of 2.5 mm$\phi$ in a width direction of the sheet $$\overline{y} = \sum_{i=1}^{n} y_i/n \quad (n = \text{a number of 100 or more measurements})$$

$$\gamma = y_{max} - y_{min}$$

$\sqrt{\text{unit weight}/50}$: Coefficient for correcting a detecting sensitivity of a flux portion of the plexifilamentary fiber in the nonwoven fabric, which sensitivity depends on a value of the unit weight and is defined on the basis of a nonwoven fabric having a unit weight of 50 g/m². This collection is based on a raise in the unit weight of the nonwoven fabric, which causes a change in the laser transmitting light volume according to a square root of the degree of variability of the unit weight.

Thus the nonwoven fabric belonging to the classification H in accordance with the present invention has a macroscopic and microscopic uniformity.

Namely, in this nonwoven fabric, the spread plexifilamentary fiber constituting the nonwoven fabric does not include the flux portion collected to the fiber density of 40 denier/width of 1 mm and having a width of 5 mm or more and a length of 30 mm or more, and a nonwoven fabric having the above high uniformity is hitherto unknown. A nonwoven fabric of three-dimensional plexifilamentary fiber produced by flash spinning and satisfying the above uniformity was first obtained by a nonwoven fabric in accordance with the present invention.

Further, when the spread three-dimensional plexifilamentary fiber of the high-density polyethylene group constituting the uniform nonwoven fabric in accordance with the present invention has a long period scattering strength ratio of 40 or less and a long period of 150 Å or more, the uniform nonwoven fabric becomes a nonwoven fabric having a high strength, high thermal mechanical properties, a high nontransparency, and a high covering power described hereinbefore which are hitherto unknown, as well as an excellent uniformity.

The thus obtained nonwoven fabric belonging to the classification H can be developed for applications such as a filter or the like by using the high uniformity of the nonwoven fabric.

A manufacturing method (I) of the nonwoven fabric having an excellent uniformity and belonging to the classification (H) will be explained hereinafter.

The manufacturing method I is a method of manufacturing a uniform nonwoven fabric of plexifilamentary fibers, which uses a spreading and swinging rotational dispersion plate comprised of a rotatable disk, a cylindrical portion extending in a perpendicular direction from a center of the disk and having a cylindrical outer surface having a diameter smaller than that of the disk, and a skirt portion arranged in an inclined state in a space between one surface of the disk and the cylindrical outer surface of the cylindrical portion, the skirt portion being comprised of a plurality of swinging faces swinging an unspread three-dimensional plexifilamentary fiber flown in a direction substantially parallel to an axis of the cylindrical portion and a cushioning face arranged alternately with the swinging face and capable of cushioning a sudden 5 change of the swinging direction of the three-dimensional plexifilamentary fiber swung by the swinging face, and this manufacturing method is characterize in that an inclined angle α between a center of the swinging face of the skirt portion and an upper surface of the disk is substantially the same as an inclined angle β between a center of the cushioning face and the upper surface of the disk, and the cushioning face has a fan-like shape wherein a width of a portion near to the disk is wider than a width of a portion near to the cylindrical portion.

A range where the inclined angle α is substantially the same as the inclined angle β means that a relationship between the angle α and the angle β is satisfied by the following equation.

$$\alpha = \beta \pm 5°$$

The present manufacturing method will be described on the basis of an example of a preferable method for manufacturing a nonwoven fabric in accordance with the present invention.

Since, in a three-dimensional plexifilamentary fiber spun by a flash spinning, fibers connected in a network state which are different from an ordinary spun-bonded nonwoven fabric composed of fibers spun in an independent and individual state must be spread and dispersed, it is ordinary impossible to obtain a uniform nonwoven fabric.

The inventors of the present invention studied the shape of the three-dimensional plexifilamentary fiber in an spread and dispersed portion by instantaneous photographs of one-300 thousand seconds using a high speed photographing device, i.e., strobovision analyzer SVA·1 supplied by Sugahara Research Co. Since a method for spreading and dispersing the fiber by striking an unspread three-dimensional plexifilamentary fiber on a dispersion plate rotating at a high speed is suitable for a high production of a nonwoven web as a suitable spreading and dispersing technique, this method was adopted to make test pieces.

It was found by the above observation that the main cause of an irregular spreading of the fiber constituting a nonwoven sheet manufactured by the flash spinning is that poor spreading portions exist in the spread three-dimensional plexifilamentary fiber. Since the three-dimensional plexifilamentary fiber manufactured by flash spinning has a continuous three-dimensional network structure, the fiber has a quality whereby even if the fiber is spread, the fiber is easily collected as a flux portion having a width of several mm by a slight tension operating on the fiber.

Namely, the inventors were aware of the following, from previous experience:

① When the three-dimensional plexifilamentary fiber spread by striking against a rotational dispersion plate runs in an air space between the rotational dispersion plate and a web collecting face, a tension is generated on the fiber by a viscosity resistance between the fiber and air in an atmosphere. This tension has an effect of shrinking a width of the spread three-dimensional plexifilamentary fiber.

② Where the three-dimensional plexifilamentary fiber spread by striking against a rotational dispersion plate runs in the space between the rotational dispersion plate and the web collecting face, when a swing direction changing point of the three-dimensional plexifilamentary fiber appears in an air space above the web collecting face, an advancing speed of the fiber toward the web collecting face is reduced and the fiber floats down in the air space. The width of the spread fiber of the three-dimensional plexifilamentary fiber in this state is likely to shrink and the effect of an outside factor is felt, e.g., an influence of an air current in the atmosphere, and thus it was found that the spread fiber can be easily collected and formed into flux portions.

When the web including the above flux portions is used for manufacturing the nonwoven fabric by a suitable heat-bonding, the appearance of the above web becomes irregular, due to portions having a big fiber density and portions having a small fiber density mixed therein, and the irregularity of the unit weight of the web becomes extremely high.

The inventors realized the manufacturing method belonging to the classification I and having the above-mentioned constitution after much research, to obtain a nonwoven fabric having a satisfactory uniformity.

Preferably, a spreading and swinging rotational dispersion plate in which a swinging face constituting a skirt portion is substantially a plane and a cushioning face is a substantially a convex curved surface is used, and more preferably, that a distance between a lowermost portion of the rotational dispersion plate and a collecting face of the spread three-dimensional plexifilamentary fiber is made smaller than a distance between the lowermost portion of the rotational dispersion plate and a point where a swinging direction of the three-dimensional plexifilamentary fiber is changed.

The point where the swinging direction of the three-dimensional plexifilamentary fiber is changed is that where a three-dimensional plexifilamentary fiber moving reciprocally in a direction substantially perpendicular to an axis of the cylindrical portion of the rotational dispersion plate is turned back by a change of a moving direction.

A distance between the lowermost portion of the rotational dispersion plate and the collecting face of the three-dimensional plexifilamentary fiber is determined by a quantity of a solution exhausted by one spinning nozzle and a relationship between a position of the spinning nozzle and a position of the rotational dispersion plate, and this distance is made smaller than a distance between the lowermost portion of the rotational dispersion plate and the swinging direction charging point. Further, preferably the three-dimensional plexifilamentary fiber collecting face is in a position just front from the swinging direction changing point. A confirmation of this distance can be made by observation of the instantaneous photography at one-300 thousand seconds using the above high speed photographing device.

The rotational dispersion plate of the present invention is capable of guiding the three-dimensional plexifilamentary fiber onto the collecting face in a state such that a shape of a fully spread three-dimensional plexifilamentary fiber is constant. In both cases wherein a high speed fluid and a three-dimensional plexifilamentary fiber are blown out from the nozzle strike on the swinging portion or the cushioning portion in the skirt portion, the three-dimensional plexifilamentary fiber is spread in a fan-like shape having the same width, a falling speed in a downward direction of the fiber is substantially constant, and the fiber is guided without a generation of tension causing the spread three-dimensional plexifilamentary fiber to collect. Of course, although the fluid blown out from the nozzle partially flows in all directions upon striking the rotational dispersion plate, most of the fluid guides the three-dimensional plexifilamentary fiber to the collecting face.

When using the rotational dispersion plate in accordance with the present invention, the nonwoven fabric excluding a flux portion collected with the spread plexifilamentary fiber having a fiber density of 40 denier per a width of 1 mm or more, and a width of 5 mm or more and a length of 30 mm or more, can be obtained under any dispersion conditions.

The three-dimensional plexifilamentary fiber constituting the nonwoven fabric obtained by combining the rotational dispersion plate and the condition for making the lowermost portion of the rotational dispersion plate and the collecting face of the three-dimensional plexifilamentary fiber smaller than a distance between the lower portion of the rotational dispersion plate and the swinging direction changing point, excludes the above flux portion, and the width of the spread fiber is substantially constant over all of the area of the nonwoven fabric.

A degree of variability of the unit weight in a width direction of the nonwoven fabric is 0.3 or less, and a degree of variability of a laser spot light transmitting light volume in a width direction of the nonwoven fabric is 0.5 or less, and thus the nonwoven fabric in accordance with the present invention has an extremely good uniformity.

Although there is no limitation in the manufacturing method, the nonwoven fabric having a unit weight between 5 g/m$^2$ and 500 g/m$^2$, preferably between 15 g/m$^2$ and 300 g/m$^2$, is most useful.

It is possible to expand the utility of the nonwoven fabric of the flash spinning plexifilamentary fiber having an excellent feature as a special fiber by the above uniform nonwoven fabric, and the uniform nonwoven fabric has an unlimited application.

A preferable example of method of manufacturing the nonwoven fabric of the three-dimensional plexifilamentary fiber in accordance with the present invention and belonging to the classification I will be explained with reference to the attached drawings.

Figure 13:
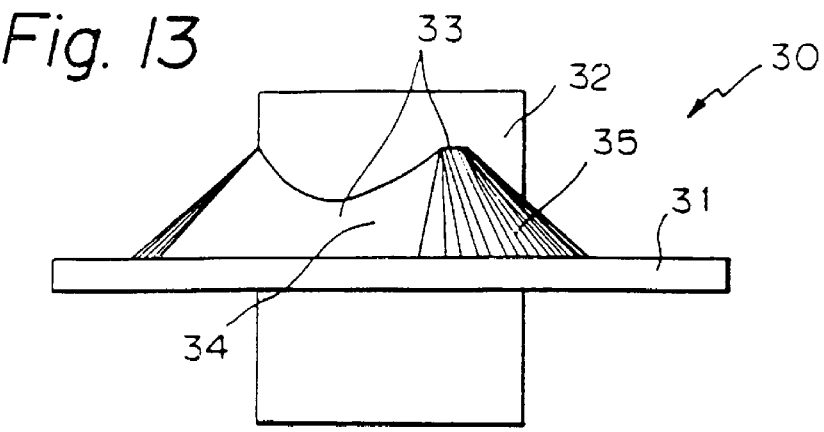
FIG. 13 is a schematic perspective view of a rotational dispersion plate which can be used to manufacture a nonwoven fabric in accordance with the present invention.
Figure 14A:
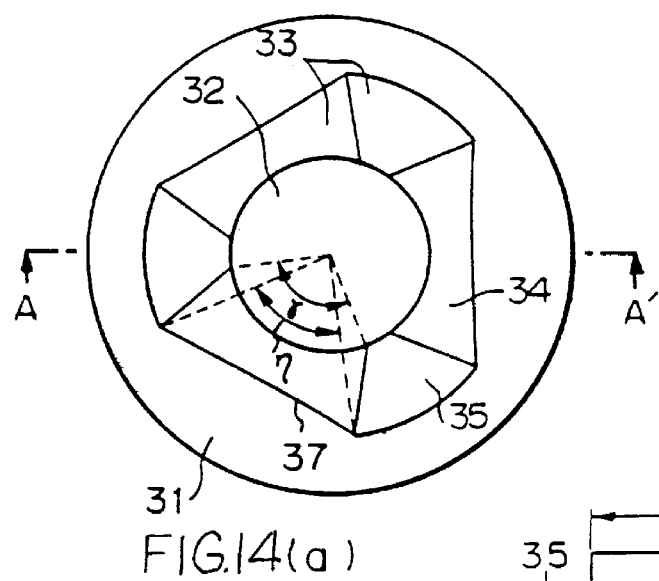
FIG. 14(a) is a plan view and FIG. 14(b) is a sectional view taken along a line A to A' in FIG. 4(a)
Figure 14B:
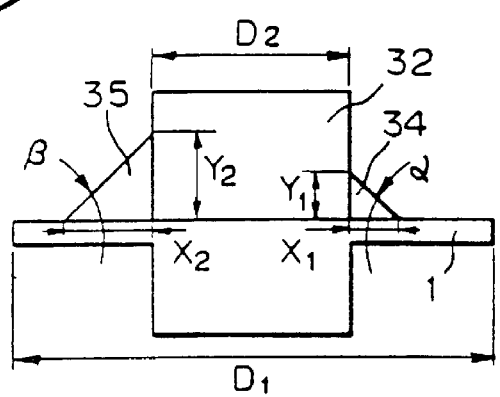

Reference numeral 32 in FIG. 13, 14(a) and 14(b) denotes a cylindrical protrusion which prevents blowing-out in an upper direction of a three-dimensional plexifilamentary fiber striking the skirt 33, and a high speed air current, and 31 is a disk which controls a running direction of the three-dimensional plexifilamentary fiber deflected by the skirt portion 33. The skirt portion 33 provides a swinging motion of the spread three-dimensional plexifilamentary fiber, to spread the three-dimensional plexifilamentary fiber and form a web having a wide width.

The skirt portion 33 is formed as a continuous face in which the swinging face 34 and the cushioning face are arranged alternately, and usually 2 or 3 swinging face 34 are arranged.

Preferably, the swinging face 34 has a substantially planar shape, and the cushioning face 35 has a substantially convex curved surface-like shape. The limitation that the swinging face 34 is substantially planar means that, a face shape thereof in which a line between the swinging face 34 and the surface of the disk is similar to a straight line as shown in FIG. 14(a). The swinging face 34 may be a curved surface in which the line has an extremely gentle curvature, i.e., a concave face or a convex face within a range in which the three-dimensional plexifilamentary fiber can be smoothly swung. But preferably a shape of an end connecting the swinging face 34 and the cushioning face 35 is formed such that a shape of the cushioning face 35 adjacent to the swinging face 34 is a fan-like shape having a width of the cushioning face in a position near to the disk broader than a width in a position near to the cylindrical portion.

The limitation that the cushioning face is a substantially convex curved surface means that the cushioning face is a conical curved face having a height of ½ at a point where the cushioning face crosses the cylindrical portion 32 shown in FIG. 14(b) is constant. However, the cushioning face may be a plane or a polyhedron face constituted with several planes as long as the effect of the cushioning face is maintained.

Further, each connecting line between the swinging face 34 or the cushioning face 35 and a side face of the cylindrical portion and a connecting line of the swinging face 34 and the cushioning face 35 against the upper surface of the disk 31 may be formed smoothly with a curvature.

The relationship between an inclined angle a formed by the swinging face 34 of the skirt portion 33 and the surface of the disk 31 as shown in FIG. 14(b), and an inclined angle β formed by the cushioning face 35 and the surface of the disk 31 as shown in FIG. 14(b) satisfy the equation $\alpha=\beta\pm5°$. It is important in the present invention that the above relationship preferably satisfies the equation $\alpha=\beta$. When the latter equation is satisfied, the cushioning face 35 has a fan-like shape in which a width in a position near to the disk 31 is broader than a width in a position near to the cylindrical portion 32. When the cushioning face 35 is a wedge-like shape in which a width in a position near to the disk 31 is narrower than a width in a position near to the cylindrical portion 32, as disclosed in U.S. Pat. No. 3,497,918, the inclined angle α of the swinging portion 34 and the inclined angle β of the cushioning portion 35 do not satisfy the above relationship, and the inclined angle β of the cushioning portion 35 becomes small compared with the inclined angle α of the swinging portion 34. A function of this rotational dispersion plate against the three-dimensional plexifilamentary fiber is shown in FIG. 18.

A range of the inclined angle α may be between 30° and 60°, and is selected on the basis of a relationship between an exhausted flow rate and a desired width of a web. Since the momentum lost by a collision of the three-dimensional plexifilamentary fiber and the high speed fluid becomes small when the inclined angle α is big, a momentum of guiding the three-dimensional plexifilamentary fiber or the collecting face becomes large and a web having a wide width is formed.

The shapes of the swinging face 34 and the cushioning face 35 in the rotational dispersion plate are automatically determined, when each length of $X_1$, $Y_1$, $X_2$, $Y_2$ shown in FIG. 14(b) and swinging angles γ and η about a center of the swinging face 34 are determined. A relationship between the lengths of $X_1$ and $Y_1$ and the length of $X_2$ and $Y_2$ is determined on the basis of the relationship between the inclined angles α and β.

Figure 15:
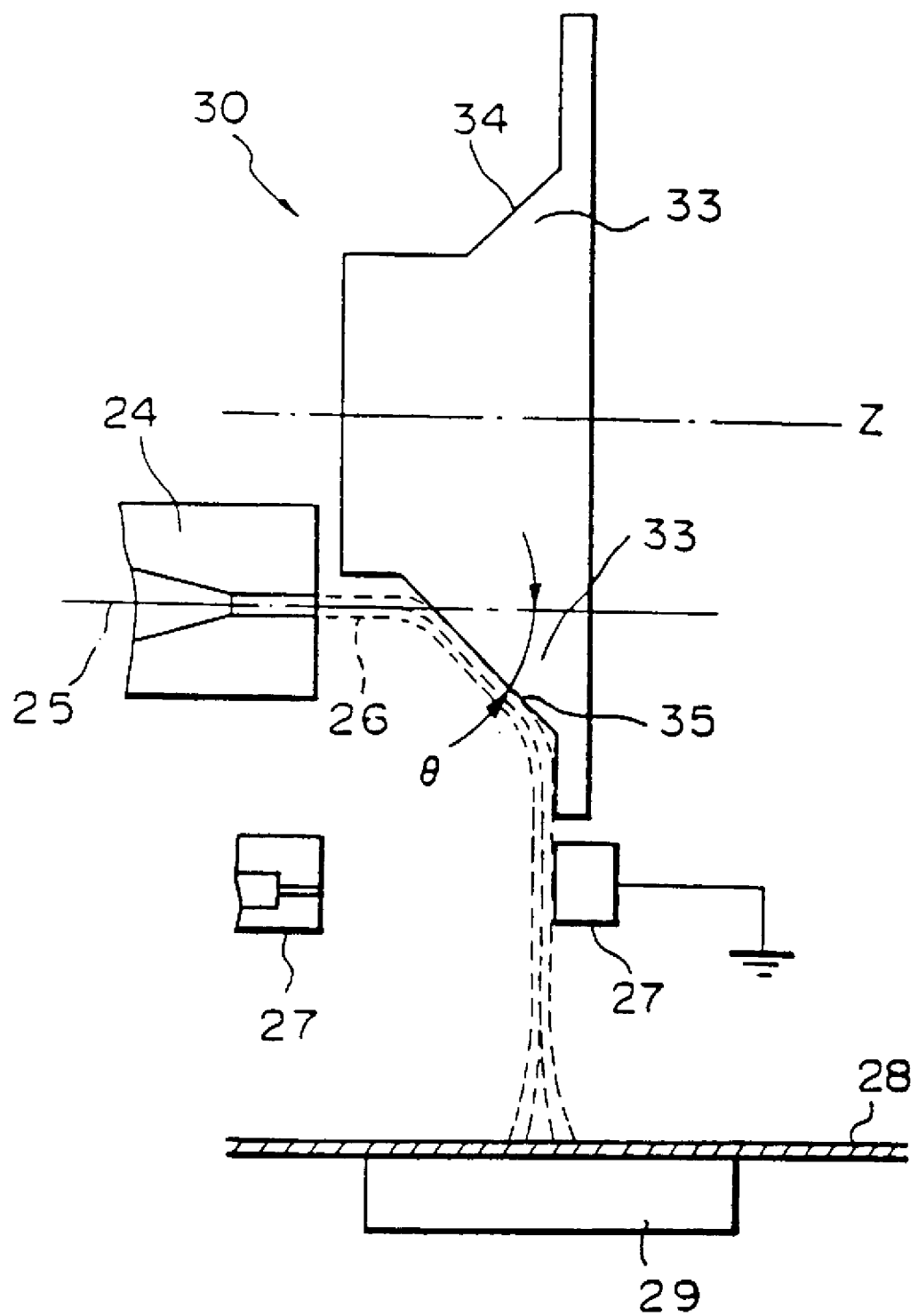
FIG. 15 is a schematic front view of the rotational dispersion plate in accordance with the present invention, and explaining a function of the dispersion plate with regard to the fiber.

As shown in FIG. 15, the unspread three-dimensional plexifilamentary fiber 26 flowing together with the high speed fluid from the nozzle 24, strikes the skirt portion 33 of the rotational dispersion plate arranged near to a top end of the nozzle 24 and is spread and separated into some fibrils, so that the running direction of the three-dimensional plexifilamentary fiber is changed. The swinging face 34 and the cushioning face 35 constituting the above skirt portion 33 is arranged with an inclined angle θ against an axis 25 of the nozzle.

Further, as shown in FIG. 15, it is preferable to spread uniformly the plexifilamentary fiber and to obtain an uniform nonwoven web wherein an electric charge is applied to the spread three-dimensional plexifilamentary fiber by a corona discharge device 27 or the like just after the plexifilamentary fiber is separated from the rotational dispersion plate. Since a degree of spreading of the three-dimensional plexifilamentary fiber separated from the rotational dispersion plate is uniform over all the operation time, it is possible to cause a dispersion by an electrostatic force generated from the corona discharging device, to make it extremely uniform. Since it is possible to overlap the spread three-dimensional plexifilamentary fiber in a staple state on the collecting face 28 by using the above means, it is possible to control disturbance of the web caused by an air current on the collecting face and further improve the uniformity of the nonwoven web.

FIGS. 16(a) to 16(d) are schematic views showing the results of observations of an operational state of the rotational dispersion plate in accordance with the present invention against the three-dimensional fiber, by a high speed photographical device, when the rotational dispersion plate is arranged such that the swinging direction changing point is on the collecting face.

The rotational dispersion plate is rotated about a rotational axis Z shown in FIG. 15 at a speed of between 100 r.p.m. and 3,000 r.p.m. by a 200 W servomotor, so that an actual swinging number of the three-dimensional plexifilamentary fiber is between 300 r.p.m. and 9,000 r.p.m.

Figure 16A:
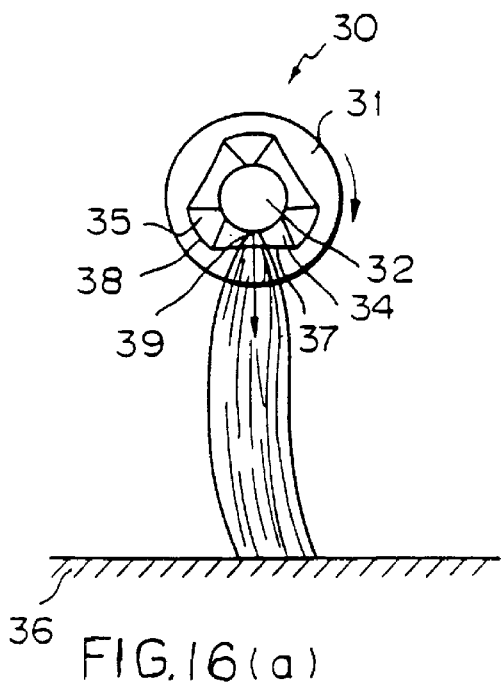
FIGS. 16(a) to 16(d) are views schematically prepared from observations with a high speed photographic device and illustrating sequentially in detail the functions of the rotational dispersion device in accordance with the present invention with regard to the three-dimensional plexifilamentary fiber, when the rotational dispersion plate is arranged at a position such that a changing point of a swinging movement of the three-dimensional plexifilamentary fiber is arranged on a collecting surface.
Figure 16C:
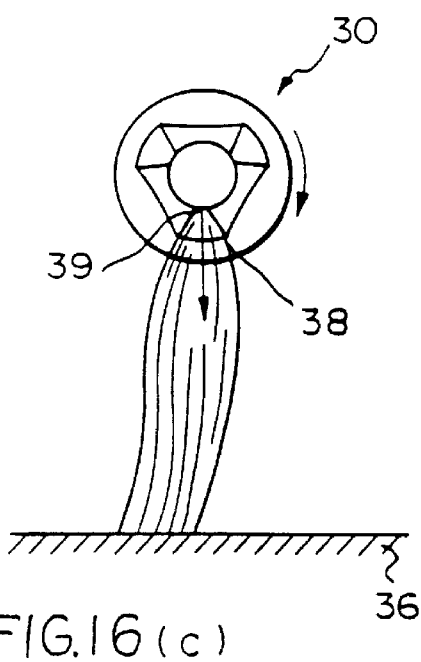
Figure 16B:
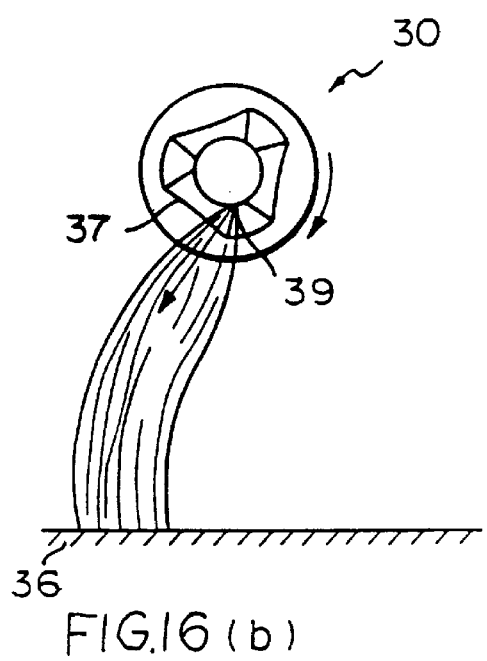
Figure 16D:
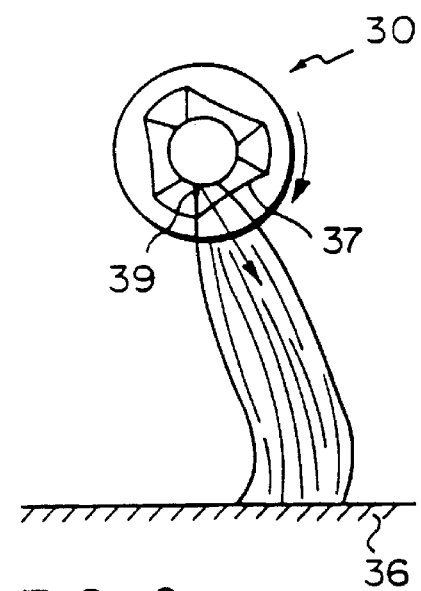
Figures 17A, 17C:
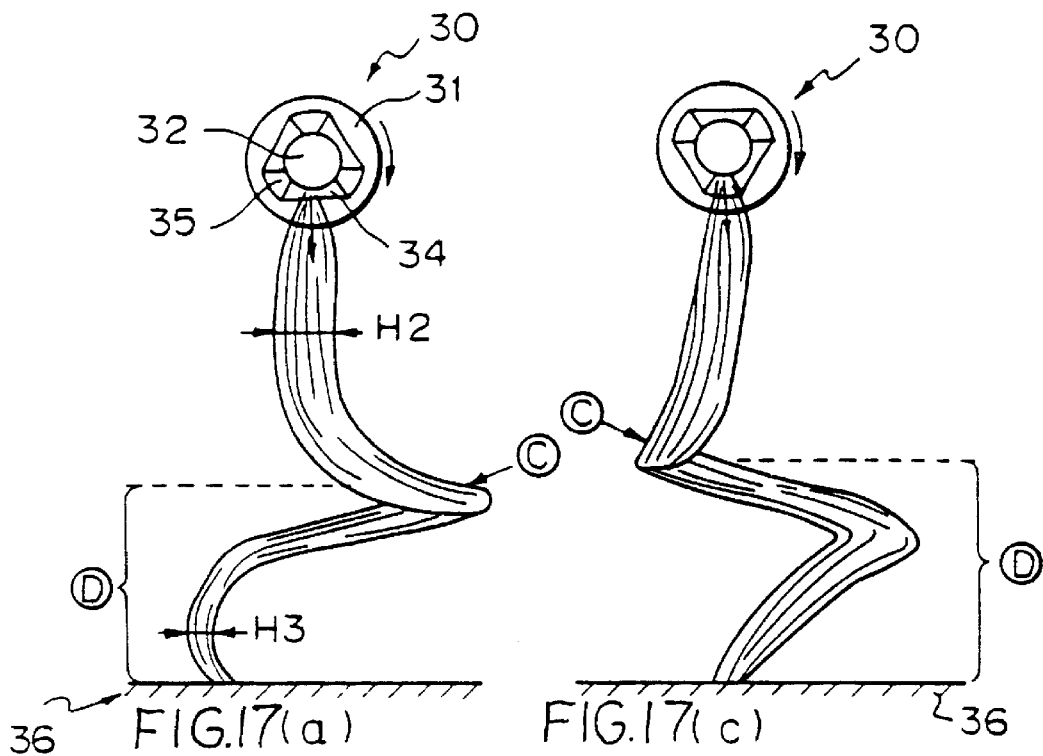
FIGS. 17(a) to 17(d) are views schematically prepared from observations with a high speed photographic device and illustrating sequentially in detail the functions of the rotational dispersion device in accordance with the present invention with regard to the three-dimensional plexifilamentary fiber, when the rotational dispersion plate is arranged at a position such that the changing point of the swinging movement of the three-dimensional plexifilamentary fiber is arranged at a position above the collecting surface.
Figures 17B, 17D:
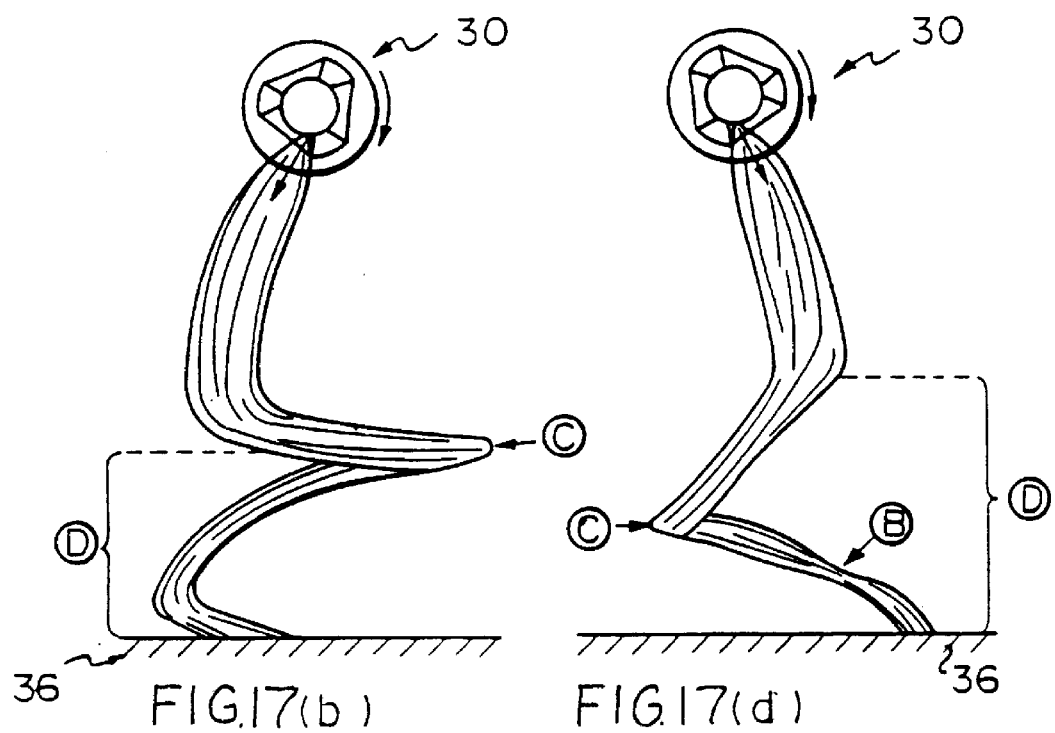

FIG. 16(a) shows a state in which the three-dimensional plexifilamentary fiber stricking a central portion of the swinging face 34 is spread on the rotational dispersion plate and falls down in a substantial perpendicular direction. FIG. 16(b) shows a state in which the rotational dispersion plate is rotated from the position shown in FIG. 16(a) by the angle of about 50°, and the three-dimensional plexifilamentary fiber stricking a right end portion of the swinging face 34 is spread on the rotational dispersion plate and falls down in a left diagonal direction on the drawing. FIG. 16(c) shows a state in which the rotational dispersion plate is rotated from the position shown in FIG. 16(b) by the angle of about 10°, and the three-dimensional plexifilamentary fiber stricking the central portion of the swinging face 34 of the rotational dispersion plate 30 is spread on the rotational dispersion plate and falls down in a substantially perpendicular direction. FIG. 16(d) shows a state in which the rotational dispersion plate is further rotated from the position shown in FIG. 16(c) by the angle of about 10°, and the three-dimensional plexifilamentary fiber stricking a left end portion of the swinging face 34 of the rotational dispersion plate 30 is spread on the rotational dispersion plate and falls down in a right diagonal direction on the drawing. As shown in FIGS. 16(a) to 16(d), the three-dimensional plexifilamentary fiber stricking the rotational dispersion plate is spread into a fan-like shape, running in the direction of a perpendicular line standing from a fiber striking point 39 toward a connecting line between the skirt portion 33 and the upper surface of the disk 31, i.e., a connecting line 37 between the swinging face 34 and the upper surface of the disk 31 or a connecting line 38 between the cushioning face 35 and the upper surface of the disk 31, while the spread state of the three-dimensional plexifilamentary fiber is maintained, and is guided by the fluid onto the collecting face 36.

When comparing FIG. 16(a), FIG. 16(b), and FIG. 16(d), showing the falling state of the three-dimensional plexifilamentary fiber after the plexifilamentary fiber strikes the swinging face 34 of the rotational dispersion plate, with FIG. 16(c) showing the falling state of the three-dimensional plexifilamentary fiber after the plexifilamentary fiber strikes the cushioning face 35, it is confirmed that the spread state of the three-dimensional plexifilamentary fiber is substantially identical and the plexifilamentary fiber is guided onto the collecting face 36. Further, irregularity of the spreading of the fiber, a partial collection of the three-dimensional fiber, and a buckling of the fiber in air cannot be seen. Namely, even if the rotational dispersion plate rotates at a high speed, the three dimensional plexifilamentary fiber swings but the spread width of the three-dimensional fiber is not changed according to a position of the striking point, and the running three-dimensional plexifilamentary fiber is uniformly guided onto the collecting face.

FIGS. 18(a) to 18(d) are schematic views of observations of the operations of a rotational dispersion plate having a cushioning face which is wedge-like as disclosed in FIGS. 3 and 4 of U.S. Pat. No. 3,497,918, against the three-dimensional plexifilamentary fiber in the same manner as in FIGS. 16(a) to 16(d).

A stopping position of the rotational dispersion plate in FIGS. 18(a) to 18(d) corresponds to that in FIGS. 16(a) to 16(d), respectively.

Figure 18A:
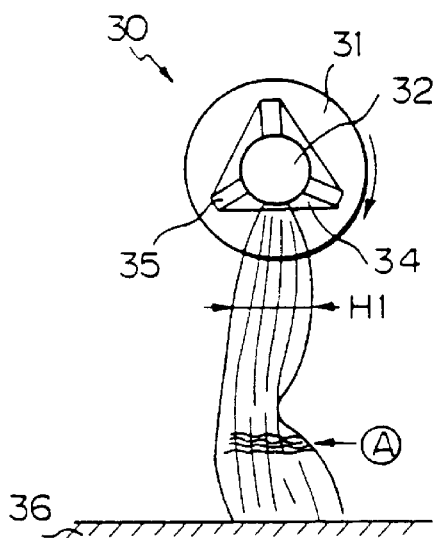
FIGS. 18(a) to 18(d) are views schematically prepared from observations with a high speed photographic device and illustrating sequentially in detail functions of a conventional known rotational dispersion plate with regard to a fiber.
Figure 18C:
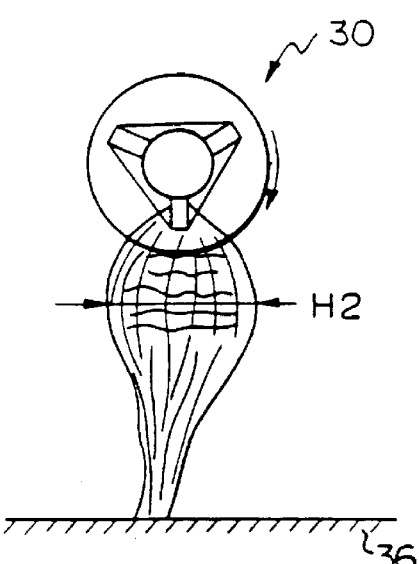
Figure 18B:
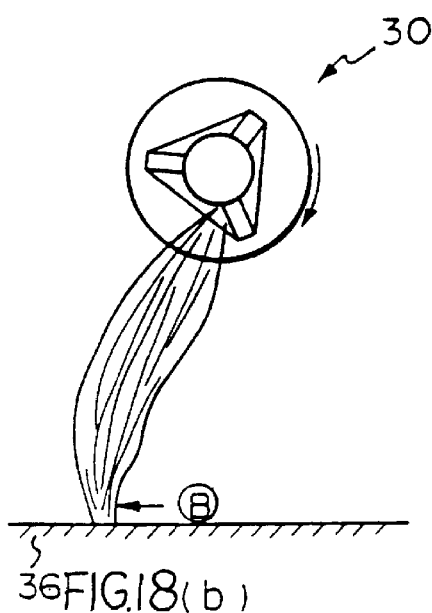
Figure 18D:
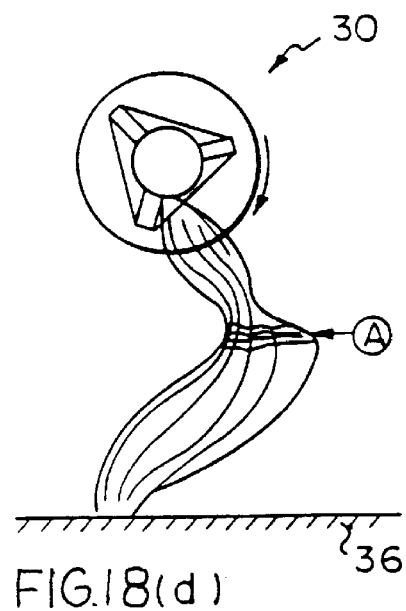
Figure 19A:
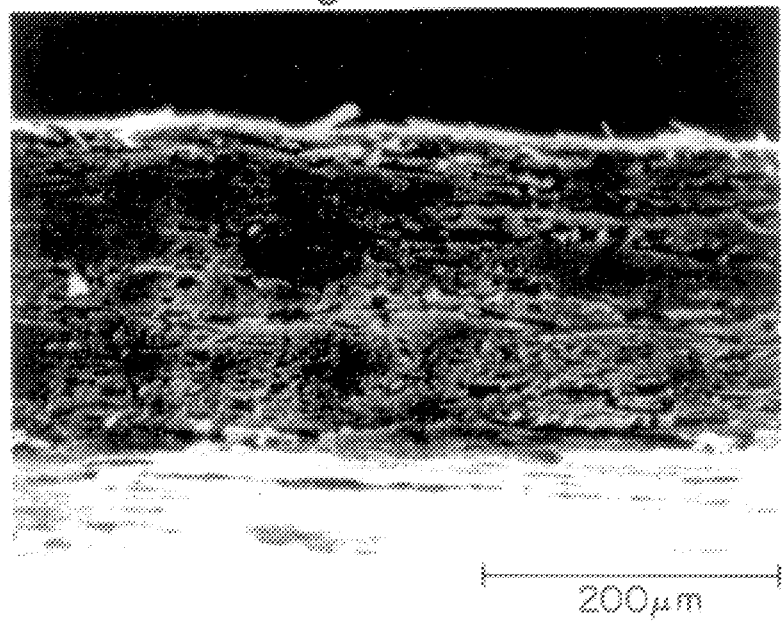
FIG. 19(a) shows the cross section of the nonwoven fabric in accordance with the present invention.
Figure 19B:
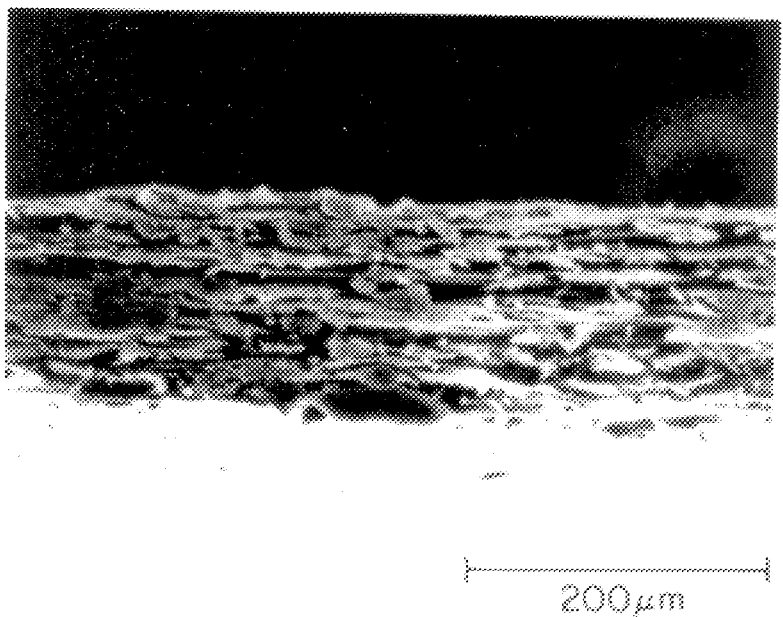
Figure 20A:
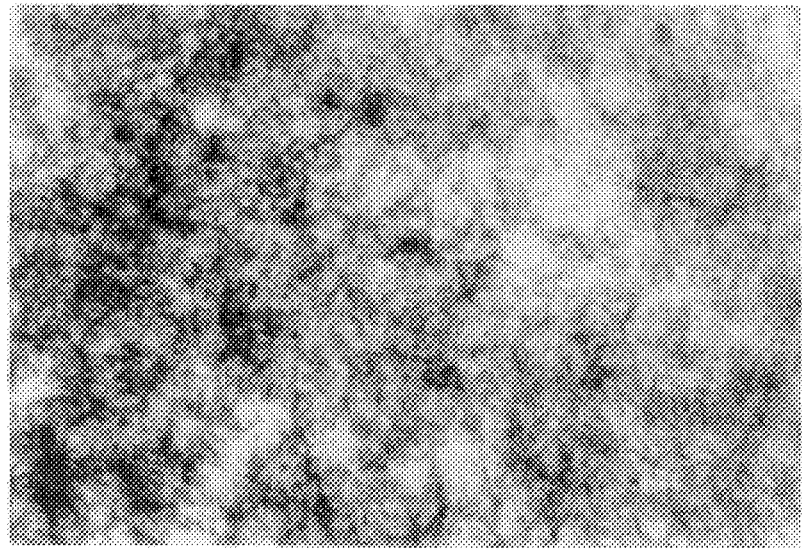
FIG. 20(a) shows the surface of the nonwoven fabric in accordance with the present invention.
Figure 20B:
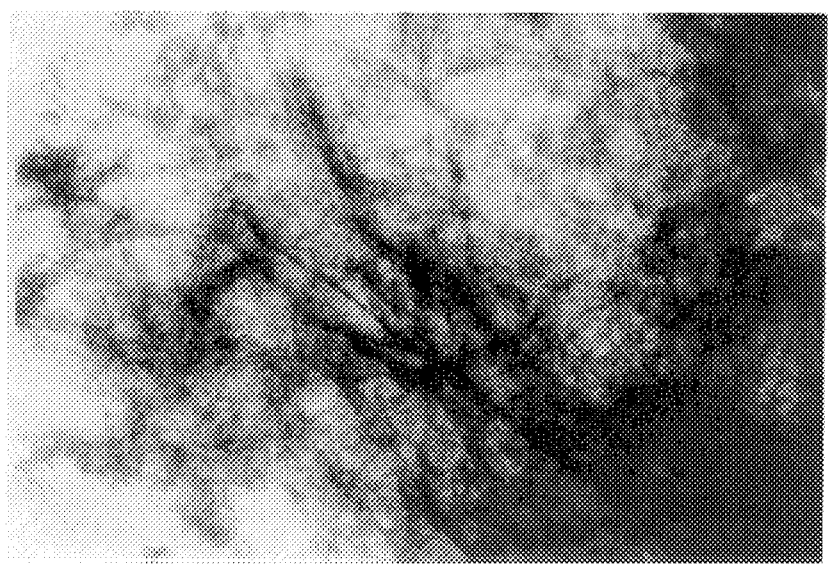
FIG. 20(b) shows the surface of a comparative example of the known nonwoven fabric.

When comparing a spread width H2 of the three-dimensional plexifilamentary fiber striking the cushioning face 35 and shown in FIG. 18(c) with a spread width H1 of the three-dimensional plexifilamentary fiber striking the swinging face 34 as shown in FIGS. 18(a), 18(b) and FIG. 18(d), it is confirmed that the width H2 is about 1.5 to 2.0 times the width H1, and this means that the spreading quality of this rotational dispersion plate is irregular.

A tension generated in a falling three-dimensional plexifilamentary fiber changes pulsatively during the rotation of the rotational dispersion plate, and thus the spread width of the three-dimensional plexifilamentary fiber changes as shown in the drawing, and thus it is confirmed that a buckling portion Ⓐ and a partial collected portion Ⓑ of the spreaded three-dimensional plexifilamentary fiber as shown in FIGS. 18(a), 18(b) and 18(c) are induced.

FIGS. 17(a) to 17(d) are schematic views of observations of operations of a rotational dispersion plate against the three dimensional plexifilamentary fiber when the rotational dispersion plate in accordance with the present invention is arranged such that a swinging direction changing point of the three-dimensional plexifilamentary fiber is above the collecting face, in the same manner as in FIGS. 16(a) to 16(d).

A stopping position of the rotational dispersion plate in FIGS. 17(a) to 17(d) corresponds to that in FIGS. 16(a) to 16(d), respectively.

As shown in FIGS. 17(a) to 17(d), when a swinging direction changing point Ⓒ of the three-dimensional fiber is above the collecting face, it is confirmed that a spread width H3 of the three-dimensional plexifilamentary fiber falling in a space below from the swinging direction changing point becomes narrow compared with an spread width H2 of the three-dimensional plexifilamentary fiber falling in a space above the swinging direction changing point.

Further, the three-dimensional plexifilamentary fiber falling in the space below from the swinging direction changing point is in a floating state and has a slow falling speed, as shown in region Ⓓ of the drawing. This floating three dimensional plexifilamentary fiber is likely to be affected by an external factor, e.g., an air current in an atmosphere, and a portion Ⓑ in which the fiber is slightly collected and having a smaller fiber density than 40 denier per width of 1 mm, is likely to be generated.

The present invention will now be described in detail with reference to the following experimental examples.

EXPERIMENTAL EXAMPLE 1

High-density polyethylene was flash-spun according to the method shown in the flow sheet of FIG. 10.

The used extruder and the mechanical mixing apparatus attached to the screw of the extruder are diagrammatically illustrated in FIG. 8.

The dimensions of the respective parts are as follows. Namely, the screw has a diameter of 35 mm, the feeding zone has a length of 315 mm and a depth of 5 mm, the compressing zone has a length of 315 mm and a depth of 5→1.6 mm, and the metering zone has a length of 245 mm and a depth of 1.6 mm. The Dulmage zone has a multi-fluted structure and has a length of 210 mm and a diameter of about 50 mm. The used screw has 16 flutes having a semicircular shape. The flute depth is 3.6 mm (maximum) and the thread angle is 35° to the right. The pin mixing zone comprises a plurality of rows of cylindrical pins, and the pins are arranged in 17 rows, each consisting of 8 pins. The pin mixing zone has a length of 285 mm and a diameter of about 50 mm. In this pin mixing zone, the pins are implanted on a shaft coaxial with the screw, and also on the barrel side, pins having the same shape are implanted in 17 rows, each consisting of 8 pins. When the screw is rotated, movable pins coaxial with the screw move between adjacent static pins to mix a polymer with a solvent. The distance between the barrel and the movable pin shaft is 7 mm. The system further comprises a static mixing zone represented by reference numeral 9 in FIG. 10. The mixing element used is a mixer Model SMX supplied by Sulzer Co. (nominal diameter=15 mm). The mixing element comprises metal pieces welded crosswise in two parallels, and these mixing elements are arranged in the state staggered from one another by 90°. Fifty stages of these mixing element were used.

A solvent feed opening was formed on each mixing apparatus zone, and each mixing apparatus zone was connected to plunger pumps. A spinning apparatus represented by reference numeral 7 in FIG. 10 was attached to the top of this extruding and dissolving apparatus. The spinning apparatus comprised a filter for the filtration, a pressure let-down orifice having a diameter of 0.6 mm and a length of 5 mm, a pressure let-down chamber having a volume of about 2 cc and a spinning nozzle having a hole having a diameter of 0.55 mm and a length of 0.55 mm and a subsequent tunnel flare having a diameter of 3 mm and a length of 3 mm.

High-density polyethylene (MI=0.31, Mw/Mn=4.8, density=0.960 g/cm$^3$) as the polymer was supplied from the hopper of the extruder and the same amount of fron 11 was supplied from two metering pumps. The polymer concentration was adjusted to 12.0% by weight at a polymer flow rate of 8.8 kg/hr. At this point, the solution had a temperature of 190° C. and a pressure of 350 kg/cm$^2$, and in the pressure let-down chamber, the temperature was 190° C. and the pressure was 110 kg/cm$^2$. Accordingly, the difference of the pressure before and after the pressure let-down orifice was 240 kg/cm$^2$. The conditions in the pressure let-down chamber was those of the single-liquid-phase region. Accordingly, a highly fibrillated, white continuous three-dimensional plexifilamentary fiber was extruded from the spinning nozzle.

The fiber had a fineness of 112 d and a specific surface area of 48 m$^2$/g. The long period of the X-ray small-angle scattering was 165 Å and the scattering intensity ratio by the long period was 6.7.

At the tensile test where the twist number was 4 twists per cm, the initial modules was 40.3 g/d and the strength at break was 9.5 g/d.

At the TMA test, temperature at 130° C. was 1.5%, and at the vibronic test, the temperature at which the dynamic viscoelastic modulus was 10$^{10}$ dyn/cm$^2$ was 123° C. and the temperature at which the crystal dispersion of tan δ started was 127° C.

The orientation angle by the X-ray diffractometry was 16°, and the orientation coefficient $F_D^{20}$ by the infrared absorption dichroism at a wave number of 2017 cm$^1$ was 0.50. The microwave birefringence was 0.149.

MI of this fiber was 0.35 and Mw/Mn was 4.6.

EXPERIMENTAL EXAMPLE 2

An experimental high-pressure autoclave having a volume of about 500 cc was charged with 77.7 g of high-density polyethylene (MI=0.31, Mw/Mn=4.8, density=0.960 g/cm$^3$), and air in the autoclave was removed and 570 g of fron 11 was added into the autoclave. The polymer was dissolved with stirring by heating under pressure to form a solution having a polymer concentration of 12% by weight. The temperature of the solution was adjusted to 185° C. Stirring was stopped and immediately, a bottom valve connected to a spinning assembly was spread while applying a back pressure so that the inner pressure of the autoclave was maintained at 295 kg/cm$^2$·G, whereby flash spinning was carried out. The spinning assembly was a spinning nozzle comprising a pressure let-down orifice having a diameter of 0.4 mm and a length of 5 mm, a pressure let-down chamber having a volume of about 2 cc, a hole having a diameter of 0.5 mm and a length of 0.5 mm and a subsequent tunnel flare having a diameter of 3 mm and a length of 3 mm.

At the spinning operation, the pressure in the pressure let-down chamber was 10 kg/cm$^2$ and the temperature was maintained at 185° C.

A highly fibrillated, continuous three-dimensional plexifilamentary fiber was obtained from the spinning nozzle.

The fiber had a fineness of 85 d and a specific surface area of 40 m$^2$/g. The long period of the X-ray small-angle scattering was 168 Å and the scattering intensity ratio by the long period was 7.2.

At the tensile test where the twist number was 4 twists per cm, the initial modulus was 36.7 g/d and the strength at break was 9.0 g/d.

The phase diagram of a 12% by weight solution of high-density polyethylene in fron 11, used at this experiment, is shown in FIG. 1. The conditions in the autoclave are indicated by point A and the conditions in the pressure let-down chamber are indicated by point B, and it is seen that spinning at this experiment was spinning from the single-liquid-phase region produced by the large pressure difference.

Comparative Example 1

The same starting material as used in Experimental Example 2 was used, and flash spinning from the same solution having the polymer concentration of 12% by weight, as used in Experimental Example 2, was carried out. The pressure let-down chamber and spinning nozzle in the spinning assembly were the same as those used in Experimental Example 2, but a pressure let-down orifice having a diameter of 0.5 mm and a length of 5 mm was used. The solution temperature was 185° C. and the same as in Experimental Example 2, but the pressure in the autoclave was changed to 120 kg/cm$^2$.

The temperature in the pressure let-down chamber was 184° C. and the pressure was 70 kg/cm$^2$·G.

A plexifilamentary fiber having a fineness of 77 d was obtained, but the fibrils were thicker than those of the fiber obtained in Experimental Example 2, and the specific surface area of the fiber was 20 m$^2$/g.

At the tensile test where the twist number was 4 twists per cm, the initial modulus was 18 g/d and the strength at break was 4.3 g/d.

The conditions in the autoclave and the conditions in the reduced pressure in the present example are indicated by points C and D, respectively, in the phase diagram of FIG. 1.

EXPERIMENTAL EXAMPLE 3

By using the dissolving apparatus used in Experimental Example 1, a fron 11 solution of high-density polyethylene having MI of 0.78, Mw/Mn of 8.0 and a density of 0.962 g/cm$^3$, which had a polymer concentration of 12.0% by weight, was prepared, and spinning was carried out. A spinning assembly comprising a pressure let-down orifice having a diameter of 0.6 mm and a length of 5 mm and a spinning nozzle including a hole having a diameter of 0.5 mm and a length of 0.5 mm and a tunnel flare having a diameter of 4 mm and a length of 4 mm was used.

At a polymer flow rate of 7.4 kg/hr, the solution pressure of 270 kg/cm$^2$·G was reduced to 98 kg/cm$^2$·G (the temperature was 186° C.) as the pressure in the pressure let-down chamber, and a purely white continuous three-dimensional plexifilamentary fiber having a fineness of 106 d was extruded from the spinning nozzle. The condition in the pressure let-down chamber were those of the single-liquid-phase region.

The fiber had a specific surface area of 38 m$^2$/d, and at a tensile test where the twist number was 4 twists per cm, the initial modulus was 33 g/d and the strength at break was 7.9 g/d.

From the X-ray small-angle scattering of this fiber, it was found that the long period was 175 Å and the long period scattering intensity ratio was 15.0.

At the TMA test, the elongation at 130° C. was 1.5%, and at the vibronic test, the temperature at which the dynamic elastic modulus was 10$^{10}$ dyn/cm$^2$ was 120° C. and the temperature at which the crystal dispersion of tan δ started was 124° C.

The orientation angle of the fiber by the X-ray diffractometry was 20°, and the infrared orientation coefficient $F_D{}^{20}$ was 0.53. It was confirmed that the fiber was highly oriented.

MI of the fiber was 0.93 and Mw/Mn was 6.3.

EXPERIMENTAL EXAMPLE 4

A homogeneous solution having a polymer concentration of 9.2% by weight was prepared by using the same apparatus, polymer and solvent as used in Experimental Example 1, and flash spinning was carried out by using a spinning assembly including a pressure let-down orifice having a diameter of 0.55 mm and a length of 5 mm and a spinning nozzle having a hole having a diameter of 0.55 mm and a length of 0.5 mm and a subsequent tunnel flare having a diameter of 3 mm and a length of 3 mm.

At a polymer flow rate of 7.5 kg/hr, the solution had a temperature of 191° C. and a pressure of 325 kg/cm$^2$·G, and in the pressure let-down chamber, the temperature was 191° C. and the pressure was changed to 110 kg/cm$^2$·G. The solution was extruded into the atmospheric pressure from the spinning nozzle to obtain a purely white continuous three-dimensional plexifilamentary fiber having a fineness of 101 d.

The specific surface area of the fiber was 41 m$^2$/g.

The long period of the X-ray small-angle scattering was 162 Å, and the scattering intensity ratio by the long period was 8.4.

At the tensile test where the twist number was 4 twists per cm, the initial modulus was 38.5 g/d and the strength at break was 9.3 g/d.

At the TMA test, the elongation at 130° C. was 1.5%, and at the vibronic test, the temperature at which the dynamic elastic modulus was 10$^{10}$/cm$^2$ was 122° C. and the temperature at which the crystal dispersion of tan δ started was 126° C.

The orientation angle by the X-ray diffractometry was 18° and the orientation coefficient $F_D{}^{20}$ by the infrared dichroism at a wave number of 2017 cm$^{-1}$ was 0.43. The microwave birefringence was 0.147.

MI of the fiber was 0.34 and Mw/Mn was 4.8.

EXPERIMENTAL EXAMPLE 5

By using the same dissolving apparatus and spinning assembly as used in Experimental Example 1, a fron 11 solution of high-density polyethylene having MI of 0.78, Mw/Mn of 8.0 and a density of 0.962 g/cm$^3$, which had a polymer concentration of 12.4% by weight, was prepared and spinning was carried out.

The solution pressure was 210 kg/cm$^2$·G at a polymer low rate of 9.7 kg/hr and the solution pressure was hanged to 83 kg/cm$^2$·G in the pressure let-down chamber (the temperature in the pressure let-down chamber was 190° C.), and a purely white continuous three-dimensional plexifilamentary fiber having a fineness of 145 d was extruded from the spinning nozzle.

The specific surface area of the fiber was 33 m$^2$/g.

The long period of the X-ray small-angle scattering was 173 Å, and the scattering intensity ratio by the long period was 19.2.

At the tensile test where the twist number was 4 twists per cm, the initial modulus was 23.6 g/d and the strength at break was 7.4 g/d.

At the TMA measurement test, the elongation at 130° C. was 1.7%, and at the vibronic test, the temperature at which the dynamic modulus was 10$^{10}$ dyn/cm$^2$ was 116° C. and the temperature at which the crystal dispersion of tan δ started was 124° C.

The crystal orientation angle by the X-ray diffractometry was 27° and the infrared orientation coefficient $F_D{}^{20}$ at a wavenumber of 2017 cm$^{-1}$ was 0.51. The microwave birefringence was 0.133.

It was found by the measurement that the spun fiber had MI of 0.94 and Mw/Mn of 6.0.

Comparative Example 2

By using the same dissolving apparatus as used in Experimental Example 1, a fron 11 solution of high-density polyethylene (MI=5.0, Mw/Mn=7.0, density=0.969 g/cm) having a polymer concentration of 10% by weight was prepared and the solution was spun. The spinning assembly used comprised a pressure let-down orifice having a diameter of 0.7 mm and a length of 5 mm and a spinning nozzle including a hole having a diameter of 0.7 mm and a length of 0.7 mm and a subsequent tunnel flare having a diameter of 4 mm and a length of 4 mm.

At a polymer flow rate of 8.8 kg/hr, the solution pressure was 130 kg/cm$^2$·G, and in the pressure let-down chamber, the solution pressure was reduced to 53 kg/cm$^2$·G (the temperature was 173° C.). A continuous three-dimensional plexifilamentary fiber having a fineness of 157 d was obtained from the spinning nozzle. The conditions in the pressure let-down chamber were those of the two-liquid-phase region.

The fiber had a specific surface area of 18 m²/g, and at a tensile test where the twist number was 4 twists per cm, the initial modulus was only 10.8 g/d and the strength at break was only 3.8 g/d.

At the measurement of the X-ray small-angle scattering, it was found that the long period was 133 Å and the scattering intensity ratio was 52.4.

At the TMA measurement, the elongation at 130° C. was 3.6%, and at the vibronic measurement, the temperature at which the crystal dispersion of tan δ was 113°C. It was thus found that the fiber was poor in the thermal properties.

The fiber was drawn at a draw ratio of about 2 on a hot plate heated at 120° C. in the state where the fiber was twisted at a twist number of 4 twists per cm.

At the tensile test, it was found that the initial modulus and strength at break of the heat-drawn fiber were improved to 19.2 g/d and 10.1 g/d, respectively. However, the yarn became transparent and the specific surface area was reduced to 9.1 m²/d.

At the measurement of the X-ray small-angle scattering, it was found that the long period shifted to 235 Å and the scattering intensity ratio increased to 90.

EXPERIMENTAL EXAMPLE 6

According to the process shown in the flow chart of FIG. 5, flash spinning was carried out by using the extruder screw shown in FIG. 6 (hereinafter referred to as "method A1") or the extruder screw and special mixing structure shown in FIG. 8 (hereinafter referred to as "method A2").

The extruder shown in FIG. 5 has a barrel diameter of 35 mm. The screw used in the method A1 is now described by using reference numerals given in FIG. 6. The length of the feeding zone represented by reference numeral 12 is 316 mm (9 threads) and the flute depth is about 5 mm. The length of the compressing zone 13 is 245 mm (7 threads) and the front metering zone 14 has s length of 140 mm (4 threads) and a flute depth of 1.6 mm. The solvent-adding zone 15 has a length of 70 mm (2 threads) and a flute depth of 3 mm, and the rear metering zone (mixing and dissolving zone) 16 has a length of 140 mm (4 threads) and a flute depth of 1.6 mm. A screen apparatus was attached to the top end of the extruder and the spinning apparatus was attached through conduits. In the spinning apparatus, the orifice diameter of the pressure let-down chamber is 0.5 mm, the volume of the reduced pressure is about 2 cc and the diameter of the spinning orifice is 0.5 mm.

Supply of the solvent to the extruder was performed through a feed opening 18 by using two plunger pumps.

Spinning was carried out by using a solution of high-density polyethylene having a melt index (MI) of 5.0 (the weight average molecular weight was about $9 \times 10^4$) (Suntec J-240 supplied by Asahi Kasei) in fron 11, which had a polymer concentration of 11% by weight. More specifically, the operation was performed at an extruder barrel temperature of 230° C., a screw rotation number of 50 rpm, a polymer flow rate of 77 g/min and a solvent flow rate of 623 g/min. The heating temperature in the conduits downstream of the top end of the extruder and the spinning apparatus was 175° C., and the heating temperature of the solvent was 100° C. In this case, the liquid temperature just before spinning was 175° C. and the pressure in the pressure let-down chamber was about 40 kg/cm²·G. The spinning state was very stable and the variation of the pressure in the pressure let-down chamber was within 4 to 5 kg/cm²·G. The pressure at the top end of the extruder was about 200 kg/cm²·G, but the solvent did not leak from any part. A hollow metal O-ring was used for sealing of the flange portion, but leakage of the solution was not caused at all.

If the extrusion rate was further increased so that the polymer flow rate was 110 g/min and the solvent flow rate was 890 g/min, the variation of the pressure in the pressure let-down chamber drastically increased and exceeded 10 kg/cm²·G, and stable spinning was substantially impossible.

Then, spinning was carried out according to the method A2. The shape of the special mechanical mixing zone is diagrammatically illustrated in FIG. 8. The dimensions of respective parts are described below. In the screw, the feeding zone has a length of 315 mm and a depth of 5 mm, the compressing zone has a length of 315 mm and a depth of 5→1.6 mm, and the metering zone has a length of 245 mm and a depth of 1.6 mm. The Dulmage zone has a multi-fluted structure having a length of 210 mm and a diameter of 50 mm. The screw used has 16 flutes having a semicircular shape. The flute depth is 3.6 mm (maximum) and the thread angle is 35° to the right. The pin mixing zone comprises a plurality of rows of cylindrical pins and has a length of 285 mm and a diameter of about 50 mm. The pins are arranged in 17 rows, each consisting of 8 pins. In this pin mixing zone, the pins are implanted on a shaft coaxial with the screw, and also on the barrel side, pins having the same shape are implanted in 17 rows, each consisting of 8 pins. When the screw is rotated, movable pins coaxial with the screw move between adjacent static pins to mix a polymer with a solvent.

The distance between the barrel and the movable pin shaft is 7 mm.

Flash spinning was carried out under the same conditions according to the same procedures as in the method A1. Even at a total extrusion rate of 1000 g/min, that is, a polymer flow rate of 110 g/min and a solvent flow rate of 890 g/min, spinning could be conducted very stably. In this case, the pressure in the pressure let-down chamber was 55 kg/cm²·G and the variation of the pressure was within 4 to 5 kg/cm²·G.

The pressure at the top end of the extruder was about 250 kg/cm²·G and the solvent did not leak from any part.

EXPERIMENTAL EXAMPLE 7

Flash spinning was carried out according to the method shown in FIG. 9 (hereinafter referred to as "method B"). Namely, a mixing apparatus comprising static mixing elements, represented by reference numeral 9 in FIG. 9, was arranged through conduits downstream of the screw extruder of the method A2 described in Experimental Example 6. The used static mixing element is a mixer Model SMX supplied by Suruzer Co. (nominal diameter=15 mm). The mixing element comprises metal pieces welded crosswise in two parallels, and these mixing elements are arranged in the stage staggered from one another by 90°. Fifty stages of these mixing elements were used.

For the spinning operation, a solution of high-density polyethylene (Suntec B-161 supplied by Asahi Kasei) having a melt index of 1.2 (the weight average molecular weight was about $14 \times 10^4$) in fron 11 was used. The temperature of the screw extruder was 230° C., the temperature of the special mixing zone of the method A2 was 200° C., and the temperature of the conduits and static mixing zone was 175° C. The polymer concentration was adjusted to 11% by weight. Spinning was carried out at a polymer flow rate of 77 g/min, a solvent flow rate of 623 g/min and a total extrusion rate of 700 g/min. The liquid temperature just before spinning was 175° C. and the pressure in the pressure let-down chamber was 70 kg/cm²·G. The spinning state was very stable and the variation of the pressure in the pressure let-down chamber was within 2 to 3 kg/cm²·G.

EXPERIMENTAL EXAMPLE 8

Flash spinning was carried out according to the method shown in FIG. 10 (hereinafter referred to as "method C"). Namely, in the method described in Experimental Example 7, a solvent-feed opening was formed between the top end of the extruder and the static mixing zone 9 and connected to two plunger pumps. The polymer melted in the extruder was guided to the polymer-dissolving area. In this area, the solvent was added to the polymer by the plunger pumps, and in the special mixing zone 8, the polymer was mixed with the solvent to dissolve the polymer. The mixed solution was guided to the static mixing zone from the top end of the extruder and during this travel, the solvent was further added. The polymer/solvent mixed solution was guided to the static mixing zone and a completely homogeneous solution was formed in the mixing and dissolving zone. The polymer solution was extruded from the spinning opening.

Spinning was carried out by using a polymer solution of high-density polyethylene (Suntec S-160 supplied by Asahi Kasei) having a melt index of 0.78 (the weight average molecular weight was about $16 \times 10^4$) in fron 11, which had a polymer concentration of 11% by weight. The temperature of the extruder was 270° C., the temperature of the special mixing zone was 200° C., the temperature of the static mixing zone was 175° C. and the temperature of the spinning zone was 175° C. The diameter of the nozzle of the reduced pressure was 0.5 mm, the volume of the pressure let-down chamber was about 2 cc and the diameter of the spinning nozzle was 0.5 mm. The polymer was mixed and dissolved in the solvent while maintaining the pressure of the special mixing zone at 250 kg/cm²·G and the pressure of the static mixing zone at 200 kg/cm²·G. The liquid temperature just before spinning was 175° C. and the pressure in the pressure let-down chamber was 80 kg/cm²·G, and spinning could be conducted very stably. The variation of the pressure in the pressure let-down chamber was within 2 to 3 kg/cm²·G.

In this case, the polymer flow rate was 77 g/min and the solvent flow rate was 623 g/min. The solvent was added according to the method in which the solvent was added at a rate of 77 g/min at the first stage just before the special mixing zone and the remaining solvent was added at a rate of 546 g/min at the second stage just before the static mixing zone. Accordingly, the polymer concentration was 50% by weight at the first stage and 11% by weight at the second stage.

EXPERIMENTAL EXAMPLE 9

Flash spinning was carried out according to the methods A1, A2, B and C described in Experimental Examples 6 through 8 by using high-density polyethylenes differing in the melt index and fron 11.

The dissolution state of the polymer corresponds to the variation of the pressure just before spinning, especially the variation of the pressure in the pressure let-down chamber. More specifically, as the dissolution of the polymer was incomplete, the variation of the pressure in the pressure let-down chamber increased, and spinning became finally impossible. However, even in the case where spinning was possible, if the variation of the pressure was large, the undissolved polymer was extruded, and the fiber was split finely and the strength was reduced, with the result that the fiber could not be put into practical use.

The above-mentioned methods were compared with one another with respect to the variation of the pressure, which indicates the dissolution state. The obtained results are shown in Table 1. The polymers used were high-density polyethylenes (supplied by Asahi Kasei), and fron 11 was used as the solvent. The polymer concentration was 11% by weight and the total extrusion rate was 1000 g/min.

The spinning conditions and apparatuses described in Experimental Examples 6 through 8 were used.

As is apparent from Table 1, the methods C, B, A2 and A1 are preferred as the spinning methods in this recited order.

An example of the spinning operation according to the method C using a polymer (supplied by Asahi Kasei, MI=0.31, weight average molecular weight=about $21 \times 10^4$) manufactured on the experimental basis will now be described.

Namely, the temperature of the extruder screw zone was 300° C., the temperature of the special mixing zone connected coaxially thereto was 200° C. and the temperature of the conduits and static mixing zone was 170° C. As regards the pressure in the polymer-dissolving zone, the pressure in the special mixing zone was 250 kg/cm²·G and the pressure in the static mixing zone was 200 kg/cm²·G. For thus controlling the pressure dividely in the two zones, a gear pump having an extrusion volume of 35 cc per rotation was arranged ahead of the special mixing zone, and this gear pump portion was heated at 200° C. In the pressure let-down chamber, the pressure was 110 kg/cm²·G and the liquid temperature was 190° C.

In each example of spinning, leakage from the flange portion and the like was not caused. For the purpose of lubrication, a small amount of the polymer as positively let to leak from the rotation shaft of the gear pump.

TABLE 1

Variation of Pressure in Reduced Pressure Chamber in Spinning State

| | Amount of Solvent Added at First Stage | Amount of Solvent Added At Second Stage | J-240 (MI = 5) ($\bar{M}_w = 9 \times 10^4$) | B-161 (MI = 1.2) ($\bar{M}_w = 14 \times 10^4$) | S-160 (MI = 0.78) ($\bar{M}_w = 16 \times 10^4$) | Polymer Manufactured on Experimental Basis (MI = 0.31) ($\bar{M}_w = 21 \times 10^4$) |
|---|---|---|---|---|---|---|
| A₁ | 890 g/min | — | 15 | Spinning difficult | Spinning impossible | Spinning impossible |
| A₂ | 890 g/min | — | 2~3 | 20 | Spinning difficult | Spinning impossible |

TABLE 1-continued

Variation of Pressure in Reduced Pressure Chamber in Spinning State

| Amount of Solvent Added at First Stage | Amount of Solvent Added At Second Stage | J-240 (MI = 5) ($\bar{M}_w = 9 \times 10^4$) | B-161 (MI = 1.2) ($\bar{M}_w = 14 \times 10^4$) | S-160 (MI = 0.78) ($\bar{M}_w = 16 \times 10^4$) | Polymer Manufactured on Experimental Basis (MI = 0.31) ($\bar{M}_w = 21 \times 10^4$) |
| --- | --- | --- | --- | --- | --- |
| B 890 g/min | — | 1~2 | 5~7 | 22 | Spinning difficult |
| C 150 g/min | 740 g/min | 1 | 1~2 | 2~3 | 2~3 |

Note
Total polymer solution extrusion rate: 1000 g/min
Polymer concentration: 11% by weight

EXPERIMENTAL EXAMPLE 10

A plexifilamentary fiber composed of high-density polyethylene was obtained according to the process shown in FIG. 10.

Chips of high-density polyethylene (Suntec HD:B871 supplied by Asahi Kasei) having a melt index (MI) of 0.35 were continuously melt-extruded by an extruder. fron 11 as the solvent was added by using a metering pump and mixed with the polymer in a special mixing zone coaxial with the extruder. The structures of the extruder and mixing zone were as shown in FIG. 8. A screw comprising a screw zone having a length of 700 mm and a barrel inner diameter of 35 mm, a Dulmage zone having a length of 310 mm and a barrel inner diameter of 50 mm and a pin zone having a length of 250 mm and a barrel inner diameter of 50 mm was used. A solvent feed opening was formed on the barrel before the Dulmage zone.

The polymer feed rate at a screw rotation number of 46 rpm was 74 g/min, and the rate of the solvent poured into the mixer zone was 240 g/min.

The mixture and the further added solvent supplied at a rate of 360 g/min were introduced into the static mixing zone to form a polymer solution having a predetermined concentration. In this case, 50 stages of mixers Model SMA supplied by Sulzer Co. (nominal diameter was 15 mm) were used as the mixing elements.

For spinning of the solution, a spinning assembly comprising a pressure let-down orifice having a diameter of 0.5 mm (L/D=10), a pressure let-down chamber having a volume of about 2 cc and a spinning nozzle having a diameter of 0.5 mm (L/D=1) was used. The extrusion state was very stable.

Comparative Example 3

Figure 11:
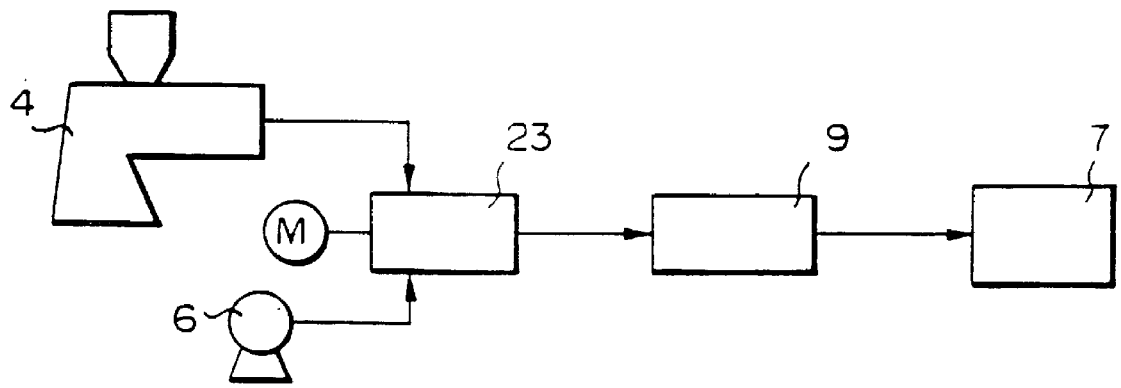
FIG. 11 is a schematic flow chart illustrating an example of a method of manufacturing a plexifilamentary fiber using a conventional known screw mixer, as a comparison with the present invention.

The process shown in FIG. 11 was carried out under the same conditions as described in Experimental Example 10 except that a known independently driven screw mixer was used instead of the extrusion screw and coaxial mixer of the present invention.

The melted polymer was introduced in the screw mixer by using an extruder having a diameter of 35 mm. This screw mixer was a monoaxial kneading mixer having two feed openings and projections on the side of a barrel having a diameter of 35 mm and also having a notch on the screw flight.

The same static mixer and spinning apparatus as used in Experimental Example 10 were used. In this example, leakage was caused from the gland portion of the screw mixer and spinning was impossible.

EXPERIMENTAL EXAMPLE 11

An autoclave having an inner volume of about 500 cc was charged with 77.7 g of high-density polyethylene (Suntec HD:B871 supplied by Asahi Kasei, MI=0.35). Air in the autoclave was removed, and 570 g of fron 11 was added to the polymer (the polymer concentration was 12% by weight). Incidentally, 2,6-di-t-butyl-p-cresol was added as the heat stabilizer to the solvent in advance so that the amount of the stabilizer was 0.2% by weight based on the polymer.

In the spinning assembly used, the volume of the pressure let-down chamber was about 2 cc, the diameter of the pressure let-down orifice was 0.75 mm (L/D=6), and the spinning nozzle was a circular nozzle having a diameter of 0.75 mm (lead hole introduction angle=60°, L/D=1.3).

The polymer was dissolved with stirring by heating under compression, and stirring was stopped when the liquid temperature in the autoclave was 161° C. Immediately, the bottom valve was opened while elevating the pressure in the autoclave to 300 kg/cm²·G by a liquid pressure increaser, whereby flash spinning was carried out and a highly fibrillated purely white plexifilamentary fiber having a fineness of 260 d and a strength of 4.0 g/d was obtained.

The pressure in the pressure let-down chamber during flash spinning was 110 kg/cm²·G, and the pressure loss in the pressure let-down orifice, that is, the difference of the pressure before and after the pressure-reducing orifice, was 190 kg/cm²·G.

When a single-liquid-phase/two-liquid-phase diagram was determined by an optical window-attached pressure vessel, it was found that the conditions in the pressure let-down chamber were apparently conditions of the single-liquid-phase.

To examine the activation state, the pressure difference and transmission quantity difference before and after the pressure let-down orifice were determined by the same apparatus as used for obtaining the phase diagram. The pressure difference was 190 kg/cm²·G and it was confirmed that when the pressure difference was produced, the liquid temporarily became completely a dark field. Namely, it was found that the liquid was activated by this pressure difference. It also was confirmed that the conditions in the pressure let-down chamber were conditions of the single-liquid-phase.

EXPERIMENTAL EXAMPLE 12

The same apparatus, polymer and solvent as used in Experimental Example 11 were used. A circular orifice having a diameter of 0.5 mm (L/D=10) was used as the orifice before the pressure let-down chamber and a circular nozzle having a diameter of 0.5 mm (lead hole angle=60°, L/D=2) was used as the spinning nozzle.

In the same manner as described in Experimental Example 11 (the heat stabilizer was not used in the present example), flash spinning was carried out while maintaining the liquid temperature at 160° C. and the pressure at 240 kg/cm²·G in the autoclave, whereby highly fibrillated purely white network filament of the high-density polyethylene was obtained. At this spinning operation, the pressure in the pressure let-down chamber was 90 kg/cm²·G, and the difference of the pressure before and after the pressure let-down orifice was 190 kg/cm²·G. The obtained filament had a fineness of 202 d and a strength of 3.6 g/d. According to the same measurement method described in Experimental Example 11, it was confirmed that activation was effected. It also was confirmed that the conditions in the pressure let-down chamber were single-liquid-phase conditions.

Comparative Example 4

The same apparatus, polymer and solvent as used in Experimental Example 12 were used, but the diameter of the pressure let-down orifice was changed to 1.5 mm (L/D=3.3).

Flash spinning was carried out while maintaining the pressure of the autoclave at 150 kg/cm²·G. The pressure in the pressure let-down chamber was reduced to 90 kg/cm²·G as in Experimental Example 12, but the obtained yarn was a very weak yarn having a fineness of 275 d and a strength of 1.5 g/d, in which separation of fibrils was insufficient and stickiness was observed. When the activation state was examined according to the same method as described in Experimental Example 12, it was found that no activation was caused in the liquid.

EXPERIMENTAL EXAMPLE 13

The same apparatus, polymer and solvent as used in Experimental Example 12 were used, but in the present example, a spinning nozzle comprising a circular hole having a diameter of 0.5 mm (lead hole angle=60°, L/D=2) and a subsequent frustoconical flare integrated with the circular hole was used.

If spinning was carried out while maintaining the liquid temperature at 161° C. and the pressure at 280 kg/cm²·G in the autoclave, the pressure in the reduced pressure was 90 kg/cm²·G, and a purely white filament having a fineness of 130 d and a strength of 5.9 g/d was obtained. The width of the filament and it seemed as if fibrillation were insufficient in this filament. However, the obtained filament was a plexifilamentary filament comprising very fine fibrils. Moreover, activation of the liquid was observed, and it was confirmed that the conditions in the reduced pressure chambers were single-liquid-phase conditions.

EXPERIMENTAL EXAMPLE 14

The same apparatus as used in Experimental Example 11 was used, and a pressure let-down orifice having a diameter of 0.45 mm (L/D=11) was used and a circular nozzle having a diameter of 0.45 mm (lead hole angle=60° and L/D=2) was used as the spinning nozzle.

In the present example, high-density polyethylene of a different grade (Suntec HD:B161 supplied by Asahi Kasei, MI=1.2) was used and the polymer concentration was adjusted to 14% by weight. By the same procedures as described in Experimental Example 11, the polymer solution was extruded at a liquid temperature of 180° C under a pressure of 250 kg/cm²·G to obtain a highly fibrillated high-tenacity purely white filament having a fineness of 120 d and a strength of 4.6 g/d. At this operation, the pressure in the pressure let-down chamber was 80 kg/cm²·G. The conditions in the pressure let-down chamber were single-liquid-phase conditions and activation was caused under these conditions.

EXPERIMENTAL EXAMPLE 15

The fiber obtained in Experimental Example 4 was collected on a moving net conveyor by using a dispersing apparatus comprising a rotary deflecting plate and a corona discharge device, as shown in the specification of U.S. Pat. No. 3,456,156. The three-dimensional plexifilamentary fiber extruded from the spinning hole was continuously deposited in the state expanded in a width of 30 to 60 mm while the fiber was swung to the left and right. The so-formed non-bonded web was pressed once on the front side and once on the back side under a linear pressure of 13 kg/cm at a speed of 10 m/min between an entire surface press-bonding roll (temperature=135° C.) and a rubber roll.

When the so-obtained nonwoven fabric was separated into the inner layer and the surface layer by peeling, the specific surface areas of the inner and surface layers were 8.6 m²/g and 6.0 g/m². When the specific surface area of the entire nonwoven fabric was measured without peeling, the specific surface area was 6.4 m²/g.

The unit weight of the nonwoven fabric was 40 g/m², and the longitudinal/lateral strength was 13.8/14.2 (kg/3 cm of the width) and the longitudinal/lateral Elmendorf tear strength was 1.02/1.02 (kg). When the values were converted to those at the standard unit weight of 50 g/m², it was found that the longitudinal/lateral tensile strength was 17.3/17.7 (kg/3 cm of the width) and the longitudinal/lateral Elmendorf tear strength was 1.28/1.28 (kg). It was confirmed that the fabric was s high-tenacity nonwoven fabric.

The laser beam transmission quantity of the nonwoven fabric was 13.7 $\mu$W, and it was confirmed that the nonwoven fabric had a sufficient opacity.

In this nonwoven fabric, the water pressure resistance was 3600 mmH$_2$O and the Gurley-Hill air permeability was 900 sec/50 ml.

MI and molecular weight distribution of the nonwoven fabric were not different from those of the fiber.

EXPERIMENTAL EXAMPLES 16 THROUGH 19

The non-bonded nonwoven fabric obtained in Experimental Example 15 was subjected to the bonding treatment under various conditions by using the same pressing rolls as used in Experimental Example 15. Bonding was effected once on the front side and once on the back side. The obtained results are shown in Table 2.

TABLE 2

|  | Experimental Example 16 | Experimental Example 17 | Experimental Example 18 | Experimental Example 19 |
| --- | --- | --- | --- | --- |
| Base Weight of Non-Woven Fabric (g/m$^2$) | 39 | 41 | 60 | 25 |
| Roll Temperature (°C.) | 137 | 139 | 135 | 133 |
| Roll Linear Pressure (kg/cm) | 13 | 2 | 10 | 13 |
| Heat-Bonding Speed (m/min) | 10 | 4 | 10 | 10 |
| Specific Surface Area (m$^2$/g) | | | | |
| Inner layer | 8.0 | 7.2 | 8.9 | 7.2 |
| Surface layer | 5.2 | 4.3 | 6.1 | 5.1 |
| Entire non-woven fabric | 6.0 | 5.4 | 7.2 | 5.6 |
| Longitudinal/Lateral Tensile Strength (kg/3 cm) | 18.4/19.5 | 14.0/14.2 | 25.4/24.5 | 8.4/7.7 |
| Converted Longitudinal/Lateral Tensile Strength (kg/3 cm/50 g/m$^2$) | 23.6/25.0 | 17.1/17.3 | 21.2/20.4 | 16.8/15.4 |
| Longitudinal/Lateral Elmendorf Tear Strength (kg) | 0.35/0.44 | 1.00/0.83 | 1.06/1.07 | 0.61/0.54 |
| Converted Longitudinal/Lateral Elmendorf Tear Strength (kg/50 g/m$^2$) | 0.45/0.57 | 1.22/1.01 | 0.88/0.89 | 1.22/1.08 |
| Laser Beam Transmission Quantity ($\mu$W) | 19.8 | 11.6 | 10.5 | 15.3 |
| Water Pressure Resistance (mmH$_2$O) | 4,100 | 3,000 | 3,500 | — |
| Gurley-Hill Air Permeability (sec/50 ml) | 3,000 | 250 | 2,000 | — |

EXPERIMENTAL EXAMPLES 20 THROUGH 23

In the same manner as described in Experimental Example 15, the fiber obtained in Example 5 was collected on a net conveyor in the state expanded in a width of 30 to 65 mm while the fiber was swung to the left and right. Hot bonding was carried out by using the rolls used in Experimental Examples 15 through 19. The bonding operation was conducted once on the front side and once on the back side. The obtained results are shown in Table 3.

EXPERIMENTAL EXAMPLES 24 THROUGH 27

The fiber obtained in Experimental Example 3 was collected as a non-bonded web on a net conveyor in the same manner as described in Experimental Example 15, and both the surfaces of the web were subjected to the bonding treatment in the same manner as described in Experimental Example 15. The obtained results are shown in Table 4.

TABLE 3

|  | Experimental Example 20 | Experimental Example 21 | Experimental Example 22 | Experimental Example 23 |
| --- | --- | --- | --- | --- |
| Base Weight of Non-Woven Fabric (g/m$^2$) | 40 | 40 | 42 | 60 |
| Roll Temperature (°C.) | 135 | 135 | 137 | 137 |
| Roll Linear Pressure (kg/cm) | 13 | 20 | 2 | 13 |
| Bonding Speed (m/min) | 10 | 10 | 5 | 10 |
| Specific Surface Area (m$^2$/g) | | | | |
| Inner layer | 7.2 | 5.7 | 7.1 | 7.4 |
| Surface layer | 5.3 | 5.0 | 4.6 | 5.0 |
| Entire non-woven fabric | 6.1 | 5.2 | 5.3 | 5.8 |
| Longitudinal/Lateral Tensile Strength (kg/3 cm) | 12.3/11.8 | 13.8/14.2 | 0.81/9.0 | 21.4/21.8 |
| Converted Longitudinal/Lateral Tensile Strength (kg/3 cm/50 g/m$^2$) | 15.4/14.7 | 17.3/17.7 | 9.6/10.7 | 17.8/18.2 |
| Longitudinal/Lateral Elmendorf Tear Strength (kg) | 0.55/0.66 | 0.50/0.52 | 0.77/0.80 | 0.68/0.66 |
| Converted Longitudinal/Lateral Elmendorf Strength (kg/50 g/m$^2$) | 0.69/0.82 | 0.62/0.65 | 0.92/0.95 | 0.57/0.55 |
| Laser Beam Transmission Quantity ($\mu$W) | 15.1 | 18.8 | 13.3 | 11.7 |
| Water Pressure Resistance (mmH$_2$O) | 2,400 | 2,800 | 2,100 | 2,600 |
| Gurley-Hill Air Permeability (sec/50 ml) | 800 | 950 | 58 | 540 |

TABLE 4

| | Experimental Example 24 | Experimental Example 25 | Experimental Example 26 | Experimental Example 27 |
|---|---|---|---|---|
| Base Weight of Non-Woven Fabric (g/m$^2$) | 25 | 50 | 75 | 100 |
| Roll Temperature (°C.) | 132 | 135 | 136 | 136 |
| Roll Linear Pressure (kg/cm) | 13 | 10 | 4 | 4 |
| Bonding Speed (m/min) | 10 | 10 | 5 | 10 |
| Specific Surface Area (m$^2$/g) | | | | |
| Inner layer | 5.6 | 7.0 | 7.9 | 8.2 |
| Surface layer | 4.7 | 5.4 | 5.3 | 5.4 |
| Entire non-woven fabric | 5.0 | 6.0 | 6.4 | 6.9 |
| Longitudinal/Lateral Tensile Strength (kg/3 cm) | 7.7/7.4 | 19.0/19.4 | 23.0/23.6 | 39.2/39.0 |
| Converted Longitudinal/Lateral Tensile Strength (kg/3 cm/50 g/m$^2$) | 15.3/14.8 | 19.0/19.4 | 15.3/15.7 | 19.6/19.5 |
| Longitudinal/Lateral Elmendorf Tear Strength (kg) | 0.49/0.47 | 0.74/0.68 | 1.26/1.34 | 1.16/1.30 |
| Converted Longitudinal/Lateral Elmendorf Tear Strength (kg/50 g/m$^2$) | 0.97/0.94 | 0.74/0.68 | 0.84/0.89 | 0.58/0.65 |
| Laser Beam Transmission Quantity ($\mu$W) | 18.3 | 12.0 | 6.3 | 4.0 |

EXPERIMENTAL EXAMPLE 28

A non-bonded nonwoven fabric was obtained from the three-dimensional fiber obtained in Experimental Example 1 in the same manner as described in Experimental Example 15. Both the surfaces of the non-bonded nonwoven fabric were treated by a felt calender. The nonwoven fabric was treated at a high speed of 35 m/min by a drum heated at 136° C. to obtain the surface-heat-bonded paper-like nonwoven fabric.

The specific surface area of the inner layer was 5.2 m$^2$/g. The unit weight of the nonwoven fabric was 60 g/m$^2$, the laser beam transmission quantity was 8 $\mu$W and the Gurley-Hill air permeability was 44 sec/50 ml. Namely, the nonwoven fabric had an excellent covering power and a good air permeability and was usable as an envelope, a label, an air-permeable packaging material and other various paper products. The longitudinal/lateral properties of the nonwoven fabric were such that the tensile strength converted to the value at the unit weight of 50 gm$^2$ was 17.1/17.6 (kg/3 cm) and the Elmendorf tear strength converted at the unit weight of 50 g/m$^2$ was 1.0/1.1 (kg). Photo 19($a$) is a microscope photograph of the section observed when the obtained nonwoven fabric was cut in the longitudinal direction. Photo 19($b$) is an electron microscope of the similar section of Tyvek® C shown in Comparative Example 5 given hereinafter. It is seen that the nonwoven fabric of the present example was denser than the comparative product though the unit weight was substantially equal. This means that fibrils of the three-dimensional fiber were finer than in the conventional product.

Comparative Example 4

In the same manner as described in Experimental Example 15, a non-bonded web was prepared from the fiber obtained in Comparative Example 2 and the web was subjected to the hot-bonding treatment.

When bonding was carried out to prevent surface fluffing and retain the tensile strength, the relation between the tensile strength and tear strength was in the region indicated by a broken line in FIG. 12, and the specific surface area was in the range of from 2.5 to 4.0 m$^2$/g. The opacity evaluated based on the laser beam transmission quantity was poor.

Comparative Example 5

A paper-like type (type 10) of Tyvek® marked as a three-dimensional plexifilamentary fiber nonwoven fabric by Du Pont was compared with the three-dimensional plexifilamentary fiber nonwoven fabric of the present invention.

| | Tyvek ® A | Tyvek ® B | Tyvek ® C |
|---|---|---|---|
| Base Weight (g/m$^2$) | 44 | 55 | 61 |
| Specific Surface Area (m$^2$/g) | | | |
| Inner layer | 2.6 | 2.4 | 3.0 |
| Surface layer | 1.5 | 1.5 | 1.7 |
| Entire non-woven fabric | 1.8 | 1.8 | 1.9 |
| Converted Longitudinal/Lateral Tensile Strength (kg/3 an/50 g/m$^2$) | 13.1/14.7 | 14.1/16.1 | 14.4/16.4 |
| Converted Longitudinal/Lateral Elmendorf Tear Strength (kg/50 g/m | 0.48/0.54 | 0.33/0.32 | 0.33/0.52 |
| Laser Beam Transmission Quantity ($\mu$W) | 22 | 16 | 18 |

In each product, the specific surface area of the inner layer was smaller than 5 m$^2$/g, and each product was inferior to the nonwoven fabric of the present invention in the opacity evaluated based on the laser beam transmission quantity, the tensile strength and the tear strength.

EXPERIMENTAL EXAMPLE 29

The fiber obtained in Experimental Example 4 was collected on a moving net conveyor by using a dispersing apparatus comprising a rotary deflecting plate and a corona discharge device, as disclosed in the specification of U.S. Pat. No. 3,456,156. The three-dimensional plexifilamentary fiber extruded from the spinning opening was deposited on the net conveyor in the state expanded in a width of 30 to 60 mm while continuously swinging the fiber to the left and right.

The non-bonded web was partially bonded by using an emboss roll and a rubber roll. A roll having projections of a square shape of 0.7 mm×0.7 mm arranged at a pitch of 1.25 mm in either the width direction or the circumferential direction and an embossing depth of 0.3 mm was used as the emboss roll.

The emboss roll was heated at 132° C. and the front and back surfaces were treated by nipping the nonwoven fabric by nipping the nonwoven fabric between the emboss roll and rubber roll to obtain a patterned heat-bonded nonwoven fabric. This nonwoven fabric was excellent in the abrasion resistance but since the feel was somewhat solid, the nonwoven fabric was crumpled by hands, whereby a very soft nonwoven fabric was obtained.

When a cut was formed on the nonwoven fabric and the fabric was forcibly torn, the fabric was peeled into a tightly heat-bonded surface layer and an inner layer composed of a fiber retaining a network shape. One end of the plexifilamentary fiber in the inner layer was fixed and the fiber was carefully separated from other plexifilamentary fibers. Thus, many continuous plexifilamentary fibers having a length of about 30 to about 100 cm were collected. The X-ray small-angle scattering was measured by using these plexifilamentary fibers. The long period scattering intensity ratio was 9.0. The long period somewhat increased and the value was 181 Å.

This nonwoven fabric was very soft and had an excellent abrasion resistance of the surface, whereby even if the surface was strongly rubbed by the finger, fluffs did not appear. Moreover, the covering power was very large. Accordingly, the nonwoven fabric was suitable as a protecting cloth, a simple cloth, an air-permeable packaging material for a drier or deoxidant and other soft packaging material.

The unit weight of the nonwoven fabric was 50 g/m$^2$ and the average laser beam transmission quantity was 14 $\mu$W. The longitudinal/lateral physical properties of the nonwoven fabric were such that the tensile strength was 9.5/10.3 (kg/cm of the width), the single-tongue tear strength was 1.9/2.0 (kg), and the softness by the cantilever method was 5.2/5.6 (cm).

EXPERIMENTAL EXAMPLE 30

The non-bonded nonwoven web was treated between an entire surface press-bonding roll and a rubber roll. Only one surface was treated at a roll temperature of 135° C., a roll linear pressure of 10 kg/cm and a speed of 10 m/min. In the obtained nonwoven fabric, one surface was tightly heat-bonded and the other surface and inner layer were not heat-bonded. Independent fibers having a network shape could be taken out from the surface to which heat had not been applied.

At the measurement of the X-ray small-angle scattering of the fiber, the long period scattering intensity ratio was 8.5 and the long period was 180 Å.

The nonwoven could be used in the fields where the difference between both surfaces was utilized. For example, if an adsorbent or deodorant was added to the non-bonded surface, an adsorbing or deodorant filter was prepared, or if other surface member (film or woven fabric) was bonded to the nonwoven fabric, a composite material having a high covering power and a high tear strength was provided.

The average laser beam transmission quantity of the nonwoven fabric was 5 $\mu$W at a unit weight of 50 g/m$^2$, and the nonwoven fabric had a very high covering power. The longitudinal/lateral physical properties of the nonwoven fabric were so excellent that the tensile strength was 11.2/11.8 (kg/3 cm of the width) and the Elmendorf tear strength was 1.6/1.6 (kg).

EXPERIMENTAL EXAMPLE 31

Both the surfaces of the nonwoven fabric obtained in Experimental Example 29 were treated by a felt calender. By the high-speed heat treatment where the nonwoven fabric was placed in contact with a heated drum at 132° C. for 1 second, a nonwoven fabric was obtained in which the surface was heat-bonded and the inner layer retained the shape of the plexifilamentary fiber.

At the measurement of the X-ray low-angle scattering of fibers taken out from the inner layer of this nonwoven fabric, the long period scattering intensity ratio was 7.0 and the long period was 230 Å.

The average laser beam transmission quantity of the nonwoven fabric was 8 $\mu$W at a unit weight of 40 g/m$^2$ The nonwoven fabric was a bulky paper-like nonwoven fabric having an excellent covering power, which could be used as an envelope, a label and other paper-like products.

The longitudinal/lateral physical properties were such that the tensile strength was 10.8/12.0 (kg/cm of the width) and the Elmendorf tear strength was 1.4/1.4 (kg).

EXPERIMENTAL EXAMPLE 32

In the same manner as described in Experimental Example 29, the fiber obtained in Experimental Example 5 was collected as a non-bonded nonwoven web and a soft nonwoven fabric having an embossed pattern was obtained.

At the measurement of the X-ray small-angle scattering fibers taken out from the inner layer, the long period scattering intensity ratio was 20 and the long period was 210 Å.

The average laser beam transmission quantity was 15 $\mu$W at a unit weight of 50 g/m$^2$. The longitudinal/lateral physical properties of the nonwoven fabric were such that the tensile strength was 9.3/9.0 (kg.3 cm of the width), the single-tongue tear strength was 1.7/1.8 (kg) and the softness by the cantilever method was 5.0/5.0 (cm).

Comparative Example 6

In the same manner as described in Experimental Example 29, a non-bonded nonwoven web was prepared from the fiber obtained in Comparative Example 2 and a soft nonwoven fabric prepared from the nonwoven web.

Fibers having a network shape were taken out from the inner layer and the measurement of the X-ray small-angle scattering was carried out. The long period scattering intensity ratio was 60 and the long period was 240 Å.

The average laser beam transmission quantity of the nonwoven fabric was 20 $\mu$W at a unit weight of 50 g/m$^2$, which was inferior to the average laser beam transmission quantity of the nonwoven fabric of Experimental Example 29.

The longitudinal/lateral physical properties of the nonwoven fabric were such that the tensile strength was 6.5/6.4 (kg/3 cm of the width) and the single-tongue tear strength was 0.8/0.8 (kg). Thus, the nonwoven fabric was inferior to the nonwoven fabric of Experimental Example 29 in the strength characteristics.

Comparative Example 7

Commercially available Tyvek® 1443R supplied by E. I. Du Pont Co. was analyzed.

This nonwoven fabric is a soft nonwoven fabric having an embossed pattern and retaining a plexifilamentary fiber shape in the inner layer, as in the product of the present invention.

According to the procedures specified in the present invention, the measurement of the X-ray small-angle scattering of independent plexifilamentary fibers was carried out. It was found that the long period scattering intensity was 50 and the long period was 172 Å.

The unit weight of the nonwoven fabric was 44 g/m² and the average laser beam transmission quantity was 22 µW. The unevenness was conspicuous and the covering power was poor.

The longitudinal/lateral physical properties were such that the tensile strength was 7.9/9.0 (kg/3 cm of the width), the single-tongue tear strength was 1.4/1.6 (kg), and the softness by the cantilever method was 6.2/6.3 (cm).

EXPERIMENTAL EXAMPLE 33

A solution of high-density polyethylene having a melt index (MI) of 0.78 in fron 11 as the solvent, which had a polymer concentration of 11% by weight, was passed through a pressure let-down orifice, and the pressure was reduced in a pressure let-down chamber having a diameter of 8 mm and a length of 40 mm. Then, the solution was passed through a nozzle having a diameter of 0.90 mm and a length of 0.75 mm to effect flash spinning.

The spinning conditions and the physical properties of the obtained yarn are shown in Table 5.

TABLE 5

| Spinning Conditions | Solution Temperature | 195 (°C.) |
|---|---|---|
| | Solution Pressure | 300 (kg/cm² · G) |
| | Temperature in Reduced Pressure Chamber | 191 (°C.) |
| | Pressure in Reduced Pressure Chamber | 80 (kg/cm² · G) |
| | Flow Rate of Polymer | 18 (kg/hr) |
| Physical Properties of Yarn | Fineness | 270 (d) |
| | Tensile Strength *① | 6.5 (g/d) |
| | Specific Surface Area *② | 49 (m²/g) |

Note
*① Tensile Strength
A three-dimensional plexifilamentary fiber sample to which 4 twists per cem were given was used, and the measurement was conducted under conditions of a grip length of 5 cm and a pulling speed of 10 cm/min.
*② Specific Surface Area
The specific surface area was measured by using Carloelba Sorbtomatic 1800 supplied by Amco Co.

The spun three-dimensional plexifilamentary fiber and gas stream were supplied to a rotary dispersion plate, as a preferred example of the means for producing the nonwoven fabric of the present invention, which was arranged orthogonally to the spinning axis at a position 5 mm apart in the horizontal direction from the spinneret, whereby a nonwoven fabric was prepared.

The rotary dispersion plate used was rotary dispersion plate having three oscillating faces, as shown in FIGS. 14(a), and 14(b). The dimensions of the rotary dispersion plate were such that the disk diameter D1 was 100 mm, the diameter D2 of the cylindrical portion was 40 mm and the inclination angle α of the swinging face constituting the skirt portion was 45° (X1=10 mm and Y1=10 mm). The swinging face was such a plane that the central angle δ with the disk rotation shaft at the intersection point between the swinging face and the side face of the cylindrical portion being as the center was 106.2° and the central angle η with the disk rotation axis at the intersection point between the swinging face and the top face of the disk portion being as the center was 75.70°. The cushioning face was a convex curved face having both ends connected to the plane portion at an inclination angle β of 45° (X2=18 mm, Y2=18 mm).

The rotary dispersion plate was rotated at a rotation number of 1000 rpm, 2000 rpm or 3000 rpm.

The three-dimensional plexifilamentary fiber coming from the rotary dispersion plate was electrified by corona discharge. The corona discharge was effected by applying a negative direct current high voltage of 20 KV to 16 electrode needles arranged semi-circularly around the rotary disk at a pitch of 11 mm.

The distance between the lowermost part of the rotary dispersion plate and the net conveyor was adjusted to 200 mm, and by rotating the rotary dispersion plate, the three-dimensional plexifilamentary fiber was swung at an oscillation cycle 3 times the rotation number and was subjected to an auxiliary action of a suction duct arranged below the net conveyor, and a uniform nonwoven web having an effective width of 30 cm was formed on the net conveyor.

The falling state of the spread fiber was observed by using a high-speed photographing apparatus. As the result, it was confirmed that the changing point of the swinging direction of the plexifilamentary fiber was located on the collecting surface.

The moving speed of the net conveyor was changed within the range of from 12 to 45 m/min to change the unit weight of the web. Constituent three-dimensional plexifilamentary fiber were taken out from the obtained web having a length of 100 cm and the spread width was examined. The average spread width was about 90 mm and the minimum spread width was about 70 mm (the fiber density was 3.8 denier/mm of the width), and the fiber density of the bundle portion in the plexifilamentary fiber was lower than 40 denier/mm of the width.

The formed nonwoven web was heat-pressed once on the front side and once on the back side between a metal roll having a smooth surface (the temperature was 132° C.) and a rubber roll, whereby a nonwoven fabric was obtained.

The unit weight variation ratio R/x̄ in the width direction of the so-prepared nonwoven fabric and the laser spot beam transmission quantity variation ratio $$r/\bar{y} \times \sqrt{\frac{y}{50}}$$

are shown in Table 6.

TABLE 6

| Average Base Weight x̄ (g/m²) | Rotation Number of Dispersing Plate (rpm) | Variation Ratio of Base Weight in Width Direction*① R/x̄ × 100(%) | Variation Ratio of Laser Spot Beam Transmission Quantity*② $r/\bar{y} \times \sqrt{\frac{y}{50}} \times 100(\%)$ |
|---|---|---|---|
| 19 | 3000 | 25 | 47 |
| 39 | 2000 | 24 | 43 |
| 70 | 1000 | 15 | 30 |

Note
*①Variation Ratio of Base Weight in Width Direction
The Weight of a piece having a size of 1 cm × 5 cm was measured at every 1 cm in the width direction.
*②Variation Ratio of Laser Spot Beam Transmission Quantity The nonwoven fabric was irradiated with He-Ne laser beams having a beam diameter of 2.5 mm at an output of 5 mW, and the quantity of the beams transmitted through the nonwoven fabric was detected by a laser power meter and measured continuously in the width direction and at 10 points at intervals of 5 cm in the length direction.

From the results shown in Table 6, it is seen that the variation of the unit weight in the width direction, which indicates macroscopic unevenness of the nonwoven fabric, was lower than 30% and the variation ratio of the laser spot beam transmission quantity, which indicates microscopic unevenness of the nonwoven fabric, was lower than 50%. Thus, it was proved that the nonwoven fabric of the present invention had a high uniformity. The nonwoven fabric was subjected to the softening treatment and independent three-dimensional plexifilamentary fibers were collected from the inner layer. When the X-ray small-angle scattering state was examined, it was found that the long period scattering intensity ratio was 11 and the long period was 180 Å.

EXPERIMENTAL EXAMPLE 34

The procedures of Experimental Example 33 were repeated in the same manner except that the distance between the lowermost part of the rotary dispersion plate and the net conveyor was changed to 320 mm. The rotation number of the rotary dispersion plate was adjusted to 2000 rpm and the moving speed of the net was adjusted to 17 m/min.

The formed web had an effective width of 45 cm and an average unit weight of 39 g/m$^2$. Constituent three-dimensional plexifilamentary fibers were collected from the web along a length of 100 cm and the open width was examined. It was found that the average spread width was about 75 mm and the minimum spread width was 20 mm (the fiber density was 13.5 denier/mm). A bundle portion in which the plexifilamentary fibers gathered at a fiber density higher than 40 denier/mm of the width was not present at all.

In the same manner as described in Experimental Example 33, the formed nonwoven web was heat-pressed once on the front side and once on the back side.

In the nonwoven fabric, the variation ratio of the unit weight in the width direction was 30% and the variation ratio of the laser spot beam transmission quantity was 49%, and it was confirmed that the obtained nonwoven fabric was satisfactory in the requirements of macroscopic unevenness and microscopic unevenness and was very uniform.

Comparative Example 7

The procedures of Experimental Example 33 were repeated in the same manner except that the shape of the skirt portion of the rotary dispersing plate was changed as shown in Table 7, and the unit weight uniformity and openability of the obtained nonwoven fabric are shown in Table 7. The rotation number of the rotary dispersion plate was set at 3000 rpm and the moving speed of the net was kept constant at 20 m/min.

The formed web had an effective width of about 30 cm and an average unit weight of 48 g/m$^2$.

Constituent three-dimensional plexifilamentary fibers were collected from the web along a length of 100 cm and were examined. It was found that the average spread width was about 70 mm and the minimum spread width was 5 mm (the fiber density was 54 denier/mm), and many bundle portions of gathering fibers, which had a length of 60 mm, were contained.

In the same manner as described in Experimental Example 33, the web was heat-pressed once on the front side and once on the back side to obtain a nonwoven fabric.

As is apparent from Table 7, in the nonwoven fabric outside the scope of the present invention, the variation ratio of the unit weight in the width direction, which indicates macroscopic unevenness, was higher than 30% and the variation ratio of the laser spot beam transmission quantity, which indicates microscopic unevenness, was higher than 50%, and the nonwoven fabric was not uniform.

TABLE 7

| | Shape of Skirt Portion of Rotary Dispersing Plate | | | | Uniformity of Non-Woven Fabric | | |
|---|---|---|---|---|---|---|---|
| | Inclination angle α of oscillating face $X_1$ (mm) $Y_1$ (mm) | Inclination angle β of cushioning face $X_2$ (mm) $Y_2$ (mm) | Central angle γ (°) | Central angle η (°) | Average unit weight (g/m$^2$) | Variation ratio of unit weight in width direction (%) | Variation ratio of laser spot beam transmission quantity (%) |
| No. | | | | | | | |
| C-1 | 45 ( $X_1$ = 5 $Y_1$ = 5 | 26.5 $X_2$ = 22 $Y_2$ = 11 | 87.9 | 103.8 | 40 | 50 | 110 |
| C-2 | 45 ( $X_1$ = 5.0 $Y_1$ = 5.0 | 31.8 $X_2$ = 21 $Y_2$ = 13 | 106.3 | 106.3 | 40 | 65 | 95 |
| C-3 | 60 ( $X_1$ = 5.0 $Y_1$ = 8.7 | 47 $X_2$ = 21.0 $Y_2$ = 22.5 | 106.3 | 106.3 | 35 | 70 | 108 |

Note
Diameter D1 of disk portion = 100 mm
Diameter D2 of cylindrical portion = 50 mm in case of C-1 or 40 mm in case of C-2 and C-3

EXPERIMENTAL EXAMPLE 35

The procedures of Experimental Example 33 were repeated in the same manner except that the shape of the skirt portion of the rotary dispersion plate was changed as shown in Table 8. The unit weight uniformity and openability of the obtained nonwoven fabric are shown in Table 8. The rotation number of the rotary dispersion plate was set at 3000 rpm and the moving speed of the net as kept constant at 20 m/min.

In spread three-dimensional plexifilamentary fibers constituting the obtained web, the fiber density of the majority of bundle portions was lower than 40 denier/mm of the width, and bundle portions having a fiber density higher than 40 denier/mm of the width, which were incorporated in very small quantities, had a width smaller than 5 mm and a length smaller than 30 mm.

In the same manner as described in Experimental Example 33, the web was heat-pressed once on the front side and once on the back side to obtain a nonwoven fabric.

As shown in Table 8, the obtained nonwoven fabric was satisfactory in the uniformity.

Photo 20(a) was obtained by irradiating nonwoven fabric E-2 of the present example with light from below and photographing the nonwoven fabric from above. Photo 20(b) was obtained by similarly photographing Tyvek® B of Comparative Example 5.

In case of the nonwoven fabric of Experimental Example 35, bundle portions were not seen, and the microscopic uniformity was good. In contrast, in the nonwoven fabric of Comparative Example 5, bundle portions were observed, and the nonwoven fabric was inferior in the microscopic uniformity.

TABLE 9

| Spinning Conditions | Solution Temperature | 181 (°C.) |
|---|---|---|
| | Solution Pressure | 200 (kg/cm² · G) |
| | Temperature in Reduced Pressure Chamber | 178 (°C.) |
| | Pressure in Reduced Pressure Chamber | 70 (kg/cm² · G) |
| | Polymer Flow Rate | 12 (kg/hr · spindle) |
| Yarn Properties | Fineness | 160 (d) |
| | Tensile Strength | 4.7 (g/d) |
| | Specific Surface Area | 35 (m² /g) |

The three-dimensional plexifilamentary fiber jetted from each spinneret was supplied to a rotary dispersion plate of the present invention, similar to that used in Experimental Example 33, which was arranged apart by 1 mm in the horizontal direction from the spinneret, whereby a nonwoven fabric was prepared.

TABLE 8

| | Shape of Skirt Portion of Rotary Dispersing Plate | | | | Uniformity of Non-Woven Fabric | | |
|---|---|---|---|---|---|---|---|
| No. | Inclination angle α of oscillating face $X_1$ (mm) $Y_1$ (mm) | Inclination angle β of cushioning face $X_2$ (mm) $Y_2$ (mm) | Central angle γ (°) | Central angle η (°) | Average unit weight (g/m²) | Variation ratio of unit weight in width direction (%) | Variation ratio of laser spot beam transmission quantity (%) |
| E-1 | 45 ($X_1 = 10.0$, $Y_1 = 10.0$) | 40 ($X_2 = 21.5$, $X_2 = 18.0$) | 106.3 | 87.4 | 42 | 23 | 41 |
| E-2 | 45 ($X_1 = 10.0$, $Y_1 = 10.0$) | 50 ($X_2 = 15.1$, $Y_2 = 18.0$) | 106.3 | 62.5 | 48 | 20 | 39 |

EXPERIMENTAL EXAMPLE 36

When a nonwoven fabric having a width of 100 cm, which was composed of a wet fiber of high-density polyethylene, was obtained by the flash spinning method, four spinnerets were arranged at intervals of 280 mm in the width direction of the web and 280 mm in the length direction of the web. High-density polyethylene having a melt index (MI) of 5 was used and dissolved in fron 11 as the solvent to form a polymer solution having a polymer concentration of 13% by weight. The solution was passed through a pressure let-down orifice having a diameter of 0.6 mm and a length of 40 mm, the pressure was reduced in a pressure let-down chamber having a diameter of 8 mm and a length of 40 mm, and flash spinning was performed by passing the solution through a nozzle having a diameter of 0.65 mm and a length of 0.65 mm.

The spinning conditions and the yarn properties are shown in Table 9.

The distance between the lowermost part of the rotary dispersion plate and the net conveyor was set at 150 mm.

The rotary dispersion plates of respective spindles were synchronously driven at a rotation number of 2000 rpm, and three-dimensional plexifilamentary fibers were swung at a frequency of 4000 cycles per minute and was subjected to an auxiliary action of a suction duct arranged below the net conveyor, whereby the three-dimensional plexifilamentary fibers were deposited on the moving net conveyor and overlapped thereon.

In the spread three-dimensional plexifilamentary fibers constituting the obtained web, the majority of bundle portions had a fiber density lower than 40 denier/mm of the width, and bundle portions having a fiber density higher than 40 denier/mm of the width, which were incorporated in very small quantities, had a width smaller than 5 mm and a length smaller than 30 mm.

The formed web was heat-pressed once on the front side and once on the back side between an entire surface press-bonding roll (the temperature was 130° C.)and a rubber roll, whereby a nonwoven fabric was obtained.

The so-obtained nonwoven fabric had an effective width of 100 cm, a unit weight of 41 g/m², a unit weight variation ratio of 19% in the width direction and a laser spot beam transmission quantity variation ratio of 40%, and the nonwoven fabric was very uniform.

Industrial Applicability

By dint of the above-mentioned structures, the three-dimensional plexifilamentary fiber, the nonwoven fabric composed of the three-dimensional plexifilamentary fiber and the processes for the preparation thereof according to the present invention have excellent characteristics and uses.

These excellent characteristics and uses will now be described.

A, B, and C The novel three-dimensional plexifilamentary fiber of the present invention has the following prominent performance characteristics.

(1) The fiber is composed of very fine fibrils.
(2) The mechanical strength is very high
(3) The fiber has excellent high-temperature characteristics.

None of conventional fibers satisfy all of these requirements, and the fiber having these characteristics is suitable for the production of a nonwoven fabric.

Since the fiber of the present invention has the above-mentioned characteristics in the as-spun state, the fiber of the present invention is industrially advantageously manufactured and utilized. Accordingly, application of the fiber of the present invention to uses for various industrial materials in the fields where a high strength is required and a drawing operation is necessary is expected.

The continuous fiber nonwoven fabric of the type of direct connection to spinning, which is fabricated by using the three-dimensional plexifilamentary fiber of the present invention, is very valuable, and a nonwoven having a high performance not possessed by conventional nonwoven fabrics can be provided.

Since the fiber of the present invention has a high strength, a high whiteness, a good plexifilamentary structure and a high specific surface area, the fiber can be used in various fields in the state of the fiber or after being formed into a nonwoven fabric.

D By adopting the spinning method and process in which blocking is effected with a melted polymer by using the screw extruder disclosed by the present invention, flash spinning can be performed very stably and a plexifilamentary fiber having a high tenacity can be produced.

More specifically, spinning using a high-molecular-weight polymer becomes possible, and moreover, there can be attained various high effects. Namely, preparation of a polymer solution under a high pressure becomes possible, the apparatus can be made compact, problems due to leaking from the sealed stirring zone can be eliminated, and the pressure in the spinning system can be stabilized.

E By using the flash spinning process of the present invention in which a large pressure difference procedured by using high-density polyethylene and trichlorofluoromethane is utilized and the liquid in the pressure let-down chamber is in the single-phase region, a highly fibrillated plexifilamentary fiber of high-density polyethylene can be obtained. Moreover, since the extrusion is carried out under a high pressure, the spinning speed can be increased and great industrial advantages can be attained by the high manufacturing speed. Furthermore, since a high-tenacity fiber can be obtained even by spinning conducted at a temperature lower than the temperatures adopted in the conventional processes, deterioration of the polymer or decomposition of the solvent can be controlled and the effects of stabilizing products and reducing the cost for recovery of the solvent can be attained.

F The paper-like nonwoven fabric of the three-dimensional plexifilamentary fiber according to the present invention is a novel nonwoven fabric comprising an inner layer having a large specific surface area and having excellent mechanical strength characteristics (high tensile strength and high tear strength) owing to mechanical and heat-bonding characteristics of the constituent fiber. Therefore, the nonwoven fabric can exert excellent performances not seen in the conventional products in connection with covering power, uniformity and mechanical strength, and it is preferred that the nonwoven fabric be used at a relatively small unit weight.

The nonwoven fabric belong to the above-mentioned class F can be used as an envelope, a book cover, a wall member, a house wrap, a construction material such as a roof underlay, sterilized packaging material and a sanitary material. Moreover, the nonwoven fabric of the present invention can be used as a filter in which the filtering property is utilized, a floppy disk sleeve, an air-permeably packaging material, a bag, a recording sheet, a dust-free paper, a release paper, an impregnated paper, a tape and a material for FRP.

G The nonwoven fabric comprising a layer composed of partially unbonded plexifilamentary fiber according to the present invention is a nonwoven fabric composed of the three-dimensional plexifilamentary fiber of the present invention, which has an excellent mechanical strength and thermal mechanical characteristics and has a high opacity and high covering power.

The nonwoven fabric of this type can be used as a protecting cloth, a safety cloth, an aseptic cloth, a dust-free cloth, a moisture-permeable water-proof cloth, a water-resistant cloth, a printed cloth and a bag.

H The uniform nonwoven fabric of the present invention has a high uniformity along the entire effective width and has an excellent appearance of uniformity. This nonwoven fabric can be valuably used in the field a high uniformity is required in a final product and as a nonwoven fabric having a high uniformity even at a small unit weight.

It is possible to increase the uniformity in the nonwoven fabric comprising a layer composed of partially unbonded independent plexifilamentary fibers, and in this case, since high performances are added to the uniformity, a very valuable nonwoven fabric can be provided.

I According to the process of the present invention for preparing a nonwoven fabric of a plexifilamentary fiber by using a rotary dispersion plate, there can be obtained a web in which the unit weight is uniform along the required sheet width and the spreadability is excellent. Therefore, according to the process of the present invention using a rotary dispersion plate, a nonwoven fabric having a high uniformity required for a final product or having such a small unit weight as 30 g/m$^2$ or less can be easily obtained.

We claim:

1. A method of manufacturing a uniform nonwoven fabric of plexifilamentary fibers, which comprises striking a skirt of a spreading and swinging rotating dispersion plate with an unspread three-dimensional plexifilamentary fiber, said spreading and swinging rotating dispersion plate comprising a rotatable disk, a cylindrical portion extending in a perpendicular direction from a center of the disk and having a cylindrical outer surface a diameter of which is smaller than that of the disk, and the skirt portion being arranged in an inclined state in a space between one surface of the disk and the cylindrical outer surface of the cylindrical portion, the skirt portion being comprised of a plurality of swinging faces swinging the unspread three-dimensional plexifilamentary fiber flown in a direction substantially parallel to an axis of the cylindrical portion and a cushioning face arranged alternately with the swinging face and capable of cushioning a sudden change of the swinging direction of the three-dimensional plexifilamentary fiber swung by the swinging face, where an inclined angle $\alpha$ between a center of the swinging face of the skirt portion and an upper surface of the disk is substantially the same as an inclined angle $\beta$ between a center of the cushioning face and the upper surface of the disk, and the cushioning face has a fan-like shape a width of a portion near to the disk of which is wider than a width of a portion near to the cylindrical portion.

2. A method of manufacturing a uniform nonwoven fabric according to claim 1, characterized in that in the diffusing and swinging rotational dispersion plate, the swinging face constituting the skirt portion is substantially a plane and the cushioning face is substantially a convex curved surface.

3. A method of manufacturing a uniform nonwoven fabric according to claim 1, characterized in that a distance between a lower most portion of the rotational dispersion plate and a collecting face of the spread three-dimensional plexifilamentary fiber is determined to be a smaller distance than a distance between the lower most portion of the rotational dispersion plate and a point where a swinging direction of the three-dimensional plexifilamentary fiber is changed.

4. A method of manufacturing a uniform nonwoven fabric according to claim 2, characterized in that a distance between a lower most portion of the rotational dispersion plate and a collecting face of the spread three-dimensional plexifilamentary fiber is determined to be a smaller distance than a distance between the lower most portion of the rotational dispersion plate and a point where a swinging direction of the three-dimensional plexifilamentary fiber is changed.

5. A method of manufacturing a uniform non-woven fabric of plexifilamentary fibers, the method comprising the steps of:

rotating a dispersion plate about an axis of rotation, the dispersion plate including a disk portion, a coaxial cylindrical portion extending from the disk portion, and an inclined skirt portion extending between the disk portion and the cylindrical portion, the skirt portion having a plurality of alternately arranged swinging faces and cushioning faces, wherein the cushioning faces fan outwardly from the cylindrical portion toward the disk portion, and wherein centers of all of the swinging faces and the cushioning faces are inclined at substantially a same angle with respect to the disk portion; and projecting, during the step of rotating, three dimensional plexifilamentary fiber material toward the rotating dispersion plate and along a flow path substantially parallel to the axis of rotation to cause the fiber material to strike and be spread by the swinging faces and to permit the cushioning faces to dampen sudden changes in fiber flow resulting from the fiber material striking the swinging faces of the rotating disk.

6. The method of any one of claims 1, 2, 4 or 5 which comprises striking the dispersion plate with the three-dimensional plexifilamentary fiber together with a high speed fluid.

* * * * *